United States Patent
Du et al.

(10) Patent No.: US 12,381,647 B2
(45) Date of Patent: Aug. 5, 2025

(54) SIGNAL PROCESSING METHOD AND APPARATUS

(71) Applicant: HUAWEI TECHNOLOGIES CO., LTD., Shenzhen (CN)

(72) Inventors: Rui Du, Shenzhen (CN); Qian Zhang, Harbin (CN); Xiao Han, Shenzhen (CN); Xun Yang, Shenzhen (CN); Chenchen Liu, Shenzhen (CN); Meihong Zhang, Shenzhen (CN); Yingxiang Sun, Shenzhen (CN); Yun Zhang, Harbin (CN); Yang Li, Harbin (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/446,764

(22) Filed: Aug. 9, 2023

(65) Prior Publication Data

US 2024/0031050 A1    Jan. 25, 2024

Related U.S. Application Data

(63) Continuation of application No. PCT/CN2022/074884, filed on Jan. 29, 2022.

(30) Foreign Application Priority Data

Feb. 10, 2021 (CN) .......................... 202110184266.6

(51) Int. Cl.
H04L 25/02 (2006.01)
H04J 13/00 (2011.01)

(52) U.S. Cl.
CPC ...... *H04J 13/0014* (2013.01); *H04L 25/0242* (2013.01)

(58) Field of Classification Search
CPC ............ H04L 25/0242; H04L 25/0226; H04L 25/0202; H04L 27/261; H04L 27/2607; H04W 84/12; H04W 28/06; H04J 13/0014

See application file for complete search history.

(56) References Cited

U.S. PATENT DOCUMENTS

2021/0028831 A1*  1/2021  Lou .................. H04B 7/0417

FOREIGN PATENT DOCUMENTS

JP    2018537011 A    12/2018
JP    2021501520 A    1/2021
(Continued)

OTHER PUBLICATIONS

Rui Yang et al:"EDMG-CEF Design for Control and SC PHY in MIMO Modes", IEEE 802.11-16/0912r0, vol. 802.11ay, Jul. 25, 2016, XP068107236, total 13 pages.
(Continued)

*Primary Examiner* — David S Huang
(74) *Attorney, Agent, or Firm* — HAUPTMAN HAM, LLP

(57) ABSTRACT

This application discloses a signal processing method and an apparatus. The method includes: A transmit device generates a PPDU, and sends the PPDU; and a receive device receives the PPDU, and processes M sequences carried in the PPDU. The PPDU shown in this application includes a first field, the first field is used for carrying M sequences, the M sequences correspond to M space-time streams, one sequence corresponds to one space-time stream, and M is a positive integer. According to the method provided in this application, sequence sending efficiency can be effectively improved.

17 Claims, 29 Drawing Sheets

(56) References Cited

FOREIGN PATENT DOCUMENTS

| WO | 2017189143 A2 | 11/2017 |
|----|---------------|---------|
| WO | 2018080608 A1 | 5/2018  |

OTHER PUBLICATIONS

Extended European Search Report issued in corresponding European Application No. 22752182.0, dated Jul. 23, 2024, pp. 1-9.
Artyom Lomayev et al.;"EDMG STF and CEF Design for SC PHY in 11ay" [online], IEEE 802.11-16/0994r1, Jul. 27, 2016, total 21 pages.
Assaf Kasher et al.: Golay Sequences and Ambiguity Function [online], IEEE 802.11-20/1444r1,Sep. 7, 2020,total 12 pages.
Japanese Office Action issued in corresponding Japanese Patent Application No. 2023-548634, dated Sep. 17, 2024, pp. 1-29.
IEEE Std 802.11ad-28 Dec. 2012. IEEE Standard for Information technology—Telecommunications and information exchange between systems Local and metropolitan area networks—Specific requirements. Part 11: Wireless LAN Medium Access Control (MAC) and Physical Layer (PHY) Specifications. Amendment 3: Enhancements for Very High Throughput in the 60 GHz Band. total 628 pages.
IEEE P802.11ay/D5.0, Oct. 2019. Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 2: Enhanced throughput for operation in license-exempt bands above 45 GHz. total 790 pages.
Shufeng Li et al.:"A MIMO Channel Estimation Algorithm Using Complete Complementary Sequence Pairs", Nov. 19-21, 2016, total 4 pages.
India Office Action issued in corresponding India Application No. 202317056304, dated Mar. 24, 2025, pp. 1-7.

\* cited by examiner

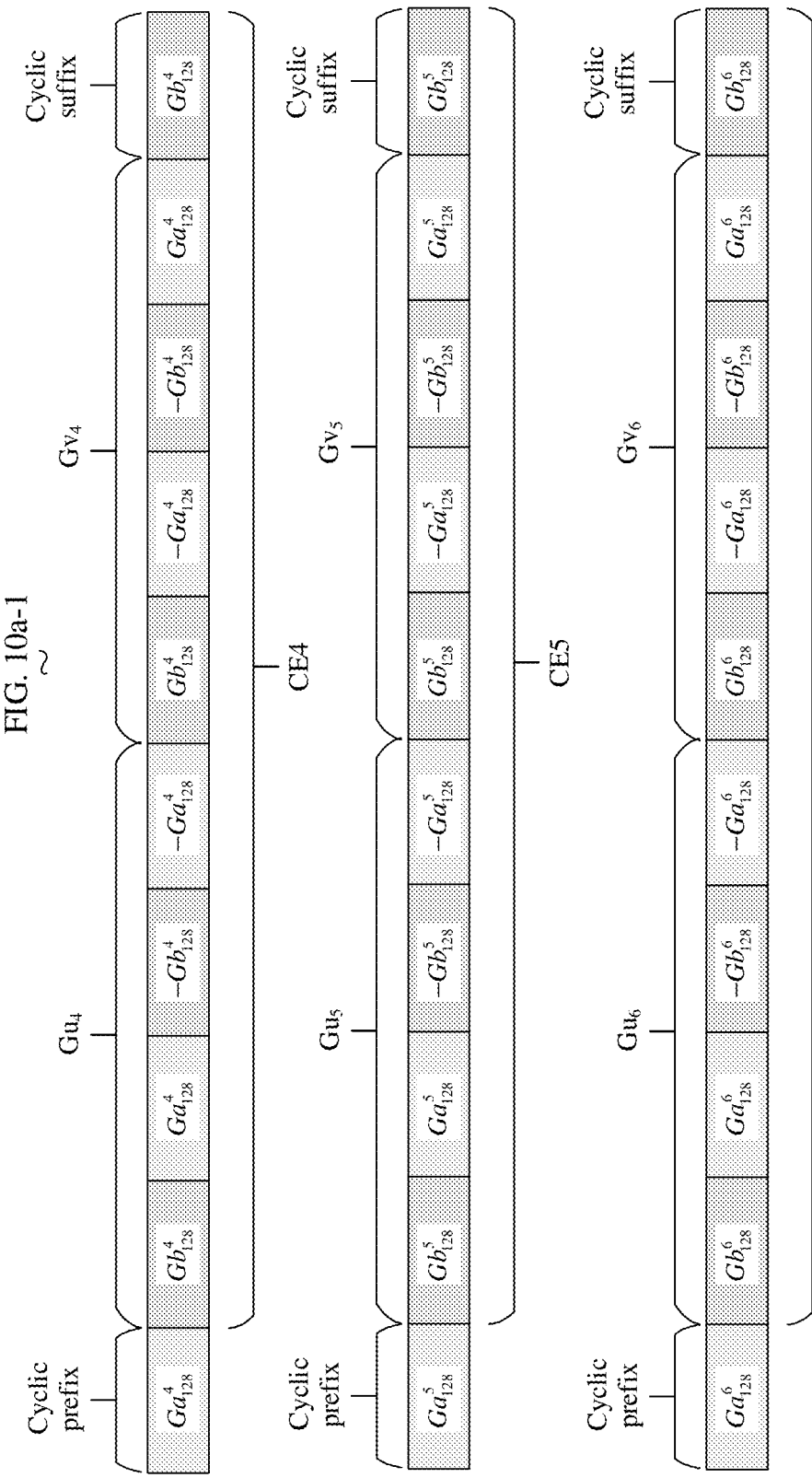

TO FIG. 11B

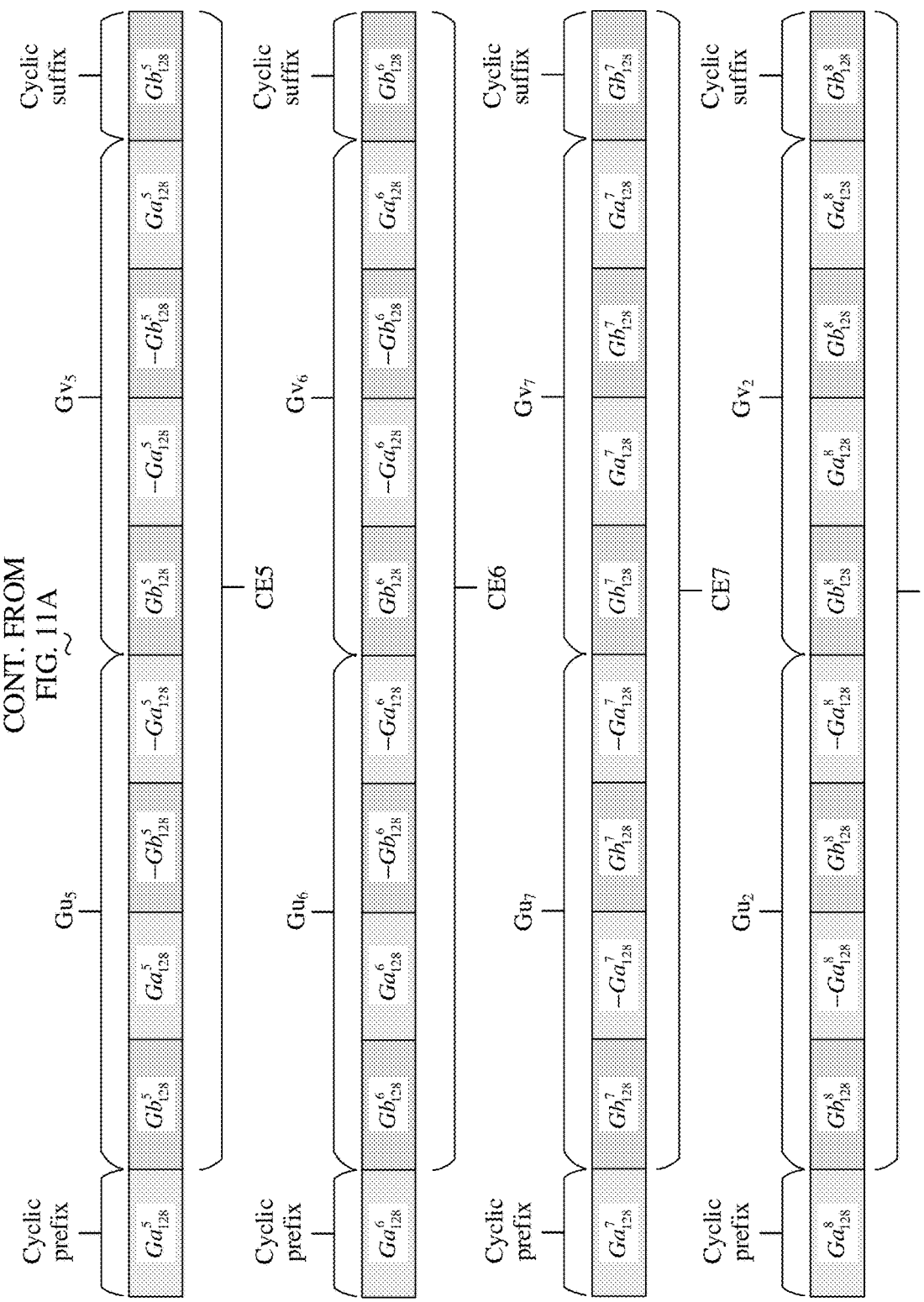

SIGNAL PROCESSING METHOD AND APPARATUS

CROSS-REFERENCE TO RELATED APPLICATIONS

This application is a continuation of International Application No. PCT/CN2022/074884, filed on Jan. 29, 2022, which claims priority to Chinese Patent Application No. 202110184266.6, filed on Feb. 10, 2021. The disclosures of the aforementioned applications are hereby incorporated by reference in their entireties.

TECHNICAL FIELD

This application relates to the field of communication technologies, and in particular, to a signal processing method and an apparatus.

BACKGROUND

Currently, the Institute of Electrical and Electronics Engineers (institute of electrical and electronics engineers, IEEE) series standards include low frequency band (for example, 2.4 GHz and 5 GHz) related standards (for example, 802.11n, 802.11ac, and 802.11ax) and high frequency band (for example, 60 GHz) related standards (for example, 802.11ad and 802.11ay).

In addition, a high-frequency signal (for example, 60 GHz) has many advantages, for example, a short wavelength, sensitivity to a moving target, a large transmission bandwidth, and a high distance resolution. Therefore, a related operation is usually performed by using the high-frequency signal. For example, the related operation may include channel estimation or target sensing. For example, a transmit device sends a physical layer (physical, PHY) protocol data unit (PHY protocol data unit, PPDU) to a receive device, so that the receive device may perform channel estimation, target sensing, or the like based on a sequence carried in the PPDU.

Therefore, improvements to sequence sending efficiency is sought.

SUMMARY

This application provides a signal processing method and an apparatus, to effectively improve sequence sending efficiency.

According to a first aspect, an embodiment of this application provides a signal processing method. The method includes:

generating a physical layer (physical, PHY) protocol data unit (PHY protocol data unit, PPDU), where the PPDU includes a first field, the first field is used for carrying M sequences, the M sequences correspond to M space-time streams, one sequence corresponds to one space-time stream, M is a positive integer, the M sequences include a first sequence, cross-correlation energy between the first sequence and at least two of the M sequences within a length range of a Golay complementary sequence is zero when M is greater than 2, autocorrelation side lobe energy of the first sequence within the length range of the Golay complementary sequence is zero, the first sequence is obtained based on a channel estimation (channel estimation, CE) sequence, and the Golay complementary sequence is used for constructing the CE sequence; and sending the PPDU.

In this embodiment of this application, when M is greater than 1, and a transmit device sends the M sequences, cross-correlation energy between the first sequence and the at least two sequences provided in this embodiment of this application within the length range of the Golay complementary sequence is zero. Therefore, interference between the first sequence and the at least two sequences is reduced. In this way, the transmit device can send as many sequences as possible (for example, may send at least three sequences) within one period. Further, efficiency of sending the M sequences by the transmit device is improved, and efficiency of performing channel estimation by a receive device is improved. In addition, because the transmit device can send at least three sequences within one period, pulse sensing time is further effectively reduced, and a maximum detectable Doppler or rate is further improved based on a relationship between a pulse repetition time and a pulse repetition frequency.

According to a second aspect, an embodiment of this application provides a signal processing method. The method includes:

receiving a physical layer protocol data unit PPDU, where the PPDU includes a first field, the first field is used for carrying M sequences, the M sequences correspond to M space-time streams, one sequence corresponds to one space-time stream, M is a positive integer, the M sequences include a first sequence, cross-correlation energy between the first sequence and at least two of the M sequences within a length range of a Golay complementary sequence is zero when M is greater than 2, autocorrelation side lobe energy of the first sequence within the length range of the Golay complementary sequence is zero, the first sequence is obtained based on a channel estimation CE sequence, and the Golay complementary sequence is used for constructing the CE sequence; and performing signal processing based on the M sequences.

For example, a receive device may perform channel estimation, target sensing, or the like based on the M sequences.

For beneficial effect of the second aspect, refer to the description of the first aspect. Details are not described herein again.

With reference to the first aspect or the second aspect, in a possible implementation, the M sequences are used for channel estimation, or the M sequences are used for target sensing.

With reference to the first aspect or the second aspect, in a possible implementation, when M is greater than 4, cross-correlation energy between the first sequence and at least three of the M sequences within the length range of the Golay complementary sequence is zero.

With reference to the first aspect or the second aspect, in a possible implementation, the first sequence is obtained based on a P-matrix and the CE sequence, and the P-matrix is:

$$P = \begin{bmatrix} +1 & +1 \\ +1 & +1 \\ +1 & +1 \\ +1 & +1 \\ +1 & -1 \\ +1 & -1 \\ +1 & -1 \\ +1 & -1 \end{bmatrix}.$$

With reference to the first aspect or the second aspect, in a possible implementation, the Golay complementary sequence includes first Golay complementary sequences Ga and Gb, the first sequence is obtained based on Ga, Gb, and a first symbol sequence, and the first symbol sequence is used for representing positive and negative symbols of Ga and Gb.

With reference to the first aspect or the second aspect, in a possible implementation, the first symbol sequence $a(n)=\{a_1, a_2, a_3, a_4, a_5, a_6, a_7, a_8, a_9, a_{10}\}$, $a_1$ is equal to $a_9$, $a_2$ is equal to $a_{10}$, and a value of each element in $a(n)$ is 1 or −1.

With reference to the first aspect or the second aspect, in a possible implementation, a(n) meets at least one of the following:

$a_1 \cdot a_2 + a_3 \cdot a_4 + a_5 \cdot a_6 + a_7 \cdot a_8 = 0$ $a_2 \cdot a_3 + a_4 \cdot a_5 + a_6 \cdot a_7 + a_8 \cdot a_9 = 0$ $a_3 \cdot a_4 + a_5 \cdot a_6 + a_7 \cdot a_8 + a_9 \cdot a_{10} = 0$ With reference to the first aspect or the second aspect, in a possible implementation, values of $a_1$ to $a_{10}$ are any one of the following, and a horizontal order sequentially corresponds to $a_1$ to $a_{10}$:

1 1 −1 1 −1 1 1 1 1 1;
1 1 −1 1 1 −1 1 1 1 1;
1 1 −1 1 1 1 −1 1 1 1;
1 1 1 −1 1 1 −1 1 1 1;
1 1 1 1 −1 1 −1 1 1 1;
1 1 −1 −1 −1 1 −1 1 1 1;
1 1 −1 −1 1 −1 −1 1 1 1;
1 1 −1 1 −1 −1 −1 1 1 1;
1 1 −1 1 1 1 1 −1 1 1;
1 1 1 −1 1 1 1 −1 1 1;
1 1 1 1 −1 1 1 −1 1 1;
1 1 −1 −1 −1 1 1 −1 1 1;
1 1 1 1 1 −1 1 −1 1 1;
1 1 1 −1 −1 −1 1 −1 1 1;
1 1 1 −1 −1 1 −1 −1 1 1;
1 1 −1 1 1 −1 −1 −1 1 1;
1 1 1 −1 1 −1 −1 −1 1 1;
1 1 −1 1 1 1 1 1 −1 1;
1 1 1 −1 1 1 1 1 −1 1;
1 1 1 1 −1 1 1 1 −1 1;
1 1 −1 −1 −1 1 1 1 −1 1;
1 1 1 1 1 −1 1 1 −1 1;
1 1 1 −1 −1 −1 1 1 −1 1;
1 1 1 1 1 1 −1 1 −1 1;
1 1 1 1 −1 −1 −1 1 −1 1;
1 1 −1 −1 −1 −1 −1 1 −1 1;
1 1 −1 1 1 1 −1 −1 1;
1 1 1 1 −1 1 1 −1 −1 1;
1 1 −1 −1 −1 1 −1 −1 −1 1;
1 1 −1 1 1 1 −1 −1 −1 1;
1 1 1 −1 1 1 −1 −1 −1 1;
1 1 1 1 −1 1 −1 −1 −1 1;
1 1 −1 −1 −1 1 1 −1 −1 1;
1 1 −1 −1 1 −1 −1 −1 −1 1;
1 1 −1 1 −1 −1 −1 −1 −1 1.

With reference to the first aspect or the second aspect, in a possible implementation, when M is greater than 2, the M sequences further include a second sequence, cross-correlation energy between the second sequence and the first sequence within the length range of the Golay complementary sequence is zero, and the Golay complementary sequence further includes second Golay complementary sequences Ga' and Gb'.

The second sequence is obtained based on Ga', Gb', and a second symbol sequence $b(n)=\{b_1, b_2, b_3, b_4, b_5, b_6, b_7, b_8, b_9, b_{10}\}$, the second symbol sequence is used for representing positive and negative symbols of Ga' and Gb', $b_1$ is equal to $b_9$, $b_2$ is equal to $b_{10}$, a value of each element in b(n) is 1 or −1, and b(n) is not equal to a(n).

With reference to the first aspect or the second aspect, in a possible implementation, a(n) and b(n) meet at least one of the following:

$a_4 \cdot b_3 + a_6 \cdot b_5 + a_8 \cdot b_7 + a_{10} \cdot b_9 = 0$ $a_2 \cdot b_2 + a_4 \cdot b_4 + a_6 \cdot b_6 + a_8 \cdot b_8 = 0$ $a_3 \cdot b_3 + a_5 \cdot b_5 + a_7 \cdot b_7 + a_9 \cdot b_9 = 0$ $a_3 \cdot b_2 + a_5 \cdot b_4 + a_7 \cdot b_6 + a_9 \cdot b_8 = 0$ $a_2 \cdot b_3 + a_4 \cdot b_5 + a_6 \cdot b_7 + a_8 \cdot b_9 = 0$ $a_1 \cdot b_2 + a_3 \cdot b_4 + a_5 \cdot b_6 + a_7 \cdot b_8 = 0$ With reference to the first aspect or the second aspect, in a possible implementation, when a(n)={1,1,−1,1,−1,1,1,1,1,1}, b(n)={1,1,1, −1, −1,1, −1, −1,1,1}, or b(n)={−1,1,−1,−1,1,1,1,−1,−1,1};
when a(n)={1,1,1, −1,1−1,1,1,1,1}, b(n)={1,1, −1,1,1, −1, −1,1,1,1}, or b(n)={−1,1,1,1,1,−1, −1,1,−1,−1,}
when a(n)={1,1,1,1,−1,1,−1,1,1,1}, b(n)={1,1, −1, −1, −1,1,1, −1,1,1}, or b(n)={−1,1,1, −1,1,1, −1, −1, −1,1};
when a(n)={1,1, −1, −1,1 −1,1,−1,1,1,1,}, b(n)={1,1,1,1, 1,−1,1,−1,1,}, or b(n)={−1,1,1, −1,1, −1, −1, −1, −1,1};
when a(n)={1,1, −1, −1, −1,1,1, −1,1,1}, b(n)={−1,1, −1,1,1,1,1,1, −1};
when a(n)={1,1,1,1,1, −1,1, −1,1,1}, b(n)={−1,1,1,1, −1, −1,1,1,1, −1,1};
when a(n)={1,1,1, −1, −1,1, −1, −1,1,1}, b(n)={−1,1,1,1,1, 1,1, −1,1, −1,1};
when a(n)={1,1, −1,1,1, −1, −1, −1,1,1}) b(n)={−1,1,−1,−1,−1,−1,1,1,−1,1,1};
when a(n)={−1,1, −1,1,1,1,1,1, −1,1}, b(n)={−1,1,1,1, −1,1, 1, −1, −1, −1,1};
when a(n)={−1,1,1, −1, −1, −1,1,1, −1,1}, b(n)={−1,1, −1,1, −1, −1,−1, −1, −1,1};
when a(n)={−1,1,1, −1,1, −1,1}, b(n)={−1,1, −1, −1, −1,1}; or
when a(n)={−1,1, −1, −1, −1, −1, −1,1, −1,1}, b(n)={−1, 1,1,1,−1,1,1,−1,1,1}.

With reference to the first aspect or the second aspect, in a possible implementation, the first field is a training field unit in the PPDU;
the first field is an enhanced directional multi-gigabit channel estimation field in the PPDU; or
the first field is a long training field in the PPDU.

It may be understood that, for specific descriptions of the first aspect or the second aspect, refer to the following embodiments. Details are not described herein again.

According to a third aspect, an embodiment of this application provides a communication apparatus, configured to perform the method in any one of the first aspect or the possible implementations of the first aspect. The communication apparatus includes corresponding units configured to perform the method in any one of the first aspect or the possible implementations of the first aspect.

For example, the communication apparatus may be a transmit device, a chip in a transmit device, or the like.

According to a fourth aspect, an embodiment of this application provides a communication apparatus, configured to perform the method in any one of the second aspect or the possible implementations of the second aspect. The communication apparatus includes corresponding methods configured to perform the method in any one of the second aspect or the possible implementations of the second aspect.

For example, the communication apparatus may be a receive device, a chip in a receive device, or the like.

In the third aspect or the fourth aspect, the communication apparatus may include a transceiver unit and a processing unit. For specific descriptions of the transceiver unit and the processing unit, refer to apparatus embodiments shown in the following.

According to a fifth aspect, an embodiment of this application provides a communication apparatus. The communication apparatus includes a processor, configured to perform the method in any one of the first aspect or the possible implementations of the first aspect. Alternatively, the processor is configured to execute a program stored in a memory. When the program is executed, the method in any one of the first aspect or the possible implementations of the first aspect is performed.

In a process of performing the foregoing method, a process of sending information (for example, sending a PPDU) in the foregoing method may be understood as a process of outputting the foregoing information by the processor, or a process of receiving the foregoing input information by the processor. When outputting the information, the processor outputs the information to a transceiver, so that the transceiver transmits the information. After the information is output by the processor, other processing may further be performed on the information before the information arrives at the transceiver. Similarly, when the processor receives the foregoing input information, the transceiver receives the foregoing information, and inputs the foregoing information into the processor. Further, after the transceiver receives the foregoing information, other processing may be performed on the foregoing information before the information is input into the processor.

Unless otherwise specified, or if operations such as transmitting, sending, and receiving related to the processor do not contradict an actual function or internal logic of the operations in related descriptions, all the operations may be more generally understood as operations such as outputting, receiving, and inputting of the processor, instead of operations such as transmitting, sending, and receiving directly performed by a radio frequency circuit and an antenna.

In an implementation process, the processor may be a processor specially configured to perform these methods, or a processor, for example, a general-purpose processor, that executes computer instructions in the memory to perform these methods. The memory may be a non-transitory (non-transitory) memory, for example, a read-only memory (Read Only Memory, ROM). The memory and the processor may be integrated on a same chip, or may be separately disposed on different chips. A type of the memory and a manner of disposing the memory and the processor are not limited in this embodiment of this application. It may be understood that descriptions of the processor and the memory are also applicable to the sixth aspect shown below. To avoid repetition, details are not described in the sixth aspect again.

In a possible implementation, the memory is located outside the communication apparatus.

In a possible implementation, the memory is located inside the communication apparatus.

In this embodiment of this application, the processor and the memory may alternatively be integrated into one component. In other words, the processor and the memory may alternatively be integrated together.

In a possible implementation, the communication apparatus further includes a transceiver. The transceiver is configured to receive or send a signal. For example, the transceiver may be further configured to send a PPDU and the like.

In this embodiment of this application, the communication apparatus may be a transmit device, a chip in a transmit device, or the like.

According to a sixth aspect, an embodiment of this application provides a communication apparatus. The communication apparatus includes a processor, configured to perform the method in any one of the second aspect or the possible implementations of the second aspect. Alternatively, the processor is configured to execute a program stored in a memory. When the program is executed, the method in any one of the second aspect or the possible implementations of the second aspect is performed.

In a possible implementation, the memory is located outside the communication apparatus.

In a possible implementation, the memory is located inside the communication apparatus.

In this embodiment of this application, the processor and the memory may alternatively be integrated into one component. In other words, the processor and the memory may alternatively be integrated together.

In a possible implementation, the communication apparatus further includes a transceiver. The transceiver is configured to receive or send a signal. For example, the transceiver may be configured to receive a PPDU.

In this embodiment of this application, the communication apparatus may be a receive device, a chip in a receive device, or the like.

According to a seventh aspect, an embodiment of this application provides a communication apparatus. The communication apparatus includes a logic circuit and an interface, the logic circuit is coupled to the interface, the logic circuit is configured to generate a PPDU, and the interface is configured to output the PPDU.

It may be understood that the foregoing interface and logic circuit may further be understood as follows:

For example, the logic circuit is configured to obtain processed data (such as a PPDU), and the interface is configured to output processing performed by the logic circuit.

It may be understood that for descriptions of the PPDU, M sequences, a first sequence, a Golay complementary sequence, a CE sequence, and the like, refer to the descriptions of the first aspect or the second aspect; or refer to embodiments shown in the following. Details are not described herein again.

According to an eighth aspect, an embodiment of this application provides a communication apparatus. The communication apparatus includes a logic circuit and an interface, the logic circuit is coupled to the interface, the interface is configured to input a PPDU, and the logic circuit is configured to process the PPDU (for example, including processing M sequences carried in the PPDU).

It may be understood that the foregoing interface and logic circuit may further be understood as follows:

For example, the interface is configured to input to-be-processed data (for example, a PPDU), and the logic circuit is configured to process the to-be-processed data.

It may be understood that for descriptions of the PPDU, the M sequences, a first sequence, a Golay complementary sequence, a CE sequence, and the like, refer to the descriptions of the first aspect or the second aspect; or refer to embodiments shown in the following. Details are not described herein again.

According to a ninth aspect, an embodiment of this application provides a computer-readable storage medium. The computer-readable storage medium is configured to store a computer program, and when the computer program is run on a computer, the method in any one of the first aspect or the possible implementations of the first aspect is performed.

According to a tenth aspect, an embodiment of this application provides a computer-readable storage medium. The computer-readable storage medium is configured to store a computer program, and when the computer program is run on a computer, the method in any one of the second aspect or the possible implementations of the second aspect is performed.

According to an eleventh aspect, an embodiment of this application provides a computer program product. The computer program product includes a computer program or computer code, and when the computer program product runs on a computer, the method in any one of the first aspect or the possible implementations of the first aspect is performed.

According to a twelfth aspect, an embodiment of this application provides a computer program product. The computer program product includes a computer program or computer code, and when the computer program product runs on a computer, the method in any one of the second aspect or the possible implementations of the second aspect is performed.

According to a thirteenth aspect, an embodiment of this application provides a computer program. When the computer program is run on a computer, the method in any one of the first aspect or the possible implementations of the first aspect is performed.

According to a fourteenth aspect, an embodiment of this application provides a computer program. When the computer program is run on a computer, the method in any one of the second aspect or the possible implementations of the second aspect is performed.

According to a fifteenth aspect, an embodiment of this application provides a wireless communication system. The wireless communication system includes a transmit device and a receive device. The transmit device is configured to perform the method in any one of the first aspect or the possible implementations of the first aspect. The receive device is configured to perform the method in any one of the second aspect or the possible implementations of the second aspect.

BRIEF DESCRIPTION OF DRAWINGS

FIG. 6a and FIG. 6b each are a schematic diagram of analyzing CE sequence cross-correlation according to an embodiment of this application;

FIG. 10a-1 and FIG. 10a-2 are a schematic diagram of a structure of a CE sequence according to an embodiment of this application;

FIG. 11A and FIG. 11B are a schematic diagram of a structure of a CE sequence according to an embodiment of this application.

DESCRIPTION OF EMBODIMENTS

Figure 1:
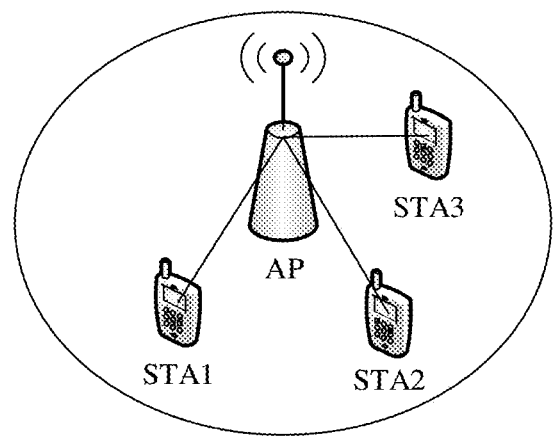
FIG. 1 is a schematic diagram of a communication system according to an embodiment of this application.

To make objectives, technical solutions, and advantages of this application clearer, the following further describes this application with reference to the accompanying drawings.

In the specification, claims, and the accompanying drawings of this application, terms such as "first" and "second" are only intended to distinguish between different objects but do not describe a particular order. In addition, terms "include", "have", or any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

An "embodiment" mentioned in this specification means that a particular feature, structure, or characteristic described with reference to this embodiment may be included in at least one embodiment of this application. The phrase appearing at various locations in the specification does not necessarily refer to a same embodiment, and is not an independent or alternative embodiment mutually exclusive with another embodiment. It is explicitly and implicitly understood by a person skilled in the art that embodiments described in the specification may be combined with another embodiment.

In this application, "at least one (item)" means one or more, "a plurality of" means two or more, "at least two (item)" means two or three or more, and "and/or" is used to describe an association relationship between associated objects and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items. For example, at least one item (piece) of a, b, and c may represent a, b, c, "a and b", "a and c", "b and c", or "a, b, and c".

A method provided in this application may be applied to various communication systems, for example, an internet of things (internet of things, IoT) system, a narrow band internet of things (narrow band internet of things, NB-IoT) system, a long term evolution (long term evolution, LTE) system, a 5th generation (5th-generation, 5G) communication system, and a new communication system (for example, 6G) emerging in future communication development. The method provided in this application may further be applied to a wireless local area network (wireless local area network, WLAN) system, for example, wireless fidelity (wireless-fidelity, Wi-Fi).

The method provided in this application may be implemented by a communication apparatus in a wireless communication system. For example, the communication apparatus may be an access point (access point, AP) device or a station (station, STA) device.

The method provided in this application may be applied to a scenario in which one node performs data transmission with one or more nodes, may be applied to single-user uplink/downlink transmission, and/or multi-user uplink/downlink transmission, may be applied to device-to-device (device to device, D2D) transmission, and the like. The method may be further applied to sensing a target in an environment, and estimating information such as a distance, a speed, and an angle of the target. Further, an action of the sensed target may be further recognized, imaged, or the like based on related information. Details are not described herein. For example, WLAN sensing is a technology that uses a WLAN wireless signal to sense a target. This technology can be based on radio measurement and environment sampling capabilities. In this way, each communication path between two physical devices can obtain information about a surrounding environment.

The node may be an AP or a STA. For ease of description, the following uses communication between the AP and the STA as an example for description.

For example, a communication system to which the method provided in this application may be applied may include an access point (access point, AP) device and a station (station, STA) device. The access point device may also be understood as an access point entity, and the station device may also be understood as a station entity. For example, this application is applicable to a scenario in which an AP communicates with or senses a STA in a WLAN. Optionally, the AP may communicate with or sense a single STA, or the AP may simultaneously communicate with or sense a plurality of STAs. Specifically, communication or sensing between the AP and the plurality of STAs may be further divided into downlink transmission in which the AP simultaneously sends signals to the plurality of STAs and uplink transmission in which the plurality of STAs send signals to the AP. The AP and the STA may support a WLAN communication protocol. The communication protocol may include protocols of the IEEE 802.11 series. For example, the communication protocol may be a low frequency band (for example, 2.4 GHz and 5 GHz) protocol, such as 802.11n, 802.11ac, or 802.11ax; a high frequency band (for example, 60 GHz) protocol, such as 802.11ad/directional multi-gigabit (directional multi gigabit, DMG) or 802.11ay/enhanced directional multi-gigabit (enhanced directional multi gigabit, EDMG); or a single-carrier physical layer (single carrier physical layer, SC PHY) protocol, such as 802.11ay. Certainly, with continuous evolution and development of communication technologies, the communication protocol may further include a next-generation protocol of IEEE 802.11ay, IEEE 802.11ad, or the like.

FIG. 1 is a schematic diagram of an architecture of a communication system according to an embodiment of this application. The communication system may include one or more APs and one or more STAs. FIG. 1 shows one access point device, for example, an AP, and three station devices, for example, a STA1, a STA2, and a STA3. It may be understood that FIG. 1 shows only one AP and three STAs as an example. However, there may be more or less APs or STAs. This is not limited in this application.

The access point (for example, the AP in FIG. 1) is an apparatus having a wireless communication function, supports communication or sensing by using a WLAN protocol, and has a function of communicating with or sensing another device (for example, a station or another access point) in a WLAN network, and certainly, may further have a function of communicating with or sensing another device. Alternatively, the access point is equivalent to a bridge that connects a wired network and a wireless network. A main function of the access point is to connect various wireless network clients together and then connect the wireless network to the Ethernet. In the WLAN system, the access point may be referred to as an access point station (AP STA). The apparatus having a wireless communication function may be an entire device, or may be a chip or a processing system installed in an entire device. The device in which the chip or the processing system is installed may implement a method and a function in embodiments of this application under control of the chip or the processing system. The AP in embodiments of this application is an apparatus that provides a service for a STA, and may support the 802.11 series protocols. For example, the access point may be an access point for a terminal device (for example, a mobile phone) to access a wired (or wireless) network, and is mainly deployed in a home, a building, and a park. A typical coverage radius is tens of meters to 100-odd meters. Certainly, the access point may alternatively be deployed outdoors. For another example, the AP may be a communication entity, for example, a communication server, a router, a switch, or a bridge, or the AP may include various forms of macro base stations, micro base stations, relay stations, and the like. Certainly, the AP may alternatively be a chip or a processing system in these devices in various forms, to implement the method and function in embodiments of this application. The access point in this application may be a high-efficiency (high-efficiency, HE) AP, an extremely high throughput (extremely high throughput, EHT) AP, or an access point applicable to a future Wi-Fi standard.

A station (for example, the STA1 or the STA2 in FIG. 1) is an apparatus having a wireless communication function, supports communication or sensing by using a WLAN protocol, and has a capability of communicating with or sensing another station or access point in a WLAN network. In a WLAN system, the station may be referred to as a non-access point station (non-access point station, non-AP STA). For example, the STA is any user communication device that allows a user to communicate with or sense an AP and further to communicate with a WLAN. The apparatus having a wireless communication function may be an entire device, or may be a chip, a processing system, or the like installed in an entire device. The device in which the chip or the processing system is installed may implement a method and a function in embodiments of this application under control of the chip or the processing system. For example, the station may be a wireless communication chip, a wireless sensor, or a wireless communication terminal, and may also be referred to as a user. For another example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function.

The WLAN system can provide high-speed and low-latency transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops and warehousing. Certainly, a device (for example, an access point or a station) that supports WLAN communication or sensing may be a sensor node (for example, a smart water meter, a smart electricity meter, or a smart air detection node) in a smart city, a smart device (for example, a smart camera, a projector, a display screen, a television, a stereo, a refrigerator, or a washing machine) in a smart home, a node in the internet of things, an entertainment terminal (for example, an AR, a VR, or another wearable device), a smart device in smart office (for example, a printer, a projector, a loudspeaker, or a stereo), an internet of vehicles device in the internet of vehicles, an infrastructure (for example, a vending machine, a self-service navigation station of a supermarket, a self-service cash register device, or a self-service ordering machine) in daily life scenarios, a device in a large sports and music venue, and the like. For example, the access point and the station may be devices applied to the internet of vehicles, internet of things nodes, sensors, or the like in the internet of things (IoT, internet of things), smart cameras, smart remote controls, smart water or electricity meters, or the like in a smart home, and sensors in a smart city. Specific forms of the STA and the AP are not limited in embodiments of this application, and are merely examples for description herein.

Although this application is mainly described by using a network in which IEEE 802.11 is deployed as an example, a person skilled in the art easily understands that various aspects of this application can be expanded to other networks that use various standards or protocols, for example, Bluetooth (Bluetooth), a high performance radio LAN (high performance radio LAN, HIPERLAN) (a wireless standard that is similar to the IEEE 802.11 standard, and is mainly used in Europe), a wide area network (WAN), a wireless local area network (wireless local area network, WLAN), a personal area network (personal area network, PAN), or another known or later developed network.

Figure 2:
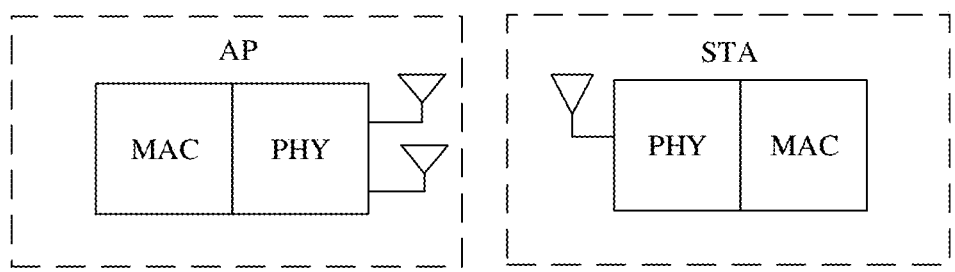
FIG. 2 is a schematic diagram of a structure of an access point and a structure of a station according to an embodiment of this application.

For example, FIG. 2 is a schematic diagram of a structure of an access point and a structure of a station according to an embodiment of this application. The AP may have a plurality of antennas, or may have a single antenna. As shown in FIG. 2, the AP includes a physical layer (physical layer, PHY) processing circuit and a medium access control (medium access control, MAC) processing circuit. The physical layer processing circuit may be configured to process a physical layer signal, and the MAC layer processing circuit may be configured to process a MAC layer signal. The 802.11 standard focuses on the PHY and the MAC. As shown in FIG. 2, FIG. 2 further shows a schematic diagram of a structure of a STA having a single antenna. In an actual scenario, the STA may alternatively have a plurality of antennas, and may be a device having more than two antennas. The STA may include a PHY processing circuit and a MAC processing circuit. The physical layer processing circuit may be configured to process a physical layer signal, and the MAC layer processing circuit may be configured to process a MAC layer signal.

In this application, a transmit device may be an access point device or a station device. Alternatively, a receive device may be an access point device or a station device. For example, the transmit device may be an access point device, and the receive device is an access point device. For another example, the transmit device is a station device, and the receive device is a station device. For another example, the transmit device may be an access point device, and the receive device is a station device. For another example, the transmit device may be a station device, and the receive device is an access point device. It may be understood that the transmit device and the receive device shown herein may also be collectively referred to as a communication apparatus.

It may be understood that in this application, an example in which the transmit device sends a physical layer protocol data unit (PHY protocol data unit, PPDU) to the receive device is used to describe the signal processing method provided in this application. However, the method shown in this application is further applicable to various types of PPDUs. For example, the PPDU may include a multi-user physical layer protocol data unit (multiple user PHY protocol data unit, MU PPDU), a single-user physical layer protocol data unit (single user PHY protocol data unit, SU PPDU), a trigger-based physical layer protocol data unit (trigger based PHY protocol data unit, TB PPDU), or the like.

Figure 3A:
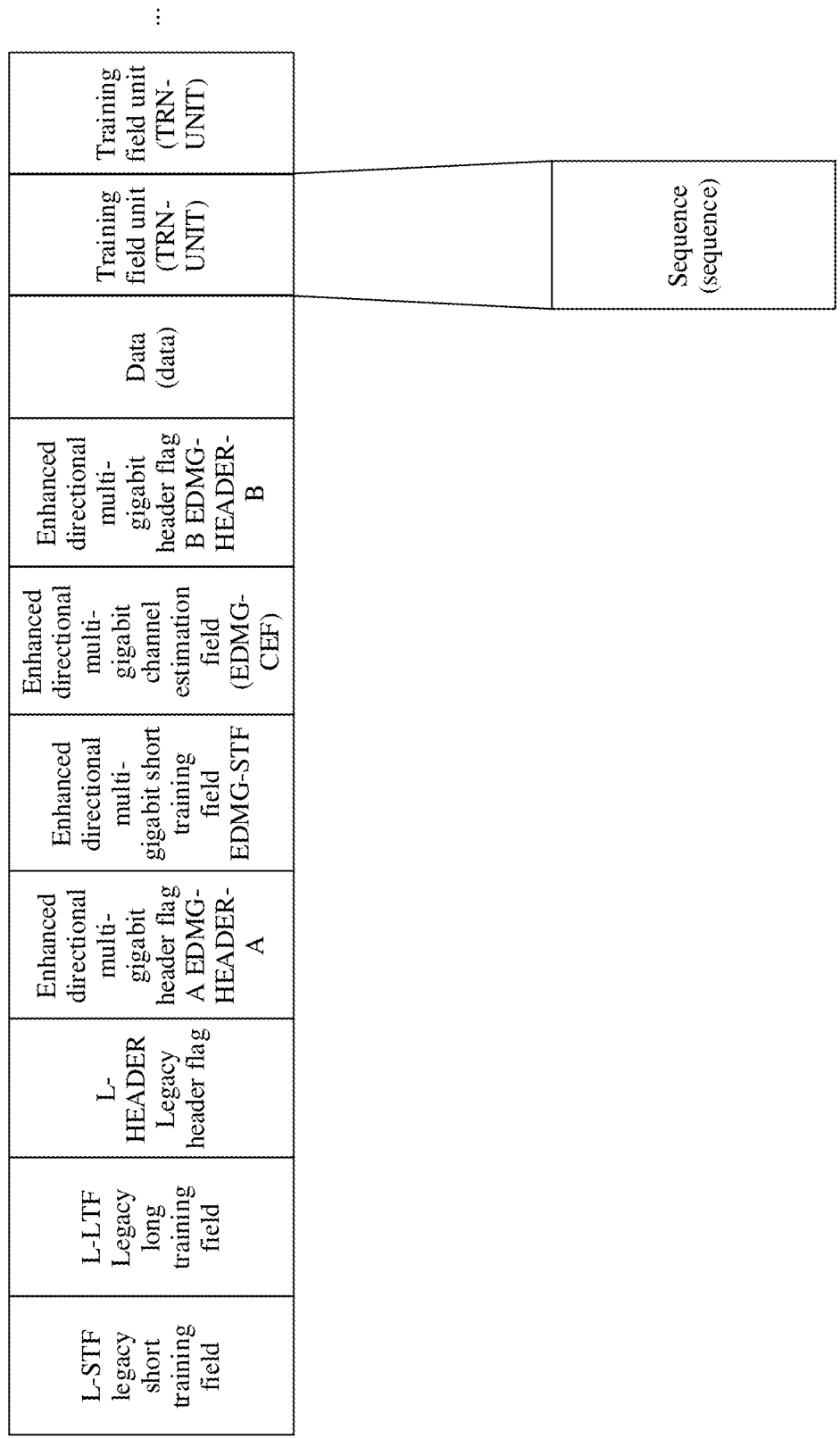
FIG. 3a and FIG. 3b each are a schematic diagram of a structure of a PPDU according to an embodiment of this application.

For example, FIG. 3a is a schematic diagram of a structure of a PPDU. As shown in FIG. 3a, the PPDU may include a legacy short training field (legacy-short training field, L-STF), a legacy long training field (legacy-long training field, L-LTF), a legacy header (legacy-header, L-header) flag, an enhanced directional multi-gigabit header flag A (EDMG-header-A), an enhanced directional multi-gigabit short training field (EDMG-STF), an enhanced directional multi-gigabit channel estimation field (EDMG-channel estimation field, EDMG-CEF), an enhanced directional multi-gigabit header flag B (EDMG-header-B), data (data), and a training field unit (training filed unit, TRN unit). The training field unit may include a sequence (sequence). It may be understood that, for specific descriptions of the PPDU shown in FIG. 3a, refer to the 802.11ay EDMG protocol and the like. Details are not described herein again.

Figure 3B:
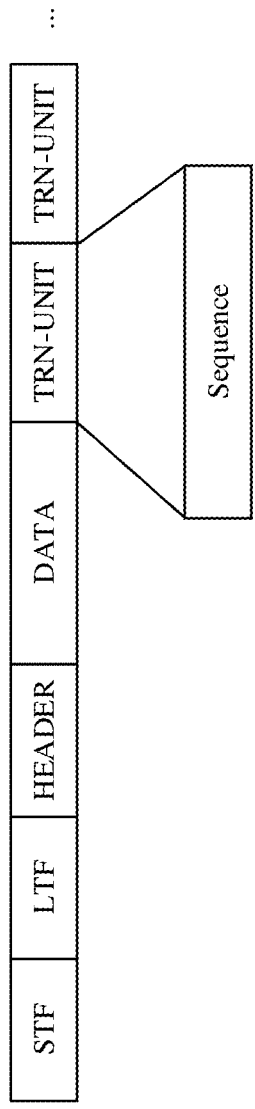

For example, FIG. 3b is a schematic diagram of a structure of a PPDU. For example, the PPDU may include a short training field (short training field, STF), a long training field (long training field, LTF), a header (header), data (data), and a training field unit (TRN unit). It may be understood that, for specific description of the PPDU shown in FIG. 3b, refer to the 802.11ad DMG protocol.

The following describes in detail a Golay (Golay) complementary sequence (which may also be referred to as a Golay complementary sequence) and a channel estimation (channel estimation, CE) sequence in this application.

For example, if binary constant modulus sequences x and y whose lengths are N (that is, a sequence length is N, or may also be referred to as a Golay complementary sequence whose length is N) meet the following formula (1), the binary constant modulus sequences x and y may be mutually referred to as Golay complementary sequences.

$$x(n) \otimes x^*(-n) + y(n) \otimes y^*(-n) = 2N\delta(n) \quad (1)$$

The superscript * represents a complex conjugate, and the symbol ⊗ represents a convolution operation.

With reference to a Golay complementary sequence specified in a related standard such as 802.11ay, $(Ga_N^1, Gb_N^1)$ and $(Ga_N^2, Gb_N^2)$ have a zero cross-correlation (zero cross correlation, ZCC) feature, as shown in the following formula (2) and formula (3). Similarly, $(Ga_N^3, Gb_N^3)$ and $(Ga_N^4, Gb_N^4)$, $(Ga_N^5, Gb_N^5)$ and $(Ga_N^6, Gb_N^6)$, and $(Ga_N^7, Gb_N^7)$ and $(Ga_N^8, Gb_N^8)$ also have ZCC features.

$$Ga_N^2(-n) \otimes Ga_N^1(n) + Gb_N^2(-n) \otimes Gb_N^1(n) = 0 \quad (2)$$

$$Ga_N^1(-n) \otimes Ga_N^2(n) + Gb_N^1(-n) \otimes Gb_N^2(n) = 0 \quad (3)$$

It may be understood that the superscripts 1 to 8 shown herein may be understood as indexes of sequences, sequence numbers, or the like. For example, when a transmit device sends one stream, a CE1 sequence may be formed by $Ga_N^1$ and $Gb_N^1$; when the transmit device sends two streams, a CE2 sequence may be formed by $Ga_N^2$ and $Gb_N^2$ (when the transmit device sends two streams, the CE1 sequence is also sent); when the transmit device sends three streams, a CE3 sequence may be formed by $Ga_N^3$ and $Gb_N^3$, and the like. This is not listed one by one herein. n represents an element index, an index of a chip, or the like, and the symbol ⊗ represents a convolution operation.

For example, the CE sequence may be used for WLAN sensing (sensing). During WLAN sensing, a one-way distance L may meet a formula (4).

$$L = \frac{N \times c}{\text{Chip\_rate}} \quad (4)$$

If a chip rate (for example, may also be referred to as an element rate) specified in the 802.11ay SC PHY standard is 1.76 Gpbs, a bit rate sent per second is 1.76 G. Therefore, Chip_rate=1.76 Gbps=1.76 Gb/s in the formula (2). For example, when N is 128, $$L = \frac{128 \times 3.0 \times 10^8 \ m/s}{1.76 \times 10^9 \ b/s} = 21.8181 \ m.$$

Therefore, a round-trip distance L/2=10.9091 m, and the distance can meet most application scenarios of WLAN sensing. It should be noted that N shown herein is merely an example. N shown below in this application may be equal to 128, or N may be equal to 256, or N may be equal to 512, or the like. A specific value of the sequence length N is not limited in this application. However, as the value of N changes, the distance L also changes, and a length range of a Golay complementary sequence shown below in this application also changes.

Figure 4A:
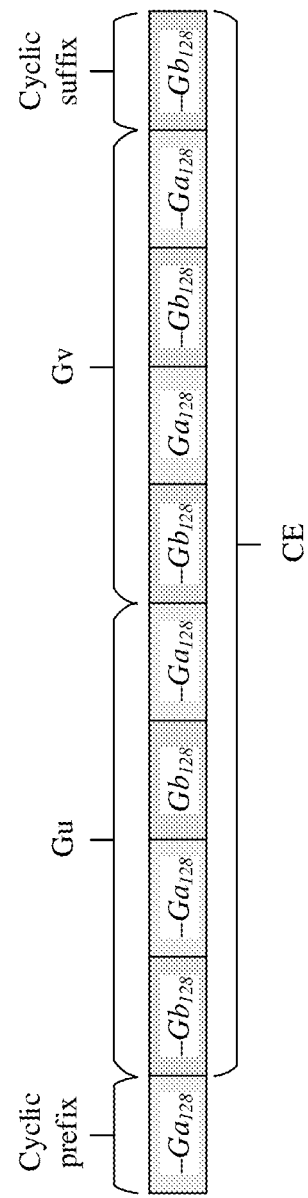
FIG. 4a is a schematic diagram of a structure of a CE sequence according to an embodiment of this application.
Figure 4B:
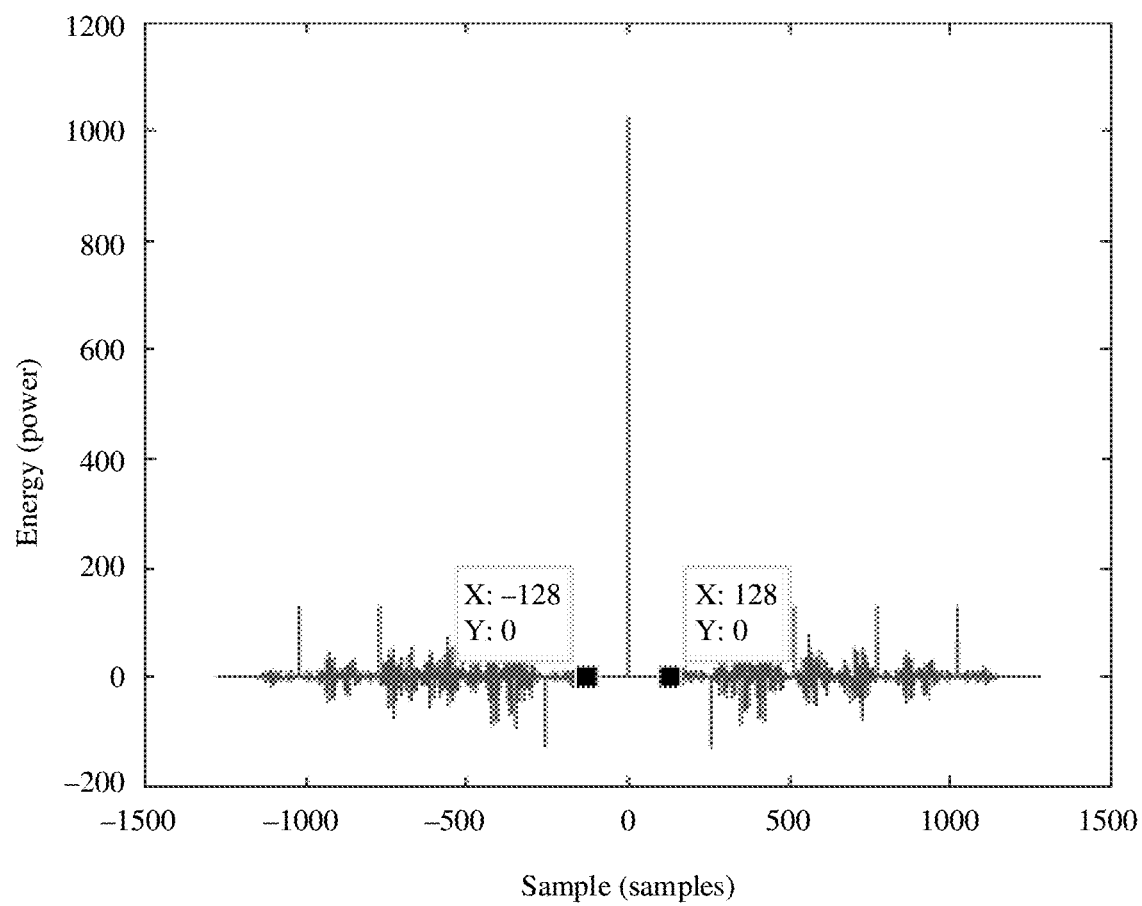
FIG. 4b is a schematic diagram of a structure of CE sequence autocorrelation according to an embodiment of this application.

FIG. 4a is a schematic diagram of a structure of a CE sequence constructed by using a Golay complementary sequence. The CE sequence is constructed by using the Golay complementary sequence. In this way, autocorrelation side lobe energy of the CE sequence within a length range (for example, −128 to +128) of the Golay complementary sequence can be zero (zero may also be referred to as 0). FIG. 4b is a schematic diagram of a result of CE sequence autocorrelation. It can be learned from FIG. 4b that autocorrelation side lobe energy within a length range (that is, −128 to +128) of a Golay complementary sequence is zero. In FIG. 4b, a horizontal coordinate represents a delay index (delay index), and a vertical coordinate represents energy (power). It can be learned from FIG. 4b that, within the range from −128 to +128, a result of CE sequence autocorrelation at a horizontal coordinate 0 may reach 1024 (that is, autocorrelation main lobe energy is 1024), and within a range from −128 to +128 other than 0, a result of the CE sequence autocorrelation is 0. It may be understood that a horizontal coordinate in FIG. 4b may alternatively be represented as an element. It should be noted that the horizontal coordinate in the accompanying drawings of this application is shown by using samples (samples) as an example, but should not be construed as a limitation on this application. In FIG. 4b, FIG. 8b to FIG. 8e, and FIG. 10b to FIG. 10e, a horizontal coordinate is shown by using samples as an example, and the horizontal coordinate may also be referred to as a code element or a delay index (not shown in the accompanying drawings).

The CE sequence can be applied to multiple-input multiple-output (multiple input multiple output, MIMO) channel estimation, to combine a P-matrix (P-matrix) for transmission.

For example, the P-matrix may be shown in a formula (5):

$$P = \begin{bmatrix} +1 & +1 & +1 & +1 \\ +1 & +1 & +1 & +1 \\ +1 & -1 & +1 & -1 \\ +1 & -1 & +1 & -1 \\ +1 & +1 & -1 & -1 \\ +1 & +1 & -1 & -1 \\ +1 & -1 & -1 & +1 \\ +1 & -1 & -1 & +1 \end{bmatrix} \quad (5)$$

It may be understood that, because the first row and the second row in the foregoing formula (5) are the same, the third row and the fourth row are the same, the fifth row and the sixth row are the same, and the seventh row and the eighth row are the same, the foregoing formula (5) may also be equivalently expressed as follows:

$$P = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad (6)$$

Figure 4C:
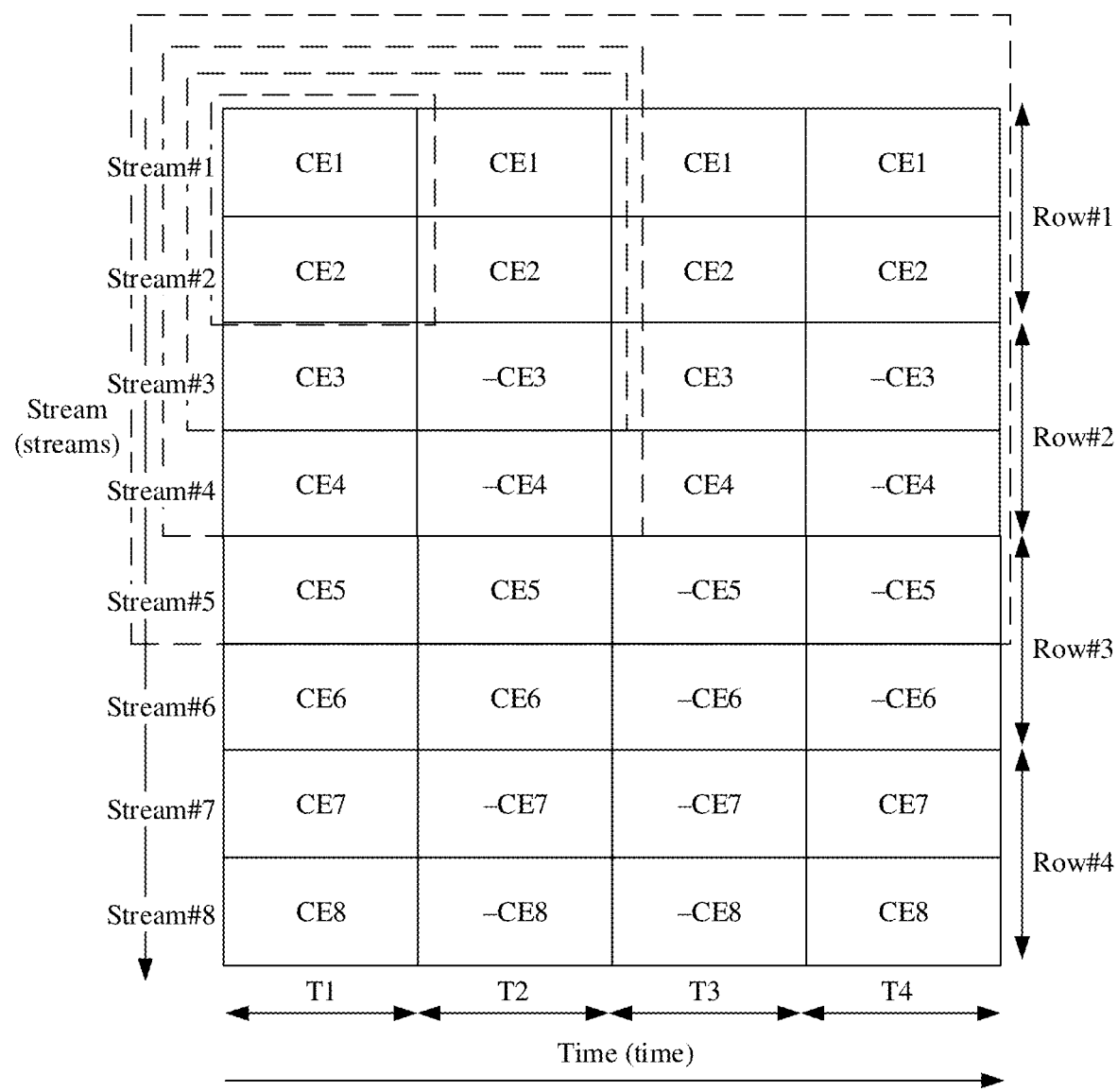
FIG. 4c is a schematic diagram of sending a multi-stream sequence according to an embodiment of this application.

With reference to the formula (5) or formula (6), FIG. 4c is a schematic diagram of transmitting a CE sequence for channel estimation. In FIG. 4c, a horizontal coordinate may represent time (time), and a vertical coordinate may represent a space-time stream (space time stream) (which may also be referred to as a stream for short in FIG. 4c), and FIG. 4c shows a schematic diagram of transmitting a CE sequence in combination with a P-matrix.

Figure 4D:
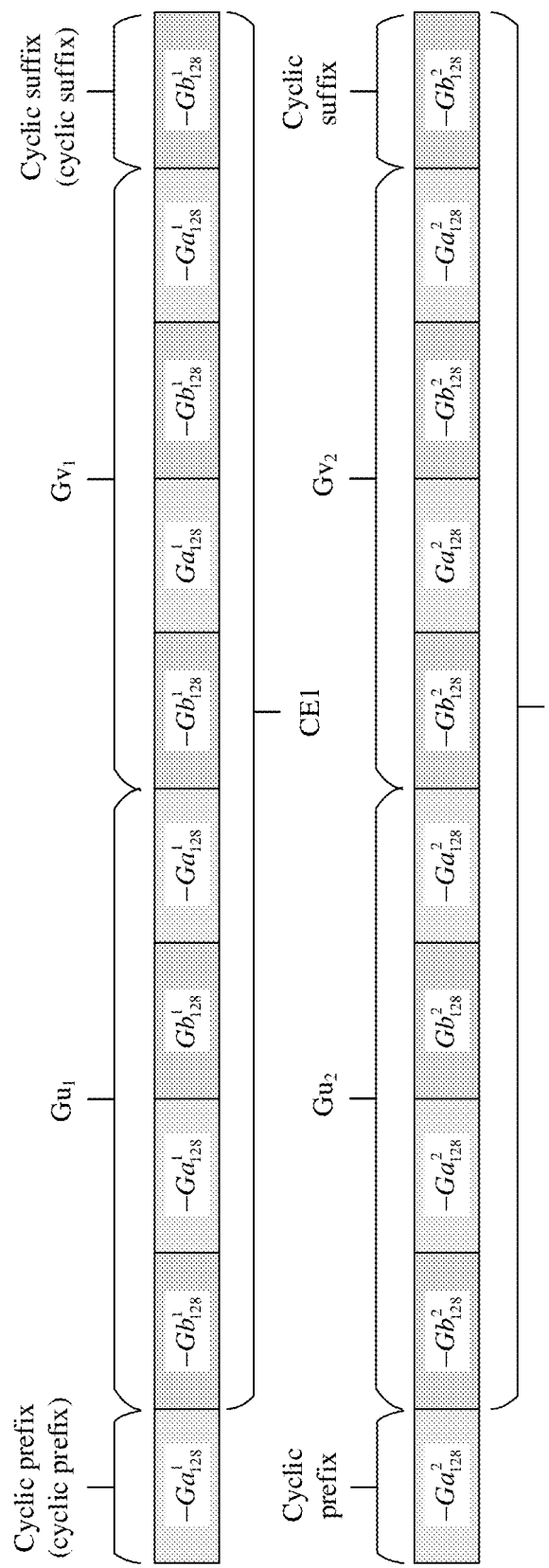
FIG. 4d is a schematic diagram of a structure of a CE sequence according to an embodiment of this application.

As shown in FIG. 4c, when two streams are transmitted for channel estimation, as shown in FIG. 4d, $Gu_1$ and $Gv_1$ are separately obtained based on Golay complementary sequences $Ga_{128}^1$ and $Gb_{128}^1$, and $Gu_2$ and $Gv_2$ are separately obtained based on Golay complementary sequences $Ga_{128}^2$ and $Gb_{128}^2$. In addition, CE sequences of two streams have a same symbol structure, or may be referred to as having a same construction manner. The symbol structure or construction manner shown in this application is positive and negative symbols of Golay complementary sequences forming the CE sequence. For example, a symbol structure of a CE1 sequence is positive and negative symbols of $Ga_{128}^1$ and $Gb_{128}^1$. For another example, a symbol structure of a CE2 sequence is positive and negative symbols of $Ga_{128}^2$ and $Gb_{128}^2$. For ease of description, the following describes the CE sequence provided in this application in a same construction manner.

The following describes in detail a method for performing channel estimation by a receive device based on the CE1 sequence (which may also be referred to as CE1 for short) and the CE2 sequence (which may also be referred to as CE2 for short).

If $C_i(n)$ is set to a combination sequence of a cyclic prefix (cyclic prefix) and CEi, $U_i(n)$ is a sequence that is the same as $C_i(n)$ but whose cyclic prefix and cyclic suffix are both 0. $U_i(n)$ may also be a sequence that is the same as $C_i(n)$ but does not include a cyclic prefix or a cyclic suffix. In a channel estimation process, $U_i(n)$ may be used as a reference sequence for channel estimation. For example, $C_1(n)$ represents a combination sequence of a cyclic prefix and CE1, $C_2(n)$ represents a combination sequence of a cyclic prefix and CE2, $U_1(n)$ represents a combination sequence of a cyclic prefix 0 and CE1, a cyclic suffix in the CE1 sequence is 0, $U_2(n)$ represents a combination sequence of a cyclic prefix 0 and CE2, and a cyclic suffix in the CE2 sequence is 0. For another example, $C_1(n)$ represents a combination sequence of a cyclic prefix and CE1, $C_2(n)$ represents a combination sequence of a cyclic prefix and CE2, $U_1(n)$ is the same as the CE1 sequence, but does not include a cyclic suffix, and $U_2(n)$ is the same as the CE2 sequence, but does not include a cyclic suffix.

In this case, when a transmit device transmits two streams, for example, when channel estimation is performed in time domain, information received by a first antenna may be as follows:

$$y_1 = h_{11} \otimes C_1(n) + h_{12} \otimes C_2(n) + z_1 \quad (7)$$

$h_{11}$ and $h_{12}$ respectively represent channel responses of the first stream and the second stream, $z_1$ represents noise, and $\otimes$ represents a convolution operation. For example, the following formula (8) may be obtained through solution by using a matched filter (or a correlator or the like):

$$\hat{h}_{11} = h_{11} \otimes \underbrace{C_1(n) \otimes U_1(-n)}_{=1} + h_{12} \otimes \underbrace{C_2(n) \otimes U_1(-n)}_{=0} + z_1 \otimes U_1(-n) \quad (8)$$

According to a property of the convolution operation, it can be concluded that $C_1(n) \otimes U_1(-n)$ is actually correlation between $C_1(n)$ and $U_1(n)$, and $\tau$ is set to a value that is translated during correlation. For example, within $-128 \le \tau \le 128$ (that is, a zero-correlation region), according to a property of the Golay complementary sequence, it may be learned that there is a value of $C_1(n) \otimes U_1(-n)$ at only a point of $\tau = 0$ in $-128 \le \tau \le 128$, and all values of $C_2(n) \otimes U_1(-n)$ in the region $-128 \le \tau \le 128$ are 0.

Similarly, the matched filter may also be used for channel estimation on $h_{12}$, as shown below:

$$\hat{h}_{12} = h_{11} \otimes \underbrace{C_1(n) \otimes U_2(-n)}_{=0} + h_{12} \otimes \underbrace{C_2(n) \otimes U_2(-n)}_{=1} + z_2 \otimes U_2(-n) \quad (9)$$

The foregoing is a channel estimation method for transmitting CE sequences of two streams. However, when CE sequences of more than two streams are transmitted, because a ZCC feature does not exist between CE sequences within the length range (for example, −128 to +128) of the Golay complementary sequence, the CE sequences are transmitted in combination with the P-matrix. When three or four streams are transmitted, as shown in FIG. 4c, channel estimation is performed within two periods in combination with the P-matrix. In this case, the P-matrix is shown as follows:

$$P = \begin{bmatrix} +1 & +1 \\ +1 & +1 \\ +1 & -1 \\ +1 & -1 \end{bmatrix} \quad (10)$$

It may be understood that, because symbol structures of CE1 and CE2 are the same, and symbol structures of CE3 and CE4 are the same, the foregoing formula (10) may also be represented as:

$$P = \begin{bmatrix} 1 & 1 \\ 1 & -1 \end{bmatrix} \quad (11)$$

When CE sequences of five, six, seven, or eight streams are transmitted, as shown in FIG. 4c, channel estimation is performed within four periods in combination with the P-matrix. In this case, the P-matrix is shown in the foregoing formula (5) or formula (6).

The foregoing process describes how to implement MIMO channel estimation by using the CE sequence and the P-matrix. As described above, in addition to being used for channel estimation, the sequence in this application may be further used for sensing a target in an environment (for example, WLAN sensing shown above). When sensing a target in an environment, channel estimation may be performed according to the foregoing procedure, and then processing such as multipath elimination and target parameter (time, a distance, and an angle) estimation is further performed based on a result of channel estimation, to implement target sensing.

It may be understood that for a specific procedure or method of channel estimation or target sensing, refer to a related standard or protocol. Details are not described in this application.

It can be learned from the foregoing analysis that, a quantity of orthogonal CE sequences causes different P-matrices. As shown in the method shown above and FIG. 4c, when CE sequences of more than two streams are transmitted, for example, when CE sequences of three or four streams are transmitted, the P-matrix is shown in the formula (10) or formula (11), that is, the transmit device sends the CE sequences within two periods such as T1 and T2, to ensure that the receive device can correctly perform channel estimation. It may be understood that, if the transmit device does not send the CE sequences of the four streams in combination with the P-matrix, for example, sends the CE sequences of the four streams within one period, interference is generated between the CE1 sequence and the CE3 (or CE4) sequence, and interference is generated between the CE2 sequence and the CE3 (or CE4) sequence. As a result, the receive device cannot correctly perform channel estimation. Therefore, when sending the CE sequences of the four streams, the transmit device sends the CE sequences of the four streams within two periods in combination with the P-matrix shown in the foregoing formula (10), to ensure that the four sequences sent by the transmit device can be pairwise orthogonal. It may be understood that the two sequences shown in this application are pairwise orthogonal, or it may be understood that cross-correlation energy between the two sequences within the length range of the Golay complementary sequence is zero.

For another example, when CE sequences of five or six streams are transmitted, the P-matrix is shown in the formula (5) or formula (6), that is, the transmit device transmits the CE sequences within four periods such as T1, T2, T3, and T4, to ensure that the receive device can correctly perform channel estimation. For another example, when CE sequences of seven or eight streams are transmitted, the P-matrix is shown in the formula (5) or formula (6), that is, the transmit device transmits the CE sequence within four periods such as T1 to T4, to ensure that the receive device can correctly perform channel estimation.

In other words, when the CE sequence is sent by using the foregoing method, the transmit device uses more sending periods (or referred to as sending time), to ensure that the receive device can correctly perform multi-stream channel estimation. That is, when channel estimation performed by using the CE sequence includes MIMO channel estimation and target sensing, the transmit device sends the CE sequence in combination with the P-matrix, and also sends the CE sequence within at least two periods. In this way, the receive device can accurately perform channel estimation.

In view of this, this application provides a signal processing method and an apparatus, to reduce a transmission time for sending a CE sequence by a transmit device on a basis that a receive device can correctly perform channel estimation, to improve efficiency of target sensing (including WLAN sensing) or MIMO channel estimation. In addition, according to the method provided in this application, a CE sequence is reconstructed, so that CE sequences of four streams can have a ZCC feature within a length range of a Golay complementary sequence. Therefore, during channel estimation, a dimension of a P-matrix can be improved (for example, dimension reduction is performed on the P-matrix), and a period of sending the CE sequence can be further reduced. Especially, for WLAN sensing, a sensing pulse repetition time may be further reduced by reducing a dimension of the P-matrix. Because the pulse repetition time and a pulse repetition frequency have a reciprocal relationship, the method provided in this application effectively improves a pulse repetition frequency (pulse repetition frequency, PRF) of sensing, and a maximum detectable Doppler/speed in sensing. This can effectively optimize sensing performance.

For example, when CE sequences of three or four streams are sent, cross-correlation energy between a CE1 sequence and a CE2 sequence provided in this application within the length range of the Golay complementary sequence is zero, cross-correlation energy between a CE3 sequence and a CE4 sequence within the length range of the Golay complementary sequence is zero. In addition, cross-correlation energy between the CE1 sequence and the CE3 (or CE4) sequence within the length range of the Golay complementary sequence is zero, and cross-correlation energy between the CE2 sequence and the CE3 (or CE4) sequence within the length range of the Golay complementary sequence is zero. The CE1 sequence, the CE2 sequence, the CE3 sequence, and the CE4 sequence provided in this application are pairwise orthogonal. Therefore, when the transmit device sends the CE sequences of the four streams, the foregoing four CE sequences can be pairwise orthogonal without further combining the P-matrix. In this way, the transmit device can send the CE sequences of the four streams within only one period. This effectively improves efficiency of sending the CE sequence, and further improves efficiency of performing channel estimation by the receive device, a PRF of target sensing, and the like.

For example, when CE sequences of six streams are sent, cross-correlation energy between the CE1 sequence provided in this application and at least three sequences (for example, a CE2 sequence, a CE5 sequence, and a CE6 sequence) within the length range of the Golay complementary sequence is zero. In this case, because cross-correlation energy between the CE1 sequence and the CE3 sequence within the length range of the Golay complementary sequence is not zero, if the CE1 sequence and the CE3 sequence are sent within a same period, interference is generated between the CE1 sequence and the CE3 sequence. As a result, the receive device cannot effectively perform channel estimation. Therefore, in this case, the transmit device may send the CE sequences of the six streams in combination with the P-matrix, for example, send the CE sequences of the six streams within two periods. Therefore, the transmit device can send the CE sequences of the six streams within two periods. Compared with the foregoing case in which the transmit device sends the CE sequences of the six streams within four periods, the method provided in this application effectively improves efficiency of sending the CE sequence, and improves efficiency of performing channel estimation by the receive device, a PRF of target sensing, and the like.

Before the signal processing method provided in this application is described, the following analyzes autocorrelation and cross-correlation properties of the CE sequence in this application, to describe a theoretical basis of the CE sequence constructed in this application.

A length N of the Golay complementary sequence in this application is equal to 128, or N is equal to 256, or N is equal to 512, or the like. A value of N is not limited in this application. Alternatively, N may be equal to 32, 64, or the like.

For example, when N=128, a length range of the Golay complementary sequence may be −128 to +128 (which may include −128 and/or +128). For example, unit lengths (representing a length of a unit) of Golay complementary sequences such as $Ga_{128}^1$ and $Gb_{128}^1$, $Ga_{128}^2$ and $Gb_{128}^2$, $Ga_{128}^3$ and $Gb_{128}^3$, $Ga_{128}^4$ and $Gb_{128}^4$, $Ga_{128}^5$ and $Gb_{128}^5$, $Ga_{128}^6$ and $Gb_{128}^6$, $Ga_{128}^7$ and $Gb_{128}^7$, $Ga_{128}^8$ and $Gb_{128}^8$ are respectively 128. A length range of each Golay complementary sequence is −128 to +128.

That is, when N=128, a range of zero autocorrelation side lobe energy of the CE sequence may be −128 to +128. A range of zero cross-correlation energy between different CE sequences is −128 to +128 (which may include −128 and/or +128).

For example, when N=256, a length range of the Golay complementary sequence may be −256 to +256 (which may include −256 and/or +256). That is, when N=256, a range of zero autocorrelation side lobe energy of the CE sequence may be −256 to +256. A range of zero cross-correlation energy between different CE sequences may be −256 to +256 (which may include −256 and/or +256). For example, when N=512, a length range of the Golay complementary sequence may be −512 to +512 (which may include −512 and/or +512). To be specific, when N=512, a range of zero autocorrelation side lobe energy of the CE sequence may be −512 to +512, and a range of zero cross-correlation energy between different CE sequences may be −512 to +512 (which may include −512 and/or +512). For ease of description, the following describes the method provided in this application by using N=128 as an example, but N=128 should not be understood as a limitation on this application. It may be understood that the length range of the Golay complementary sequence shown in this application may also be understood as a range of a unit length of the Golay complementary sequence. For example, each dashed box shown in FIG. 5a may represent a unit length of the Golay complementary sequence. It may be understood that FIG. 5a shows only three unit lengths as an example, and other length units shown in FIG. 5a are not shown one by one in FIG. 5a.

1. CE Sequence Autocorrelation

It can be learned from the schematic diagram of the result of the CE sequence autocorrelation shown in FIG. 4b that, within the range from −128 to +128, other than the range 0, energy of other ranges within the range from −128 to +128 other than the range 0 is 0. Therefore, after a cyclic prefix is replaced with $0_{128}$ (that is, an all-0 sequence with a length of 128), and a cyclic suffix of the CE sequence is replaced with $0_{128}$, the all-0 sequence is multiplied by the corresponding part of the CE sequence, and a resulting sum is zero.

Figure 5A:
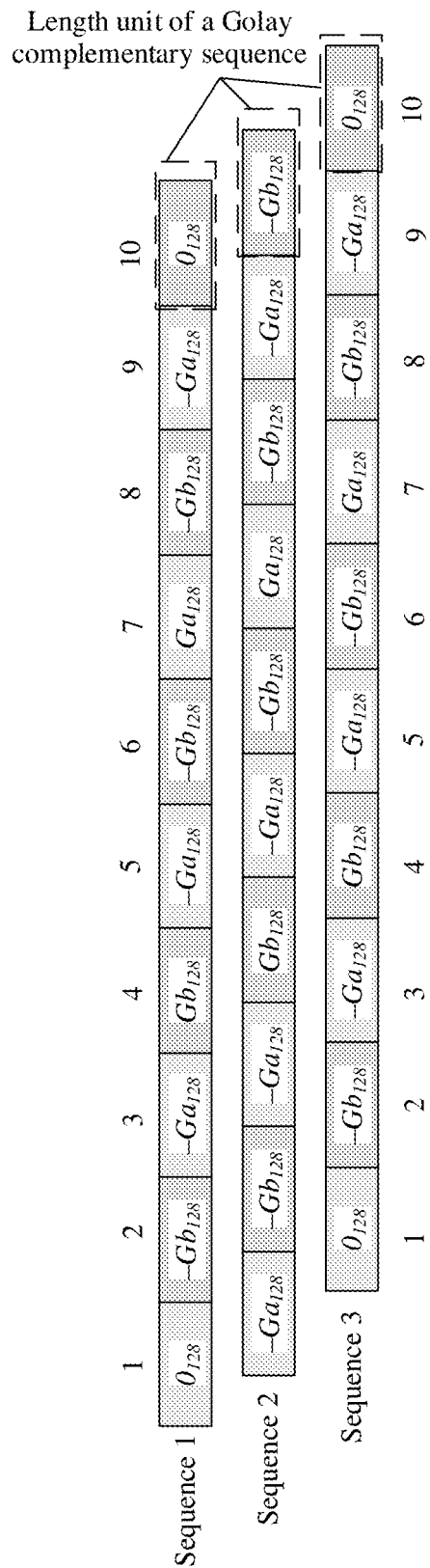
FIG. 5a is a schematic diagram of analyzing CE sequence autocorrelation according to an embodiment of this application.

For example, in FIG. 5a, a sequence 2 is an original CE sequence, and unit lengths (for example, unit lengths corresponding to a cyclic prefix and a unit length corresponding to a cyclic suffix) of Golay complementary sequences at two ends of a sequence that is correlated with the sequence 2 are replaced with 0, to obtain a sequence 1 and a sequence 3. In other words, for the sequence 2, the sequence 1 is translated to the left by n (0<n<128) elements, and the sequence 3 is translated to the right by n (0<n<128) elements.

The sequence 1 is multiplied by a corresponding element of the sequence 2, to obtain a formula (12) and a formula (13). It may be understood that all sequences shown in this application may be understood as row vectors. For example, $(Ga_n^1)^T$ may represent a transposition vector of $Ga_n^1$.

$$Gb_n^2 \times (Ga_n^1)^T - Gb_n^4 \times (Ga_n^3)^T + Gb_n^6 \times (Ga_n^5)^T - Gb_n^8 \times (Ga_n^7)^T = 0$$

$$Ga_n^3 \times (Gb_n^2)^T - Ga_n^5 \times (Gb_n^4)^T - Ga_n^7 \times (Gb_n^6)^T + Ga_n^9 \times (Gb_n^8)^T = 0$$

$$4Gb_m \times (Gb_m)^T + 4Ga_m \times (Ga_m)^T = 0 \quad (12)$$

m=128-n, and in this application, a superscript in formula (12), formula (13), formula (14), and formula (16) in this application represents a location in the CE sequence. That is, the superscript shown herein is different from the superscript shown in another embodiment of this application. For example, the superscript in the foregoing formula (2) and formula (3) represent Golay complementary sequences that form the CE sequence, and different superscripts represent different Golay complementary sequences. In this application, a superscript in formula (12), formula (13), formula (14), and formula (16) represents a location in the CE sequence, and different superscripts represent different locations of the CE sequence.

$$Gb_m^2 \times (Gb_m^2)^T + Gb_m^4 \times (Ga_m^4)^T + Gb_m^6 \times (Gb_m^6)^T + Gb_m^8 \times (Gb_m^8)^T = 4Gb_m \times (Gb_m)^T$$

$$Ga_m^2 \times (Ga_m^2)^T + Ga_m^4 \times (Ga_m^4)^T + Ga_m^6 \times (Ga_m^6)^T + Ga_m^8 \times (Ga_m^8)^T = 4Ga_m \times (Ga_m)^T \quad (13)$$

$4Gb_m \cdot Gb_m + 4Ga_m \cdot Ga_m = 0$ can be obtained from a property of the Golay complementary sequence.

Similarly, the sequence 3 is multiplied by a corresponding element of the sequence 2, and a sum is obtained, that is, a formula (14).

$$-Gb_n^4 \times (Ga_n^3)^T + Gb_n^6 \times (Ga_n^5)^T - Gb_n^8 \times (Ga_n^7)^T + Gb_n^{10} \times (Ga_n^9)^T = 0$$

$$Ga_n^3 \times (Gb_n^2)^T - Ga_n^5 \times (Gb_n^4)^T - Ga_n^7 \times (Gb_n^6)^T + Ga_n^9 \times (Gb_n^8)^T = 0$$

$$4Gb_m \times (Gb_m)^T + 4Ga_m \times (Ga_m)^T = 0 \quad (14)$$

Therefore, it may be learned that, if zero autocorrelation side lobe energy of the CE sequence within the length range of the Golay complementary sequence is used, the formula (12) and formula (14) is met at the same time. It is assumed that a symbol sequence (that is, positive and negative symbols) of the Golay complementary sequence used for constructing the CE sequence is $x(n) = \{a_1, a_2, a_3, a_4, a_5, a_6, a_7, a_8, a_9, a_{10}\}$, where $a_2$ to $a_{10}$ are positive and negative symbols of each unit length of the Golay complementary sequence, for example, $a_1$ corresponds to a cyclic prefix, $a_{10}$ corresponds to a cyclic suffix, and $a_1 = a_9$ and $a_2 = a_{10}$. According to the foregoing case, if a feature that the autocorrelation side lobe energy of the CE sequence within the length range of the Golay complementary sequence is zero is implemented, the symbol sequence meets at least one of the formula (15).

$$a_1 \cdot a_2 + a_3 \cdot a_4 + a_5 \cdot a_6 + a_7 \cdot a_8 = 0$$

$$a_2 \cdot a_3 + a_4 \cdot a_5 + a_6 \cdot a_7 + a_8 \cdot a_9 = 0$$

$$a_3 \cdot a_4 + a_5 \cdot a_6 + a_7 \cdot a_8 + a_9 \cdot a_{10} = 0 \quad (15)$$

Values of $a_1$ to $a_{10}$ are respectively −1 or 1. For example, $a_1$ is −1 or 1, $a_2$ is −1 or 1, and so on, and $a_{10}$ is −1 or 1.

The foregoing derived reference sequence (for example, the sequence 1 in FIG. 5a) is formed by a cyclic prefix of 0 and a CE sequence with a cyclic suffix of 0. If the reference sequence is a CE sequence without a cyclic suffix, the foregoing derivation is also true. For example, the reference sequence shown in this application may be a sequence stored in a device (for example, a receive device) or a sequence stored in a cloud, instead of a sequence sent by another device (for example, a transmit device).

It should be noted that the symbol sequence $y(n) = \{-a_1, -a_2, -a_3, -a_4, -a_5, -a_6, -a_7, -a_8, -a_9, -a_{10}\}$ also falls within the protection scope of this application. A difference between y(n) and x(n) lies only in that phases are opposite, and the CE sequence constructed based on y(n) has the same effect as the CE sequence constructed based on x(n).

For example, $a_1$ represents positive and negative symbols of a cyclic prefix, $a_2$ to $a_5$ represent positive and negative symbols corresponding to a Gu unit, $a_6$ to $a_9$ represent positive and negative symbols corresponding to a Gv unit, $a_{10}$ represents a symbol of a cyclic suffix, and the CE sequence includes Gu, Gv, and a cyclic suffix. Therefore, $a_2$ to $a_{10}$ may correspond to positive and negative symbols of each unit length of the Golay complementary sequence. Values of $a_1$ to $a_{10}$ are shown in Table 1.

TABLE 1

| No. | $a_1$ | $a_2$ | $a_3$ | $a_4$ | $a_5$ | $a_6$ | $a_7$ | $a_8$ | $a_9$ | $a_{10}$ |
|---|---|---|---|---|---|---|---|---|---|---|
| 1 | 1 | 1 | −1 | 1 | −1 | 1 | 1 | 1 | 1 | 1 |
| 2 | 1 | 1 | −1 | 1 | 1 | −1 | 1 | 1 | 1 | 1 |
| 3 | 1 | 1 | 1 | −1 | 1 | −1 | 1 | 1 | 1 | 1 |
| 4 | 1 | 1 | −1 | 1 | 1 | 1 | −1 | 1 | 1 | 1 |
| 5 | 1 | 1 | 1 | −1 | 1 | 1 | −1 | 1 | 1 | 1 |
| 6 | 1 | 1 | 1 | 1 | −1 | 1 | −1 | 1 | 1 | 1 |
| 7 | 1 | 1 | −1 | −1 | −1 | 1 | −1 | 1 | 1 | 1 |
| 8 | 1 | 1 | −1 | 1 | −1 | −1 | −1 | 1 | 1 | 1 |
| 9 | 1 | 1 | −1 | 1 | −1 | 1 | −1 | −1 | 1 | 1 |
| 10 | 1 | 1 | −1 | 1 | 1 | 1 | 1 | −1 | 1 | 1 |
| 11 | 1 | 1 | 1 | −1 | 1 | 1 | 1 | −1 | 1 | 1 |
| 12 | 1 | 1 | 1 | 1 | −1 | 1 | 1 | −1 | 1 | 1 |
| 13 | 1 | 1 | −1 | −1 | 1 | 1 | 1 | −1 | 1 | 1 |
| 14 | 1 | 1 | 1 | 1 | 1 | −1 | −1 | −1 | 1 | 1 |
| 15 | 1 | 1 | 1 | −1 | −1 | −1 | 1 | −1 | 1 | 1 |
| 16 | 1 | 1 | 1 | −1 | −1 | 1 | −1 | −1 | 1 | 1 |
| 17 | 1 | 1 | −1 | 1 | −1 | 1 | −1 | −1 | 1 | 1 |
| 18 | 1 | 1 | −1 | −1 | 1 | −1 | −1 | −1 | 1 | 1 |
| 19 | −1 | 1 | −1 | 1 | 1 | 1 | 1 | 1 | −1 | 1 |
| 20 | −1 | 1 | 1 | −1 | 1 | 1 | 1 | 1 | −1 | 1 |
| 21 | −1 | 1 | 1 | 1 | −1 | 1 | 1 | 1 | −1 | 1 |
| 22 | −1 | 1 | −1 | −1 | −1 | 1 | 1 | 1 | −1 | 1 |
| 23 | −1 | 1 | 1 | 1 | 1 | −1 | 1 | 1 | −1 | 1 |
| 24 | −1 | 1 | 1 | −1 | −1 | −1 | 1 | 1 | −1 | 1 |
| 25 | −1 | 1 | 1 | 1 | 1 | 1 | −1 | 1 | −1 | 1 |
| 26 | −1 | 1 | 1 | −1 | −1 | 1 | −1 | 1 | −1 | 1 |
| 27 | −1 | 1 | −1 | −1 | −1 | −1 | 1 | 1 | −1 | 1 |
| 28 | −1 | 1 | −1 | −1 | 1 | 1 | −1 | 1 | −1 | 1 |
| 29 | −1 | 1 | 1 | 1 | −1 | −1 | −1 | 1 | −1 | 1 |
| 30 | −1 | 1 | 1 | −1 | −1 | −1 | −1 | 1 | −1 | 1 |
| 31 | −1 | 1 | −1 | 1 | 1 | −1 | −1 | 1 | −1 | 1 |
| 32 | −1 | 1 | −1 | 1 | −1 | 1 | −1 | −1 | 1 | 1 |
| 33 | −1 | 1 | 1 | 1 | −1 | −1 | −1 | −1 | 1 | 1 |
| 34 | −1 | 1 | −1 | −1 | −1 | −1 | −1 | −1 | 1 | 1 |
| 35 | −1 | 1 | 1 | −1 | 1 | −1 | −1 | −1 | 1 | 1 |
| 36 | −1 | 1 | −1 | 1 | −1 | −1 | −1 | −1 | 1 | 1 |
| 37 | 1 | −1 | −1 | 1 | 1 | 1 | 1 | 1 | 1 | −1 |
| 38 | 1 | −1 | 1 | −1 | 1 | 1 | 1 | 1 | 1 | −1 |
| 39 | 1 | −1 | 1 | 1 | −1 | 1 | 1 | 1 | 1 | −1 |
| 40 | 1 | −1 | −1 | −1 | −1 | 1 | 1 | 1 | 1 | −1 |
| 41 | 1 | −1 | −1 | 1 | −1 | 1 | 1 | 1 | 1 | −1 |
| 42 | 1 | −1 | 1 | −1 | −1 | 1 | 1 | 1 | 1 | −1 |
| 43 | 1 | −1 | 1 | 1 | 1 | −1 | 1 | 1 | 1 | −1 |
| 44 | 1 | −1 | −1 | −1 | 1 | −1 | 1 | 1 | 1 | −1 |
| 45 | 1 | −1 | 1 | −1 | −1 | −1 | 1 | 1 | 1 | −1 |
| 46 | 1 | −1 | 1 | 1 | 1 | 1 | −1 | 1 | 1 | −1 |
| 47 | 1 | −1 | −1 | −1 | 1 | 1 | −1 | 1 | 1 | −1 |
| 48 | 1 | −1 | −1 | −1 | −1 | 1 | −1 | 1 | 1 | −1 |
| 49 | 1 | −1 | 1 | 1 | 1 | 1 | 1 | −1 | 1 | −1 |
| 50 | 1 | −1 | −1 | −1 | 1 | 1 | 1 | −1 | 1 | −1 |
| 51 | 1 | −1 | 1 | 1 | −1 | −1 | 1 | −1 | 1 | −1 |
| 52 | 1 | −1 | 1 | 1 | −1 | 1 | −1 | −1 | 1 | −1 |
| 53 | 1 | −1 | 1 | −1 | −1 | −1 | −1 | 1 | 1 | −1 |
| 54 | 1 | −1 | 1 | −1 | 1 | −1 | −1 | 1 | 1 | −1 |
| 55 | −1 | −1 | −1 | 1 | 1 | 1 | 1 | 1 | −1 | −1 |
| 56 | −1 | −1 | 1 | −1 | 1 | 1 | 1 | 1 | −1 | −1 |
| 57 | −1 | −1 | 1 | 1 | −1 | 1 | 1 | 1 | −1 | −1 |
| 58 | −1 | −1 | −1 | −1 | −1 | 1 | 1 | 1 | −1 | −1 |
| 59 | −1 | −1 | 1 | 1 | 1 | −1 | 1 | 1 | −1 | −1 |
| 60 | −1 | −1 | 1 | −1 | −1 | 1 | 1 | 1 | −1 | −1 |
| 61 | −1 | −1 | −1 | −1 | 1 | −1 | 1 | 1 | −1 | −1 |
| 62 | −1 | −1 | 1 | −1 | 1 | −1 | −1 | 1 | −1 | −1 |
| 63 | −1 | −1 | 1 | 1 | −1 | −1 | 1 | −1 | −1 | −1 |
| 64 | −1 | −1 | 1 | −1 | 1 | 1 | 1 | −1 | −1 | −1 |
| 65 | −1 | −1 | 1 | 1 | −1 | 1 | 1 | −1 | −1 | −1 |
| 66 | −1 | −1 | 1 | 1 | 1 | −1 | 1 | −1 | −1 | −1 |
| 67 | −1 | −1 | −1 | −1 | 1 | −1 | 1 | −1 | −1 | −1 |
| 68 | −1 | −1 | −1 | 1 | −1 | −1 | 1 | −1 | −1 | −1 |
| 69 | −1 | −1 | 1 | −1 | −1 | −1 | 1 | −1 | −1 | −1 |
| 70 | −1 | −1 | −1 | 1 | −1 | 1 | −1 | −1 | −1 | −1 |
| 71 | −1 | −1 | 1 | −1 | −1 | 1 | −1 | −1 | −1 | −1 |
| 72 | −1 | −1 | 1 | −1 | 1 | −1 | −1 | −1 | −1 | −1 |

Figure 5B:
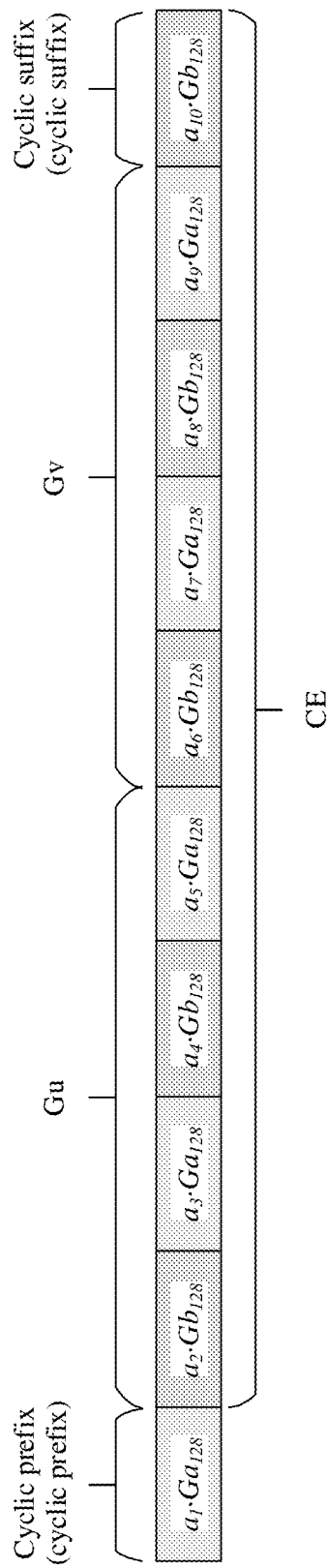
FIG. 5b to FIG. 5d each are a schematic diagram of a structure of a CE sequence according to an embodiment of this application.

With reference to $a_1$ to $a_{10}$ and $Ga_{128}$ and $Gb_{128}$, the CE sequence may be shown in FIG. 5b.

Figure 5C:
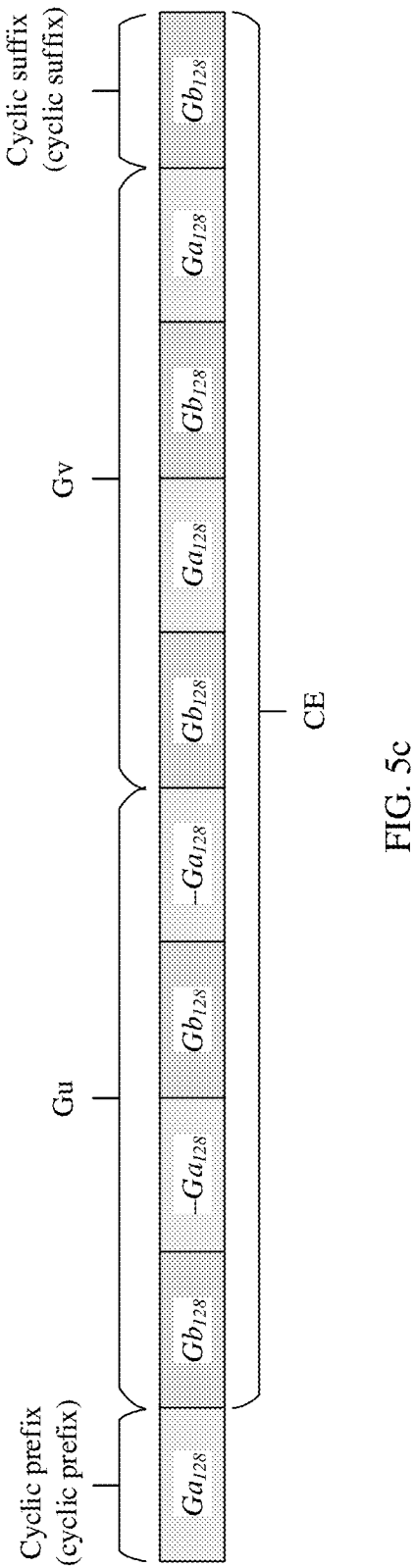

For example, values of $a_1$ to $a_{10}$ are respectively $\{1, 1, -1, 1, -1, 1, 1, 1, 1, 1\}$ (that is, values corresponding to No. 1 in Table 1), and the CE sequence may be shown in FIG. 5c. With reference to FIG. 4c, for example, the transmit device sends the CE sequences of two streams, the CE1 sequence and the CE2 sequence sent by the transmit device each may be shown in FIG. 5d. For example, CE1 represents the CE1 sequence, and CE2 represents the CE2 sequence, and CE1=$\{Ga_{128}^1, Gb_{128}^1, -Ga_{128}^1, Gb_{128}^1, -Ga_{128}^1, Gb_{128}^1, Ga_{128}^1, Gb_{128}^1, Ga_{128}^1, Gb_{128}^1\}$, and CE2=$\{Ga_{128}^2, Gb_{128}^2, -Ga_{128}^2, Gb_{128}^2, -Ga_{128}^2, Gb_{128}^2, Ga_{128}^2, Gb_{128}^2, Ga_{128}^2, Gb_{128}^2\}$. Autocorrelation side lobe energy of the CE1 sequence within the length range of the Golay complementary sequence is zero, autocorrelation side lobe energy of the CE2 sequence within the length range of the Golay complementary sequence is zero, and cross-correlation energy between the CE1 sequence and the CE2 sequence within the length range of the Golay complementary sequence is zero.

For example, values of $a_1$ to $a_{10}$ are respectively $\{1, 1, -1, 1, 1, -1, 1, 1, 1, 1\}$ (that is, values corresponding to No. 2 in Table 1). When the transmit device sends the CE sequences of two streams, CE1=$\{Ga_{128}^1, Gb_{128}^1, -Ga_{128}^1, Gb_{128}^1, Ga_{128}^1, -Gb_{128}^1, Ga_{128}^1, Gb_{128}^1, Ga_{128}^1, Gb_{128}^1\}$, and CE2=$\{Ga_{128}^2, Gb_{128}^2, -Ga_{128}^2, Gb_{128}^2, Ga_{128}^2, -Gb_{128}^2, Ga_{128}^2, Gb_{128}^2, Ga_{128}^2, Gb_{128}^2\}$.

For example, values of $a_1$ to $a_{10}$ are respectively $\{1, 1, 1, -1, 1, -1, 1, 1, 1, 1\}$ (that is, values corresponding to No. 3 in Table 1). When the transmit device sends the CE sequences of two streams, CE1=$\{Ga_{128}^1, Gb_{128}^1, Ga_{128}^1, -Gb_{128}^1, Ga_{128}^1, -Gb_{128}^1, Ga_{128}^1, Gb_{128}^1, Ga_{128}^1, Gb_{128}^1\}$, and CE2=$\{Ga_{128}^1, Gb_{128}^1, Ga_{128}^1, -Gb_{128}^1, Ga_{128}^1, -Gb_{128}^1, Ga_{128}^1, Gb_{128}^1, Ga_{128}^1, Gb_{128}^1\}$.

For example, values of $a_1$ to $a_{10}$ are respectively $\{1, 1, -1, 1, 1, 1, -1, 1, 1, 1\}$ (that is, values corresponding to No. 4 in Table 1). When the transmit device sends the CE sequences of two streams, CE1=$\{Ga_{128}^1, Gb_{128}^1, -Ga_{128}^1, Gb_{128}^1, Ga_{128}^1, Gb_{128}^1, -Ga_{128}^1, Gb_{128}^1, Ga_{128}^1, Gb_{128}^1\}$, and CE2=$\{Ga_{128}^1, Gb_{128}^1, -Ga_{128}^1, Gb_{128}^1, Ga_{128}^1, Gb_{128}^1, -Ga_{128}^1, Gb_{128}^1, Ga_{128}^1, Gb_{128}^1\}$.

It may be understood that the foregoing merely provides four CE sequences corresponding to values of $a_1$ to $a_{10}$ as an example. All CE sequences constructed based on the values of $a_1$ to $a_{10}$ shown in Table 1 fall within the protection scope of this application. This is not listed one by one herein. It may be understood that the foregoing merely shows CE sequences of two streams as an example, and for a CE sequence of one stream, the foregoing method is also applicable. It may be understood that the values of $a_1$ to $a_{10}$ shown above may also be used for constructing a single CE sequence in CE sequences of three streams (or CE sequences of four streams or CE sequences of five streams). For example, the values of $a_1$ to $a_{10}$ shown above may be used for constructing a CE3 sequence in the CE sequences of three streams. For another example, the values of $a_1$ to $a_{10}$ shown above may also be used for constructing a CE5 sequence in the CE sequences of five streams. For another example, the values of $a_1$ to $a_{10}$ shown above may alternatively be used for constructing a CE7 sequence in CE sequences of seven streams. Details are not described herein. In other words, the foregoing method is applicable to a CE sequence of a single stream. When CE sequences of more than two streams are sent, a relationship between CE sequences of more than two streams is not limited in this application. For example, when CE sequences of more than two streams are sent, for a relationship between CE sequences of more than the two streams, refer to the following description of cross-correlation of different CE sequences.

It may be understood that, if the sequence is used for WLAN sensing, all sequences in Table 1 may be applied to TRN for sensing. If an EDMG-STF is used for MIMO channel estimation, because the EDMG-STF ends with $-Ga_{128}$ (that is, ends with a minus sign), to keep compatibility, a sequence of a cyclic prefix formed based on the minus sign may be applied to an EDMG-CEF after the EDMG-STF sequence, as shown in Table 2. In addition, in MIMO channel estimation, at the first moment, the CE sequence may not have a cyclic prefix (that is, may not have $a_1$ in Table 1 or Table 2). Certainly, if a plurality of moments (that is, two or more moments) are used to complete MIMO channel estimation, a cyclic prefix may exist from the second moment.

TABLE 2

| No. | $a_1$ | $a_2$ | $a_3$ | $a_4$ | $a_5$ | $a_6$ | $a_7$ | $a_8$ | $a_9$ | $a_{10}$ |
|---|---|---|---|---|---|---|---|---|---|---|
| 1 | −1 | 1 | −1 | 1 | 1 | 1 | 1 | 1 | −1 | 1 |
| 2 | −1 | 1 | 1 | −1 | 1 | 1 | 1 | 1 | −1 | 1 |
| 3 | −1 | 1 | 1 | 1 | −1 | 1 | 1 | 1 | −1 | 1 |
| 4 | −1 | 1 | −1 | −1 | −1 | 1 | 1 | 1 | −1 | 1 |
| 5 | −1 | 1 | 1 | 1 | 1 | −1 | 1 | 1 | −1 | 1 |
| 6 | −1 | 1 | 1 | −1 | −1 | −1 | 1 | 1 | −1 | 1 |
| 7 | −1 | 1 | 1 | 1 | 1 | 1 | −1 | 1 | −1 | 1 |
| 8 | −1 | 1 | 1 | 1 | −1 | −1 | −1 | 1 | −1 | 1 |
| 9 | −1 | 1 | −1 | −1 | −1 | −1 | −1 | 1 | −1 | 1 |
| 10 | −1 | 1 | 1 | −1 | 1 | 1 | 1 | −1 | −1 | 1 |
| 11 | −1 | 1 | 1 | 1 | −1 | 1 | −1 | −1 | −1 | 1 |
| 12 | −1 | 1 | −1 | −1 | −1 | −1 | 1 | −1 | −1 | 1 |
| 13 | −1 | 1 | −1 | 1 | 1 | 1 | −1 | −1 | −1 | 1 |
| 14 | −1 | 1 | 1 | −1 | 1 | 1 | −1 | −1 | −1 | 1 |
| 15 | −1 | 1 | 1 | 1 | −1 | 1 | −1 | −1 | −1 | 1 |
| 16 | −1 | 1 | −1 | −1 | −1 | 1 | −1 | −1 | −1 | 1 |
| 17 | −1 | 1 | −1 | −1 | 1 | −1 | −1 | −1 | −1 | 1 |
| 18 | −1 | 1 | −1 | 1 | −1 | −1 | −1 | −1 | −1 | 1 |
| 19 | −1 | −1 | −1 | 1 | −1 | 1 | 1 | 1 | −1 | −1 |
| 20 | −1 | −1 | 1 | −1 | −1 | 1 | 1 | 1 | −1 | −1 |
| 21 | −1 | −1 | −1 | 1 | 1 | −1 | 1 | 1 | −1 | −1 |
| 22 | −1 | −1 | −1 | 1 | 1 | 1 | −1 | 1 | −1 | −1 |
| 23 | −1 | −1 | −1 | −1 | −1 | 1 | −1 | 1 | −1 | −1 |
| 24 | −1 | −1 | 1 | 1 | 1 | −1 | 1 | −1 | −1 | −1 |
| 25 | −1 | −1 | −1 | −1 | 1 | −1 | 1 | −1 | −1 | −1 |
| 26 | −1 | −1 | −1 | 1 | −1 | −1 | 1 | −1 | −1 | −1 |
| 27 | −1 | −1 | 1 | −1 | −1 | −1 | −1 | 1 | −1 | −1 |
| 28 | −1 | −1 | 1 | −1 | 1 | 1 | −1 | −1 | −1 | −1 |
| 29 | −1 | −1 | 1 | 1 | −1 | 1 | 1 | −1 | −1 | −1 |
| 30 | −1 | −1 | 1 | 1 | 1 | −1 | 1 | −1 | −1 | −1 |
| 31 | −1 | −1 | −1 | −1 | 1 | −1 | 1 | −1 | −1 | −1 |
| 32 | −1 | −1 | 1 | 1 | −1 | −1 | 1 | −1 | −1 | −1 |
| 33 | −1 | −1 | 1 | −1 | −1 | −1 | 1 | −1 | −1 | −1 |
| 34 | −1 | −1 | −1 | 1 | −1 | 1 | −1 | −1 | −1 | −1 |
| 35 | −1 | −1 | 1 | −1 | 1 | −1 | −1 | −1 | −1 | −1 |
| 36 | −1 | −1 | 1 | 1 | 1 | −1 | −1 | −1 | −1 | −1 |

It may be understood that the sequences in the units shown in FIG. 5a to FIG. 5c are $Ga_{128}$ and $Gb_{128}$ as examples, and are not distinguished between $Ga_{128}^1$ and $Gb_{128}^1$, and between $Ga_{128}^2$ and $Gb_{128}^2$. This is because the method shown above in this application is intended to describe an autocorrelation feature of a CE sequence, and does not focus on a CE sequence.

2. Cross-Correlation of Different CE Sequences

Figures 6A, 6B:
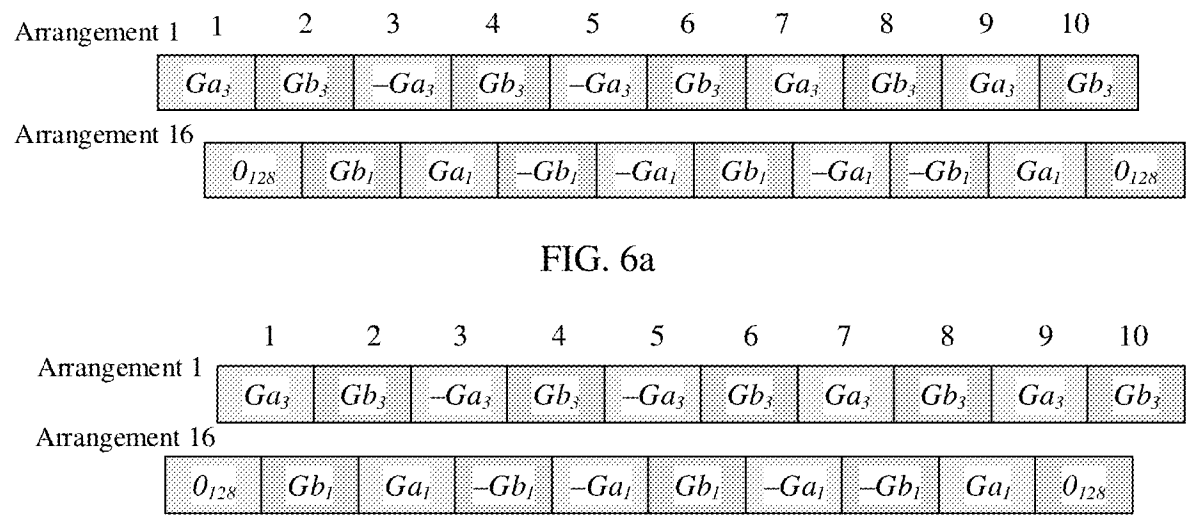

For example, a value corresponding to No. 1 shown in Table 1 is a positive or negative symbol of an arrangement 1 shown in FIG. 6a or FIG. 6b, and a value corresponding to No. 16 shown in Table 1 is a positive or negative symbol of an arrangement 16 shown in FIG. 6a or FIG. 6b. The arrangement 16 is a reference sequence. During correlation in an actual process, the reference sequence does not include a cyclic prefix or a cyclic suffix, and therefore is replaced with 0 herein. It should be noted that when a related operation is performed on a reference sequence that does not include a cyclic prefix or a cyclic suffix, the following derivation is still valid. As shown in FIG. 6a or FIG. 6b, because $Ga_1$ and $Gb_3$, and $Ga_3$ and $Gb_1$ are not Golay complementary sequences, $Ga_1$ and $Gb_3$, and $Ga_3$ and $Gb_1$ is considered as unrelated sequences for elimination, that is, products of corresponding parts are added to zero, to obtain a result that cross-correlation energy within a length range of the Golay complementary sequence is zero. It may be understood that $Ga_1$ and $Gb_3$ and $Ga_3$ and $Gb_1$ shown herein are merely examples. For example, $Ga_1$ and $Gb_1$ may form a CE sequence, and $Ga_3$ and $Gb_3$ may form another CE sequence. In other words, a subscript in a formula (15) shown below has a same meaning as a superscript 1 or 2 in the formula (2) or the formula (3) shown above in this application, but a length N of the Golay complementary sequence is omitted in the formula (15) shown below. It may be understood that $Ga_1$ and $Gb_3$, and $Ga_3$ and $Gb_1$ in this application may be understood as row vectors.

Therefore, according to the sum obtained by multiplying the elements corresponding to FIG. 6a is 0, and the sum obtained by multiplying the elements corresponding to FIG. 6b is 0, $Ga_1$, $Gb_1$, $Ga_3$, and $Gb_3$ may meet at least one of the following:

$$Gb_3^4 \times (Ga_1^3)^T - Gb_3^6 \times (Ga_1^5)^T - Gb_3^8 \times (Ga_1^7)^T + Gb_3^{10} \times (Ga_1^9)^T = 0$$

$$Gb_3^2 \times (Gb_1^2)^T - Gb_3^4 \times (Gb_1^4)^T + Gb_3^6 \times (Gb_1^6)^T - Gb_3^8 \times (Gb_1^8)^T = 0$$

$$-Ga_3^3 \times (Ga_1^3)^T + Ga_3^5 \times (Ga_1^5)^T - Ga_3^7 \times (Ga_1^7)^T + Ga_3^9 \times (Ga_1^9)^T = 0$$

$$-Ga_3^3 \times (Gb_1^2)^T + Ga_3^5 \times (Gb_1^4)^T + Ga_3^7 \times (Gb_1^6)^T - Ga_3^9 \times (Gb_1^8)^T = 0$$

$$Gb_3^2 \times (Ga_1^3)^T - Gb_3^4 \times (Ga_1^5)^T - Gb_3^6 \times (Ga_1^7)^T + Gb_3^8 \times (Ga_1^9)^T = 0$$

$$Ga_3^1 \times (Gb_1^2)^T + Ga_3^3 \times (Gb_1^4)^T - Ga_3^5 \times (Gb_1^6)^T - Ga_3^7 \times (Gb_1^8)^T = 0 \quad (16)$$

A superscript represents a location, and multiplication (for example, x) represents multiplication of two vectors.

In other words, if the foregoing relationship is met, two unrelated sequences may be cross-correlate and have a ZCC feature within the length range of the Golay complementary sequence. It is assumed that positive and negative symbols of the Golay complementary sequence used for constructing a CE sequence are $a(n)=\{a_1, a_2 \ldots a_{10}\}$, and positive and negative symbols of the Golay complementary sequence used for constructing another CE sequence are $b(n)=\{b_1, b_2 \ldots b_{10}\}$, and $a_1=a_9$, $a_2=a_{10}$, $b_1=b_9$, and $b_2=b_{10}$. Values of $a_1$ to $a_{10}$ and $b_1$ to $b_{10}$ are respectively 1 and −1. Therefore, if at least one of the following formula (17) is met, two CE sequences (for example, the CE1 sequence and the CE3 sequence) may have zero cross-correlation energy within the length range of the Golay complementary sequence, that is, the two CE sequences have a ZCC feature within the length range of the Golay complementary sequence.

$$a_4 \cdot b_3 + a_6 \cdot b_5 + a_8 \cdot b_7 + a_{10} \cdot b_9 = 0$$

$$a_2 \cdot b_2 + a_4 \cdot b_4 + a_6 \cdot b_6 + a_8 \cdot b_8 = 0$$

$$a_3 \cdot b_3 + a_5 \cdot b_5 + a_7 \cdot b_7 + a_9 \cdot b_9 = 0$$

$$a_3 \cdot b_2 + a_5 \cdot b_4 + a_7 \cdot b_6 + a_9 \cdot b_8 = 0$$

$$a_2 \cdot b_3 + a_4 \cdot b_5 + a_6 \cdot b_7 + a_8 \cdot b_9 = 0$$

$$a_1 \cdot b_2 + a_3 \cdot b_4 + a_5 \cdot b_6 + a_7 \cdot b_8 = 0 \quad (17)$$

In the formula (17), point multiplication (for example, ·) indicates that a sum is obtained by multiplying corresponding locations of a sequence. It may be understood that the point multiplication shown in this application may also be referred to as a point product, an inner product, a quantity product, or the like.

Figure 6C:
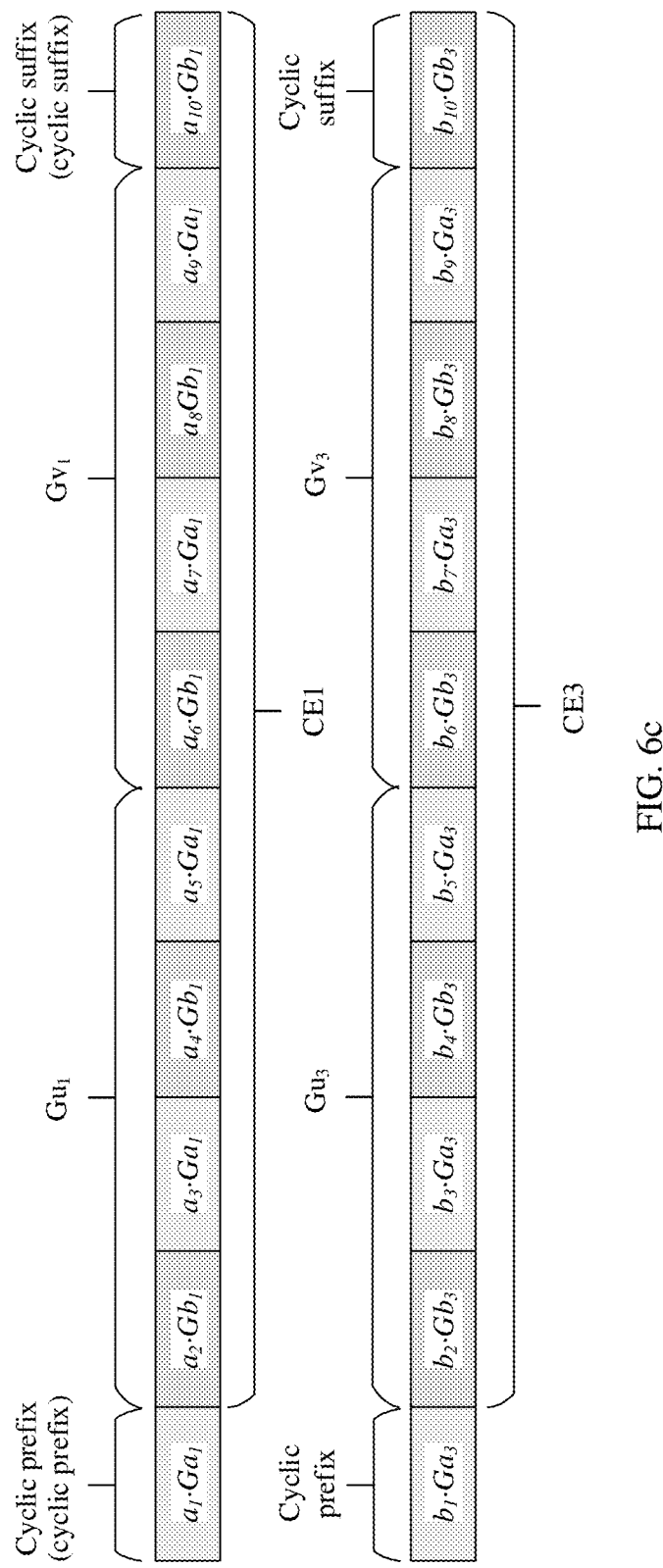
FIG. 6c is a schematic diagram of a structure of a CE sequence according to an embodiment of this application.

As shown in FIG. 6c, although $Ga_1$ and $Gb_3$ are not Golay complementary sequences, and $Ga_3$ and $Gb_1$ are not Golay complementary sequences, by using the foregoing formula (17), two CE sequences that do not have a ZCC feature within the length range of the Golay complementary sequence may have a ZCC feature. In addition, any CE sequence in the two CE sequences is characterized by a feature that autocorrelation side lobe energy within the length range of the Golay complementary sequence is zero. It may be understood that the CE1 sequence and the CE3 sequence shown in FIG. 6c are merely examples, and the CE1 sequence and the CE3 sequence shown in FIG. 6c should not be understood as a limitation on this application.

For example, a relationship between $a_1$ to $a_{10}$ and $b_1$ to $b_{10}$ may be shown in Table 3.

TABLE 3

| No. 1 | No. 2 |
|---|---|
| 1 | 16 |
| 1 | 28 |
| 1 | 45 |
| 1 | 57 |
| 3 | 17 |
| 3 | 29 |
| 3 | 44 |
| 3 | 56 |
| 6 | 13 |
| 6 | 32 |
| 6 | 41 |
| 6 | 60 |
| 8 | 14 |
| 8 | 36 |
| 8 | 37 |
| 8 | 59 |
| 13 | 19 |
| 13 | 54 |
| 13 | 67 |
| 14 | 24 |
| 14 | 49 |
| 14 | 65 |
| 16 | 25 |
| 16 | 48 |
| 16 | 72 |
| 17 | 27 |
| 17 | 46 |
| 17 | 70 |
| 19 | 32 |

TABLE 3-continued

| No. 1 | No. 2 |
|---|---|
| 19 | 41 |
| 19 | 60 |
| 24 | 36 |
| 24 | 37 |
| 24 | 59 |
| 25 | 28 |
| 25 | 45 |
| 25 | 57 |
| 27 | 29 |
| 27 | 44 |
| 27 | 56 |
| 28 | 48 |
| 28 | 72 |
| 29 | 46 |
| 29 | 70 |
| 32 | 54 |
| 32 | 67 |
| 36 | 49 |
| 36 | 65 |
| 37 | 49 |
| 37 | 65 |
| 41 | 54 |
| 41 | 67 |
| 44 | 46 |
| 44 | 70 |
| 45 | 48 |
| 45 | 72 |
| 46 | 56 |
| 48 | 57 |
| 49 | 59 |
| 54 | 60 |
| 56 | 70 |
| 57 | 72 |
| 59 | 65 |
| 60 | 67 |

It may be understood that No. 1 and No. 2 in Table 3 are both numbers in Table 1. For example, if No. 1 represents 1 and No. 2 represents 16, values of $a_1$ to $a_{10}$ may be respectively No. 1 in Table 1, that is, {1, 1, −1, 1, −1, 1, 1, 1, 1, 1}, and values of $b_1$ to $b_{10}$ are respectively No. 16 in Table 1, that is, {1, 1, 1, −1, −1, 1, −1, −1, 1, 1}. For another example, values of $b_1$ to $b_{10}$ may be respectively No. 1 in Table 1, that is, {1, 1, −1, 1, −1, 1, 1, 1, 1, 1}, and values of $a_1$ to $a_{10}$ are respectively No. 16 in Table 1, that is, {1, 1, 1, −1, −1, 1, −1, −1, 1, 1}.

In other words, two CE sequences having no ZCC feature within the length range of the Golay complementary sequence may have the ZCC feature by using the CE sequence constructed in Table 3, that is, cross-correlation energy between the two CE sequences within the length range of the Golay complementary sequence may be zero. It may be understood that No. 1 in Table 3 may correspond to $a_1$ to $a_{10}$, and No. 2 may correspond to $b_1$ to $b_{10}$. Alternatively, No. 1 in Table 3 may correspond to $b_1$ to $b_{10}$, and No. 2 corresponds to $a_1$ to $a_{10}$.

For example, values of $a_1$ to $a_{10}$ are respectively {1, 1, −1, 1, −1, 1, 1, 1, 1, 1} (that is, values corresponding to No. 1 in Table 1), and values of $b_1$ to $b_{10}$ are respectively {1, 1, 1, −1, −1, 1, −1, −1, 1, 1} (that is, values corresponding to No. 16 in Table 1). When the transmit device sends CE sequences of four streams, $CE1 = \{Ga_{128}^1, Gb_{128}^1, -Ga_{128}^1, Gb_{128}^1, -Ga_{128}^1, Gb_{128}^1, Ga_{128}^1, Gb_{128}^1, Ga_{128}^1, Gb_{128}^1\}$, $CE2 = \{Ga_{128}^2, Gb_{128}^2, -Ga_{128}^2, Gb_{128}^2, -Ga_{128}^2, Gb_{128}^2, Ga_{128}^2, Gb_{128}^2, Ga_{128}^2, Gb_{128}^2\}$, $CE3 = \{Ga_{128}^3, Gb_{128}^3, Ga_{128}^3, -Gb_{128}^3, -Ga_{128}^3, Gb_{128}^3, -Ga_{128}^3, -Gb_{128}^3, Ga_{128}^3, Gb_{128}^3\}$, and $CE4 = \{Ga_{128}^4, Gb_{128}^4, Ga_{128}^4, -Gb_{128}^4, -Ga_{128}^4, Gb_{128}^4, -Ga_{128}^4, -Gb_{128}^4, Ga_{128}^4, Gb_{128}^4\}$. Alternatively, $CE1 = \{Ga_{128}^1, Gb_{128}^1, Ga_{128}^1, -Gb_{128}^1, -Ga_{128}^1, Gb_{128}^1, -Ga_{128}^1, -Gb_{128}^1, Ga_{128}^1,$ $Gb_{128}^1$}, CE2={$Ga_{128}^2$, $Gb_{128}^2$, $Ga_{128}^2$, $-Gb_{128}^2$, $-Ga_{128}^2$, $Gb_{128}^2$, $-Ga_{128}^2$, $-Gb_{128}^2$, $Ga_{128}^2$, $Gb_{128}^2$}, CE3={$Ga_{128}^3$, $Gb_{128}^3$, $-Ga_{128}^3$, $Gb_{128}^3$, $-Ga_{128}^3$, $Gb_{128}^3$, $Ga_{128}^3$, $Gb_{128}^3$, $Ga_{128}^3$, $Gb_{128}^3$}, and CE4={$Ga_{128}^4$, $Gb_{128}^4$, $-Ga_{128}^4$, $Gb_{128}^4$, $-Ga_{128}^4$, $Ga_{128}^4$, $Gb_{128}^4$, $Ga_{128}^4$, $Gb_{128}^4$}.

For example, values of $a_1$ to $a_{10}$ are respectively {1, 1, 1, −1, 1, −1, 1, 1, 1} (that is, values corresponding to No. 3 in Table 1), and values of $b_1$ to $b_{10}$ are respectively {1, 1,−1, 1, 1, −1, −1, −1, 1, 1} (that is, values corresponding to No. 17 in Table 1). When the transmit device sends CE sequences of four streams, CE1={$Ga_{128}^1$, $Gb_{128}^1$, $Ga_{128}^1$, $-Gb_{128}^1$, $Ga_{128}^1$, $-Gb_{128}^1$, $Ga_{128}^1$, $Gb_{128}^1$, $Ga_{128}^1$, $Gb_{128}^1$}, CE2={$Ga_{128}^2$, $Gb_{128}^2$, $Ga_{128}^2$, $-Gb_{128}^2$, $Ga_{128}^2$, $-Gb_{128}^2$, $Ga_{128}^2$, $Gb_{128}^2$, $Ga_{128}^2$, $Gb_{128}^2$}, CE3={$Ga_{128}^3$, $Gb_{128}^3$, $-Ga_{128}^3$, $Gb_{128}^3$, $Ga_{128}^3$, $-Gb_{128}^3$, $-Ga_{128}^3$, $-Gb_{128}^3$, $Ga_{128}^3$, $Gb_{128}^3$}, and CE4={$Ga_{128}^4$, $Gb_{128}^4$, $-Ga_{128}^4$, $Gb_{128}^4$, $Ga_{128}^4$, $-Gb_{128}^4$, $-Ga_{128}^4$, $-Gb_{128}^4$, $Ga_{128}^4$, $Gb_{128}^4$}. Alternatively, CE1={$Ga_{128}^1$, $Gb_{128}^1$, $-Ga_{128}^1$, $Gb_{128}^1$, $Ga_{128}^1$, $-Gb_{128}^1$, $-Ga_{128}^1$, $-Gb_{128}^1$, $Ga_{128}^1$, $Gb_{128}^1$}, CE2={$Ga_{128}^2$, $Gb_{128}^2$, $-Ga_{128}^2$, $Gb_{128}^2$, $Ga_{128}^2$, $-Gb_{128}^2$, $-Ga_{128}^2$, $-Gb_{128}^2$, $Ga_{128}^2$, $Gb_{128}^2$}, CE3={$Ga_{128}^3$, $Gb_{128}^3$, $Ga_{128}^3$, $-Gb_{128}^3$, $Ga_{128}^3$, $-Gb_{128}^3$, $Ga_{128}^3$, $Gb_{128}^3$, $Ga_{128}^3$, $Gb_{128}^3$}, and CE4={$Ga_{128}^4$, $Gb_{128}^4$, $Ga_{128}^4$, $-Gb_{128}^4$, $Ga_{128}^4$, $-Gb_{128}^4$, $Ga_{128}^4$, $Gb_{128}^4$, $Ga_{128}^4$, $Gb_{128}^4$}.

It may be understood that the CE sequences shown above are merely examples, and CE sequences corresponding to different values of a(n) and b(n) are not listed one by one herein. Similarly, for specific descriptions of sending CE sequences of five streams, CE sequences of six streams, CE sequences of seven streams, or CE sequences of eight streams by the transmit device, refer to the following descriptions. Details are not described herein again.

The following describes in detail the signal processing method provided in embodiments of this application.

It may be understood that for descriptions of the communication apparatus and a communication system in the signal processing method provided in this application, refer to the foregoing descriptions. Details are not described herein again. It may be understood that the following describes the method provided in embodiments of this application by using an example in which the communication apparatus includes a transmit device and a receive device. The transmit device shown in the following may be understood as a device for sending a PPDU, and the receive device may be understood as a device for receiving a PPDU.

Figure 7:
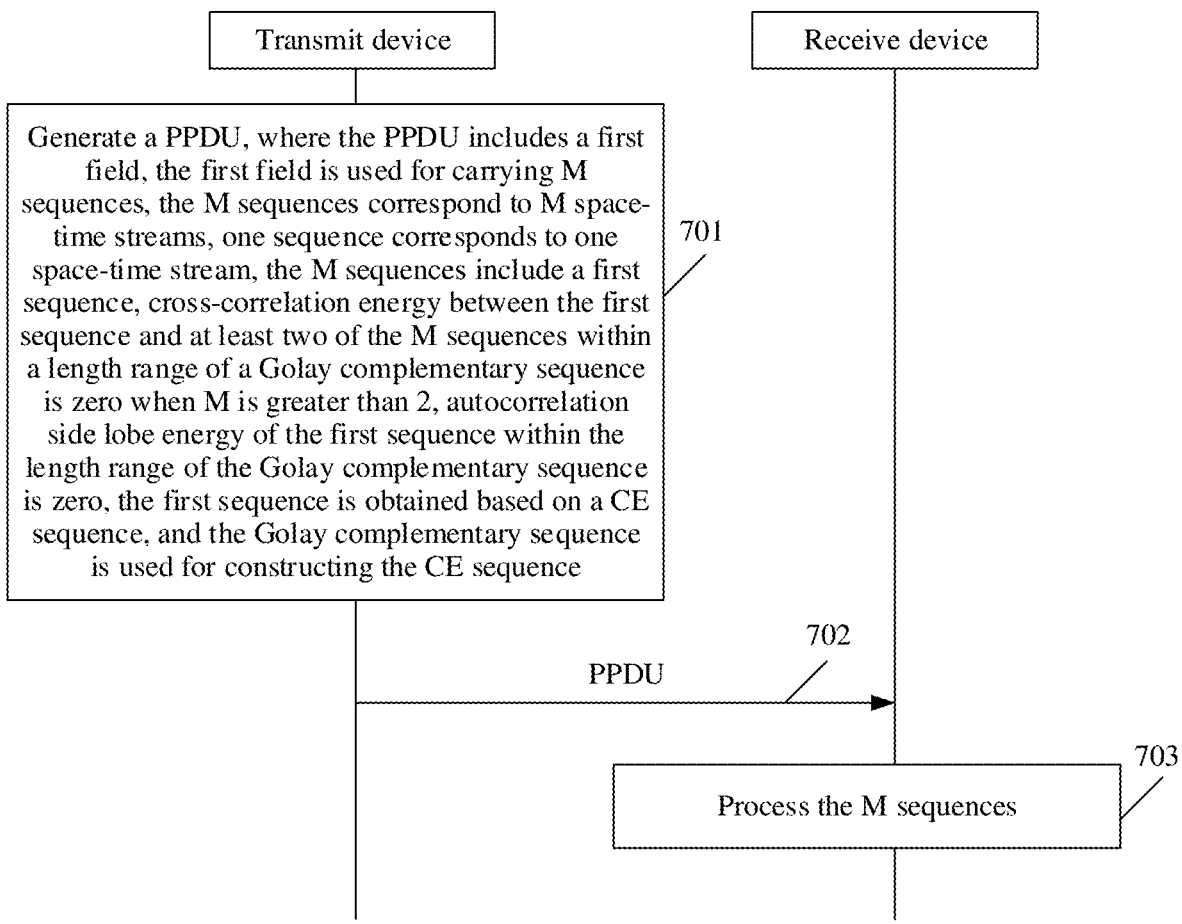
FIG. 7 is a schematic flowchart of a signal processing method according to an embodiment of this application.

FIG. 7 is a schematic flowchart of a signal processing method according to an embodiment of this application. As shown in FIG. 7, the method includes the following steps.

701: A transmit device generates a PPDU, where the PPDU includes a first field, the first field is used for carrying M sequences, the M sequences correspond to M space-time streams, one sequence corresponds to one space-time stream, the M sequences include a first sequence, cross-correlation energy between the first sequence and at least two of the M sequences within a length range of a Golay complementary sequence is zero when M is greater than 2, autocorrelation side lobe energy of the first sequence within the length range of the Golay complementary sequence is zero, the first sequence is obtained based on a CE sequence, and the Golay complementary sequence is used for constructing the CE sequence.

In this embodiment of this application, each sequence in the M sequences may be obtained based on a CE sequence, and the CE sequence may be obtained based on the Golay complementary sequence. It may be understood that, the first sequence shown in this embodiment of this application being obtained based on the CE sequence may be understood as follows: The first sequence is a CE sequence, or the first sequence is different from the CE sequence, but is obtained based on the CE sequence. The autocorrelation side lobe energy of the CE sequence within the length range of the Golay complementary sequence is zero. For descriptions of the autocorrelation, refer to the foregoing description. Details are not described herein again. It may be understood that, when M=1, the first field is used for carrying one sequence, for example, a first sequence. The first sequence may be a CE1 sequence, and the CE1 sequence may be obtained by using a first Golay complementary sequence, for example, $Ga_{128}^1$ and $Gb_{128}^1$. When M=2, the first field is used for carrying two sequences, for example, a sequence 1 and a sequence 2. The sequence 1 may be a CE1 sequence. The CE1 sequence may be obtained based on a Golay complementary sequence, for example, $Ga_{128}^1$ and $Gb_{128}^1$. The sequence 2 may be a CE2 sequence. The CE2 sequence may be obtained based on a Golay complementary sequence, for example, $Ga_{128}^2$ and $Gb_{128}^2$. When M=2, for example, the sequence 1 may be referred to as a first sequence, and $Ga_{128}^1$ and $Gb_{128}^1$ may be referred to as a first Golay complementary sequence. Alternatively, for another example, the sequence 2 may be referred to as a first sequence, and $Ga_{128}^2$ and $Gb_{128}^2$ may be referred to as a first Golay complementary sequence. In other words, the first sequence may be either the sequence 1 or the sequence 2. It may be understood that for descriptions of positive and negative symbols of $Ga_{128}^1$ and $Gb_{128}^1$ (for example, the first symbol sequence) and positive and negative symbols of $Ga_{128}^2$ and $Gb_{128}^1$, refer to descriptions in other parts of this application. Details are not described herein again.

The following describes in detail the cross-correlation in embodiments of this application.

For example, when M=3, the first field may be used for carrying three sequences. For example, the three sequences are respectively a sequence 1, a sequence 2, and a sequence 3. For example, the sequence 1 may be a CE1 sequence, the sequence 2 may be a CE2 sequence, and the sequence 3 may be a CE3 sequence. In this embodiment of this application, cross-correlation energy between the CE1 sequence and the CE2 sequence within the length range of the Golay complementary sequence is zero, or it may be referred to that the CE1 sequence and the CE2 sequence have a ZCC feature within the length range of the Golay complementary sequence, or it may be referred to that the CE1 sequence and the CE2 sequence are orthogonal within the length range of the Golay complementary sequence. Therefore, the cross-correlation energy between the sequence 1 and the sequence 2 within the length range of the Golay complementary sequence is zero, and cross-correlation energy between the CE1 sequence and the CE3 sequence within the length range of the Golay complementary sequence is zero. Therefore, cross-correlation energy between the sequence 1 and the sequence 3 within the length range of the Golay complementary sequence is zero, and cross-correlation energy between the CE2 sequence and the CE3 sequence within the length range of the Golay complementary sequence is zero. Therefore, cross-correlation energy between the sequence 2 and the sequence 3 within the length range of the Golay complementary sequence is zero. It may be understood that the sequence 1 may be referred to as a first sequence, and the sequence 3 may be referred to as a second sequence. For example, the sequence 3 may be a CE3 sequence, and the CE3 sequence may be obtained based on a second Golay complementary sequence, for example, $Ga_{128}^3$ and $Gb_{128}^3$. For descriptions of positive and negative symbols of $Ga_{128}^1$ and $Gb_{128}^1$ (for example, the first symbol sequence) and positive and negative symbols of $Ga_{128}^2$ and $Gb_{128}^2$ and positive and negative symbols of $Ga_{128}^3$ and $Gb_{128}^3$ (for example, the second symbol sequence), refer to descriptions in other parts of this application. Details are not described herein again.

For example, when M=4, the first field may be used for carrying four sequences. For example, the four sequences are respectively a sequence 1, a sequence 2, a sequence 3, and a sequence 4, and the sequence 4 is a CE4 sequence. For descriptions of the sequence 1 to the sequence 3, refer to the foregoing descriptions. Details are not described herein again. In this embodiment of this application, cross-correlation energy between the CE1 sequence and the CE4 sequence within the length range of the Golay complementary sequence is zero, cross-correlation energy between the CE2 sequence and the CE4 sequence within the length range of the Golay complementary sequence is zero, and cross-correlation energy between the CE3 sequence and the CE4 sequence within the length range of the Golay complementary sequence is zero. Therefore, cross-correlation energy between the sequence 1 and the sequence 4 within the length range of the Golay complementary sequence is zero, cross-correlation energy between the sequence 2 and the sequence 4 within the length range of the Golay complementary sequence is zero, and cross-correlation energy between the sequence 3 and the sequence 4 within the length range of the Golay complementary sequence is zero. It may be understood that any one of the sequence 3 or the sequence 4 may be referred to as a second sequence. It should be noted that descriptions of the first sequence and the second sequence in this embodiment of this application are merely examples. For example, when M=4, any one of the sequence 3 or the sequence 4 may be referred to as the first sequence, and any one of the sequence 1 or the sequence 2 is referred to as the second sequence.

It may be understood that when M=1, M=2, M=3, or M=4, the reason why the sequence 1 is a CE1 sequence, the sequence 2 is a CE2 sequence, the sequence 3 is a CE3 sequence, and the sequence 4 is a CE4 sequence is that cross-correlation energy between any two CE sequences between the CE1 sequence and the CE4 sequence provided in this application within the length range of the Golay complementary sequence is zero. When the transmit device sends the sequence, the P-matrix may be shown in the following formula (18), that is, each row of elements in the P-matrix is +1. Therefore, after obtaining the CE1 sequence to the CE4 sequence, the transmit device may directly send the CE1 sequence to the CE4 sequence.

When M is greater than 4, for example, when M=5, the sequence 5 is obtained based on the CE5 sequence because the transmit device sends the sequence 5 in combination with the P-matrix. In this case, when the P-matrix is the formula (19) shown below, the sequence 5 may be obtained based on the CE5 sequence, and the sequence 6 may be obtained based on the CE6 sequence. Alternatively, when the P-matrix is the formula (20) shown below, the sequence 3 may be obtained based on the CE3 sequence, the sequence 4 may be obtained based on the CE4 sequence, the sequence 5 is obtained based on the CE5 sequence, and the sequence 6 is obtained based on the CE6 sequence. Alternatively, when the P-matrix is the formula (21) shown below, the sequence 3 may be obtained based on the CE3 sequence, the sequence 4 may be obtained based on the CE4 sequence, the sequence 5 may be obtained based on the CE5 sequence, and the sequence 6 may be obtained based on the CE6 sequence. It may be understood that, to avoid repetition, a relationship between a sequence and a CE sequence is not described in detail in the following. For brevity, in this application, an example in which a sequence is obtained based on a CE sequence is used to describe the method provided in this embodiment of this application.

For example, when M=5, the first field may be used for carrying five sequences. For example, the five sequences are respectively a sequence 1 to a sequence 5, the sequence 5 may be obtained based on a CE5 sequence, and the CE5 sequence may be obtained based on $Ga_{128}^5$ and $Gb_{128}^5$. For example, the CE5 sequence may separately have zero cross-correlation energy with the CE4 sequence, the CE3 sequence, and the CE1 sequence within the length range of the Golay complementary sequence, and the sequence 5 may separately have zero cross-correlation energy with the sequence 4, the sequence 3, and the sequence 1 within the length range of the Golay complementary sequence. It may be understood that, the CE5 sequence shown herein separately having zero cross-correlation energy with the CE4 sequence, the CE3 sequence, and the CE1 sequence within the length range of the Golay complementary sequence is merely an example. For example, alternatively, the CE5 sequence may separately have zero cross-correlation energy with the CE1 sequence and the CE2 sequence within the length range of the Golay complementary sequence. For another example, alternatively, the CE5 sequence may separately have zero cross-correlation energy with the CE3 sequence and the CE4 sequence within the length range of the Golay complementary sequence. Details are not described herein again.

For example, when M=6, the first field may be used for carrying six sequences. For example, the six sequences are respectively a sequence 1 to a sequence 6, the sequence 6 may be obtained based on the CE6 sequence, and the CE6 sequence may be obtained based on $Ga_{128}^6$ and $Gb_{128}^6$. For example, the CE6 sequence may separately have zero cross-correlation energy with the CE3 sequence, the CE4 sequence, and the CE5 sequence within the length range of the Golay complementary sequence, and the sequence 6 may separately have zero cross-correlation energy with the sequence 3, the sequence 4, and the sequence 5 within the length range of the Golay complementary sequence. For example, if the sequence 1 is referred to as a first sequence, any one of the sequence 3 to the sequence 6 may be referred to as a second sequence. It should be noted that the first sequence and the second sequence shown in this application are merely examples. A specific name of another sequence in the M sequences is not limited in this embodiment of this application. For example, names of the M sequences may alternatively be the sequence 1, the sequence 2, the sequence 3, or the like as shown above. It may be understood that descriptions of the first sequence and the second sequence are not described in detail in the following. For a specific description of M=6, refer to the description of M=5. Details are not described in this embodiment of this application.

For example, when M=8, the first field may be used for carrying eight sequences. For example, the eight sequences are respectively a sequence 1 to a sequence 8. For example, the sequence 7 may be obtained based on a CE7 sequence, and the CE7 sequence may be obtained based on a Golay complementary sequence $Ga_{128}^7$ and $Gb_{128}^7$. The sequence 8 may be obtained based on the CE8 sequence, and the CE8 sequence may be obtained based on the Golay complementary sequence $Ga_{128}^8$ and $Gb_{128}^8$. For example, the CE8 sequence may separately have zero cross-correlation energy with the CE7 sequence, the CE1 sequence, and the CE2 sequence within the length range of the Golay complementary sequence. Therefore, the sequence 8 may separately have zero cross-correlation energy with the sequence 7, the sequence 1, and the sequence 2 within the length range of the Golay complementary sequence. For another example, the CE8 sequence may separately have zero cross-correlation energy with the CE5 sequence, the CE6 sequence, and the CE7 sequence within the length range of the Golay complementary sequence. Therefore, the sequence 8 may separately have zero cross-correlation energy with the sequence 5, the sequence 6, and the sequence 7 within the length range of the Golay complementary sequence. For another example, the CE8 sequence may separately have zero cross-correlation energy with the CE7 sequence, the CE3 sequence, and the CE4 sequence within the length range of the Golay complementary sequence. Therefore, the sequence 8 may separately have zero cross-correlation energy with the sequence 7, the sequence 3, and the sequence 4 within the length range of the Golay complementary sequence. It may be understood that the CE8 shown herein is merely an example. For specific descriptions of the CE1 to the CE7, refer to the descriptions of the CE8. Details are not described in this embodiment of this application. For descriptions of positive and negative symbols of the foregoing Golay complementary sequences, refer to descriptions in other parts of this application. Details are not described herein again. It may be understood that for specific descriptions of the CE1 sequence to the CE8 sequence, refer to descriptions in other parts of this application. Details are not described herein again.

For example, for specific descriptions of the autocorrelation feature of each CE sequence or the cross-correlation features between different CE sequences, refer to the foregoing embodiments. Similarly, for descriptions of the autocorrelation feature of the sequences in the M sequences or the cross-correlation features between different sequences in the M sequences, refer to the foregoing descriptions of the CE sequences. Details are not described herein again. For example, for a specific sequence of each CE sequence, refer to the foregoing embodiments and the following embodiments.

In this embodiment of this application, when M is greater than 4, the transmit device may further send the CE sequence in combination with the P-matrix. To be specific, when M is greater than 4, the first sequence may be obtained based on the CE sequence and the P-matrix. For specific descriptions of the P-matrix, refer to descriptions in other parts of this application. Details are not described herein again.

In this embodiment of this application, the first field may be a TRN in a PPDU, or the first field may be an EDMG-CEF in a PPDU, or the first field may be an LTF in a PPDU. For example, the CE sequence may be carried in a TRN in the 802.11ay SC PHY, and the TRN may be used for target sensing, beam training, and the like. For another example, the CE sequence may be carried in an EDMG-CEF in the 802.11ay SC PHY, and the EDMG-CEF may be used for (MIMO) channel estimation. For another example, the CE sequence may be carried in a TRN in 802.11ad, and the TRN may be used for target sensing and beam training. For another example, the CE sequence may be carried in a DMG-CEF in 802.11ad, and the DMG-CEF may be used for channel estimation.

The M sequences shown in this application may be used for channel estimation, target sensing, or the like. For a specific function of the M sequences, refer to a function of a CE sequence described in other parts of this application. Details are not described herein again.

702: The transmit device sends the PPDU. Correspondingly, a receive device receives the PPDU.

703: The receive device performs signal processing based on the M sequences.

For example, the receive device performs channel estimation or target sensing based on the M sequences. Details are not described herein again.

For example, when M=1 or M=2, the receive device may perform channel estimation or target sensing on the CE sequence. For another example, when M=5 or M=6, the receive device may perform channel estimation, target sensing, or the like based on the M sequences received by the receive device.

According to the method provided in this embodiment of this application, time of sending a sequence by the transmit device can be effectively shortened, and efficiency of channel estimation performed by the receive device, a PRF of target sensing, or the like can also be improved.

The following separately describes CE sequences provided in embodiments of this application with reference to different quantities of streams.

1. One Spatial Stream/Two Spatial Streams (First Stream/Two Streams for Short)

In this embodiment of this application, a transmit device may send one CE sequence such as a CE1 sequence (that is, one stream), or may send two CE sequences (that is, two streams) such as a CE1 sequence and a CE2 sequence. Positive and negative symbols that form the CE1 sequence may be obtained based on Table 1. That is, there may be 72 options for positive and negative symbols of the CE1 sequence provided in this application.

It can be learned from the foregoing description of autocorrelation of the CE sequence that, even if the CE1 sequence and the CE2 sequence are simultaneously sent, the CE1 sequence has a feature of zero autocorrelation side lobe energy within a length range of a Golay complementary sequence, and the CE2 sequence also has a feature of zero autocorrelation side lobe energy within the length range of the Golay complementary sequence. Therefore, after receiving the PPDU, a receive device may perform channel estimation based on the CE1 sequence and the CE2 sequence that are obtained by the receive device. For a channel estimation method, refer to descriptions of the foregoing formula (7) to formula (9). Details are not described herein again.

Figure 5D:
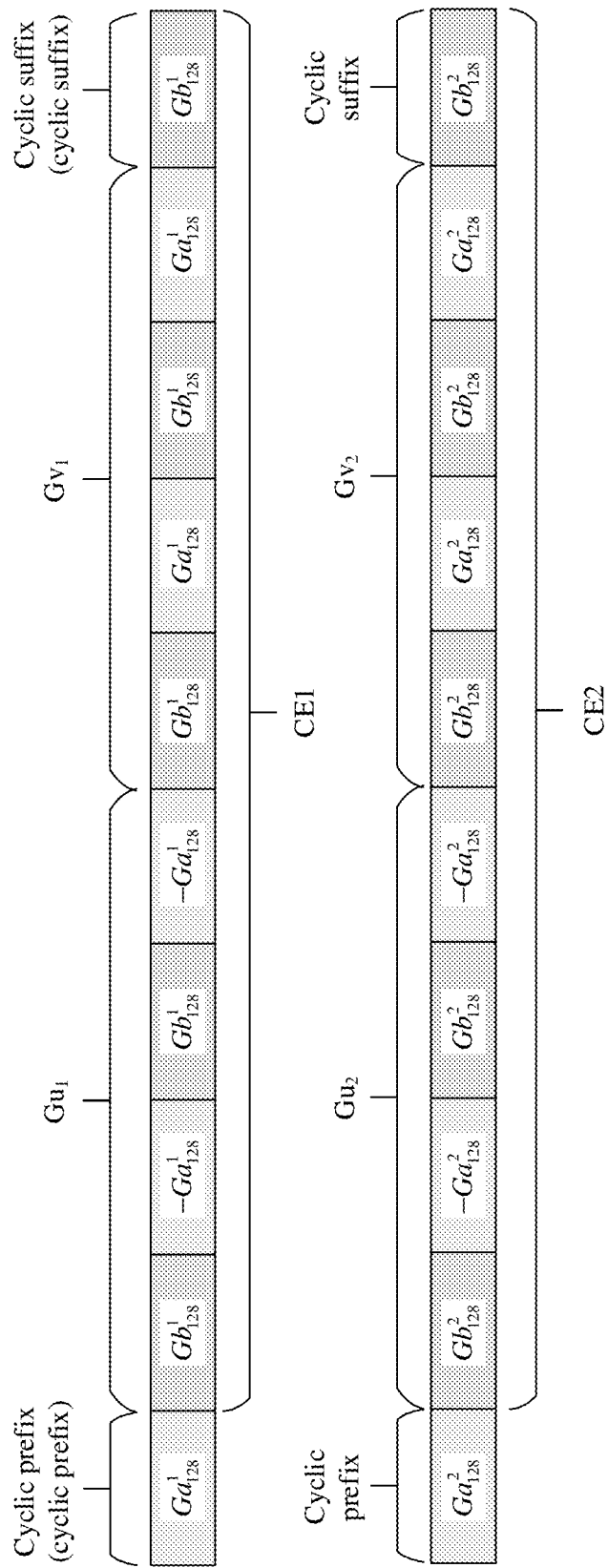

It may be understood that for specific descriptions of the CE1 sequence and the CE2 sequence, refer to the foregoing descriptions in FIG. 5d. Details are not described herein again.

In this embodiment of this application, the transmit device generates and sends a physical layer protocol data unit PPDU, where the PPDU includes a first field, the first field is used for carrying M sequences, the M sequences correspond to M space-time streams, one sequence corresponds to one space-time stream, and M is a positive integer; and the receive device receives the PPDU and performs signal processing based on the M sequences.

For example, when M=1, a sequence carried in the first field may be the same as the CE1 sequence. For example, the first sequence=$\{Ga_{128}^1, Gb_{128}^1, -Ga_{128}^1, Gb_{128}^1, -Ga_{128}^1, Gb_{128}^1, Ga_{128}^1, Gb_{128}^1, Ga_{128}^1, Gb_{128}^1\}$ (for example, values of $a_1$ to $a_{10}$ corresponding to No. 1 in Table 1). For another example, the first sequence=$\{Ga_{128}^1, Gb_{128}^1, -Ga_{128}^1, Gb_{128}^1, Ga_{128}^1, -Gb_{128}^1, Ga_{128}^1, Gb_{128}^1, Ga_{128}^1, Gb_{128}^1\}$ (for example, values of $a_1$ to $a_{10}$ corresponding to No. 2 in Table 1). For another example, the first sequence=$\{Ga_{128}^1, Gb_{128}^1, Ga_{128}^1, -Gb_{128}^1, Ga_{128}^1, -Gb_{128}^1, Ga_{128}^1, Gb_{128}^1, Ga_{128}^1, Gb_{128}^1\}$ (for example, values of $a_1$ to $a_{10}$ corresponding to No. 3 in Table 1). For another example, the first sequence={$Ga_{128}^1$, $Gb_{128}^1$, $-Ga_{128}^1$, $Gb_{128}^1$, $Ga_{128}^1$, $Gb_{128}^1$, $-Ga_{128}^1$, $Gb_{128}^1$, $Ga_{128}^1$, $Gb_{128}^1$} (for example, values of $a_1$ to $a_{10}$ corresponding to No. 4 in Table 1).

For example, when M=2, two sequences may be carried in the first field. For example, the two sequences may be a sequence 1 and a sequence 2. The sequence 1={$Ga_{128}^1$, $-Gb_{128}^1$, $Ga_{128}^1$, $-Gb_{128}^1$, $Ga_{128}^1$, $Gb_{128}^1$, $Ga_{128}^1$, $Gb_{128}^1$, $Ga_{128}^1$, $-Gb_{128}^1$} (for example, values of $a_1$ to $a_{10}$ corresponding to No. 37 in Table 1), and the sequence 2={$Ga_{128}^2$, $-Gb_{128}^2$, $Ga_{128}^2$, $-Gb_{128}^2$, $Ga_{128}^2$, $Gb_{128}^2$, $Ga_{128}^2$, $Gb_{128}^2$, $Ga_{128}^2$, $-Gb_{128}^2$}. For another example, the sequence 1={$Ga_{128}^1$, $-Gb_{128}^1$, $Ga_{128}^1$, $Gb_{128}^1$, $-Ga_{128}^1$, $Gb_{128}^1$, $Ga_{128}^1$, $Gb_{128}^1$, $Ga_{128}^1$, $-Gb_{128}^1$} (for example, values of $a_1$ to $a_{10}$ corresponding to No. 38 in Table 1), and the sequence 2={$Ga_{128}^2$, $-Gb_{128}^2$, $Ga_{128}^2$, $Gb_{128}^2$, $-Ga_{128}^2$, $Gb_{128}^2$, $Ga_{128}^2$, $Gb_{128}^2$, $Ga_{128}^2$, $-Gb_{128}^2$}. For another example, the sequence 1={$Ga_{128}^1$, $-Gb_{128}^1$, $Ga_{128}^1$, $Gb_{128}^1$, $Ga_{128}^1$, $-Gb_{128}^1$, $Ga_{128}^1$, $Gb_{128}^1$, $Ga_{128}^1$, $-Gb_{128}^1$} (for example, values of $a_1$ to $a_{10}$ corresponding to No. 39 in Table 1), and the sequence 2={$Ga_{128}^2$, $-Gb_{128}^2$, $Ga_{128}^2$, $Gb_{128}^2$, $Ga_{128}^2$, $-Gb_{128}^2$, $Ga_{128}^2$, $Gb_{128}^2$, $Ga_{128}^2$, $-Gb_{128}^2$}. For another example, the sequence 1={$Ga_{128}^1$, $-Gb_{128}^1$, $-Ga_{128}^1$, $-Gb_{128}^1$, $Ga_{128}^1$, $-Gb_{128}^1$, $Ga_{128}^1$, $Gb_{128}^1$, $Ga_{128}^1$, $-Gb_{128}^1$} (for example, values of $a_1$ to $a_{10}$ corresponding to No. 40 in Table 1), and the sequence 2={$Ga_{128}^2$, $-Gb_{128}^2$, $-Ga_{128}^2$, $-Gb_{128}^2$, $Ga_{128}^2$, $-Gb_{128}^2$, $Ga_{128}^2$, $Gb_{128}^2$, $Ga_{128}^2$, $-Gb_{128}^1$}.

It should be noted that descriptions of the M sequences shown herein are merely examples. When M=1 or M=2, a specific example of the sequence carried in the first field may alternatively be obtained based on Table 1 and the Golay complementary sequence. It may be understood that the sequence 1 or the sequence 2 may be referred to as a first sequence. For example, the sequence 1 is referred to as a first sequence, and $Ga_{128}^1$ and $Gb_{128}^1$ may be referred to as a first Golay complementary sequence. For another example, when the sequence 2 is referred to as a first sequence, $Ga_{128}^2$ and $Gb_{128}^2$ may be referred to as a first Golay complementary sequence.

2. Three Streams/Four Streams

In this embodiment of this application, the transmit device may send three CE sequences, such as a CE1 sequence, a CE2 sequence, and a CE3 sequence (that is, three streams), or may send four CE sequences, such as a CE1 sequence, a CE2 sequence, a CE3 sequence, and a CE4 sequence (that is, four streams).

The following mainly uses the CE1 sequence to the CE4 sequence as an example to describe a CE sequence construction method provided in this embodiment of this application.

Figure 8A:
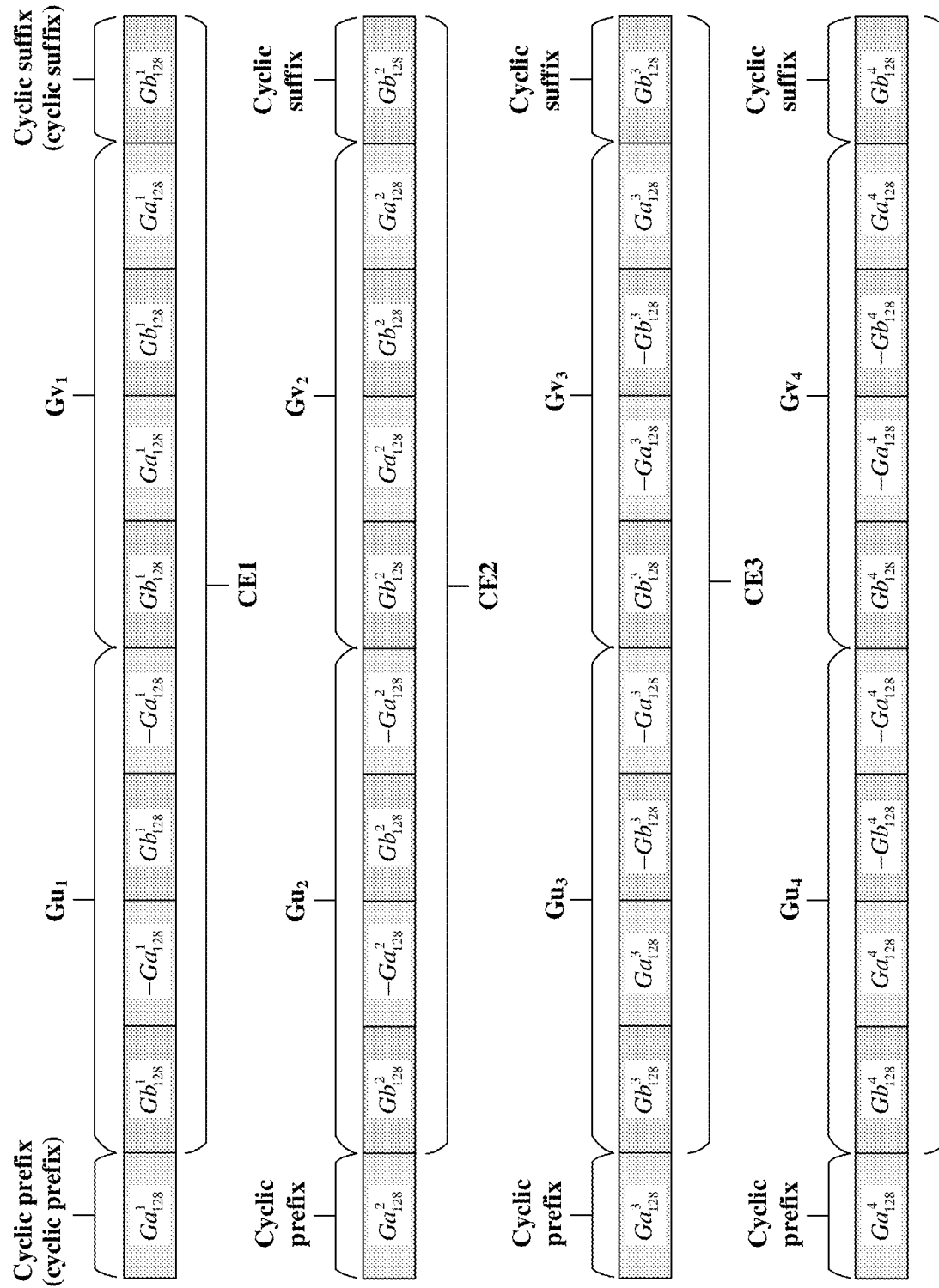
FIG. 8a is a schematic diagram of a structure of a CE sequence according to an embodiment of this application.
Figure 8B:
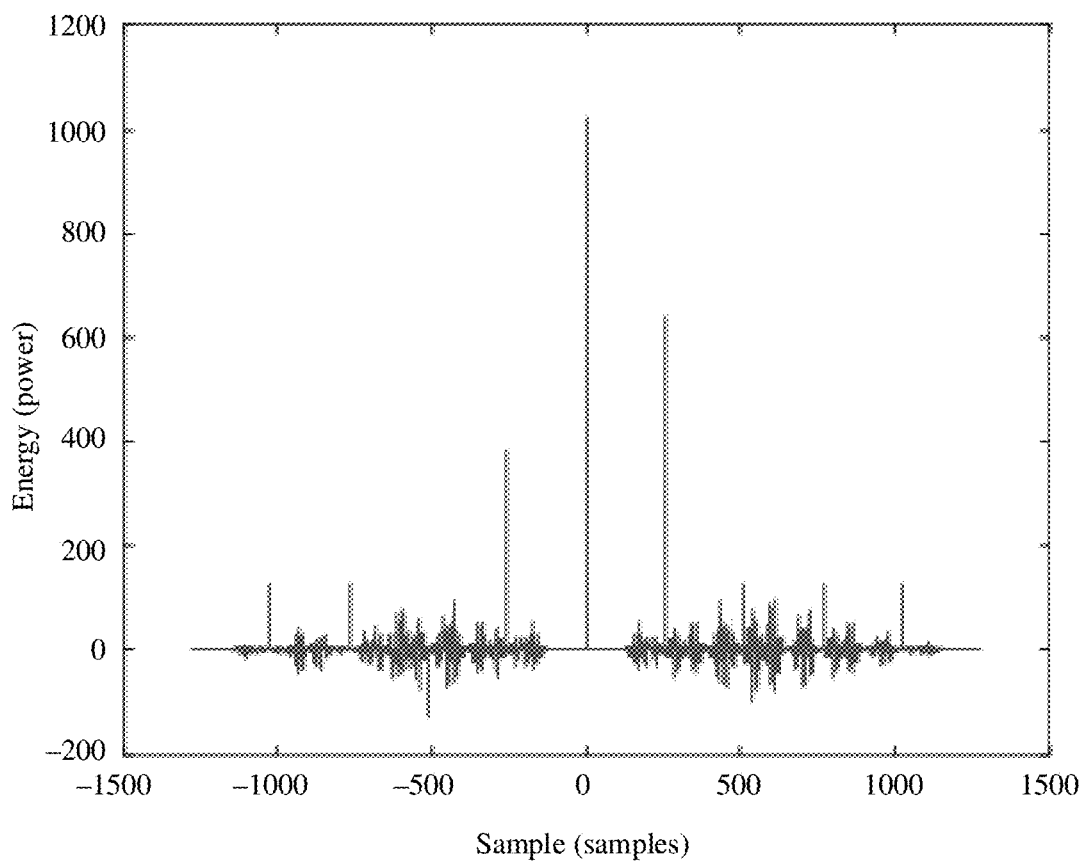
FIG. 8b and FIG. 8c each are a schematic diagram of a result of CE sequence autocorrelation according to an embodiment of this application.

For example, the CE1 sequence and the CE2 sequence are constructed in a same manner (that is, symbol sequences of the CE1 sequence and the CE2 sequence are the same), and the CE3 sequence and the CE4 sequence are constructed in a same manner (that is, symbol sequences of the CE3 sequence and the CE4 sequence are the same). According to Table 1 and Table 2, for example, if the symbol sequences of the CE1 sequence and the CE2 sequence correspond to No. 1 in Table 1, the symbol sequences of the CE3 sequence and the CE4 sequence may correspond to No. 16 (as shown in FIG. 8a), No. 28, No. 45, or No. 57 in Table 1.

In this embodiment of this application, the transmit device generates and sends a physical layer protocol data unit PPDU, where the PPDU includes a first field, the first field is used for carrying M sequences, the M sequences correspond to M space-time streams, one sequence corresponds to one space-time stream, and M is a positive integer; and the receive device receives the PPDU and performs signal processing based on the M sequences. For example, four CE sequences and four sequences when M=4 are as follows:

CE1={$Ga_{128}^1$, $Gb_{128}^1$, $-Ga_{128}^1$, $Gb_{128}^1$, $-Ga_{128}^1$, $Gb_{128}^1$, $Ga_{128}^1$, $Gb_{128}^1$, $Ga_{128}^1$, $Gb_{128}^1$}, CE2={$Ga_{128}^2$, $Gb_{128}^2$, $-Ga_{128}^2$, $Gb_{128}^2$, $-Ga_{128}^2$, $Gb_{128}^2$, $Ga_{128}^2$, $Gb_{128}^2$, $Ga_{128}^2$, $Gb_{128}^2$}, CE3={$Ga_{128}^3$, $Gb_{128}^3$, $Ga_{128}^3$, $-Gb_{128}^3$, $-Ga_{128}^3$, $Gb_{128}^3$, $-Ga_{128}^3$, $-Gb_{128}^3$, $Ga_{128}^3$, $Gb_{128}^3$} (corresponding to No. 16 in Table 1), and CE4={$Ga_{128}^4$, $Gb_{128}^4$, $Ga_{128}^4$, $-Gb_{128}^4$, $-Ga_{128}^4$, $Gb_{128}^4$, $-Ga_{128}^4$, $-Gb_{128}^4$, $Ga_{128}^4$, $Gb_{128}^4$}. In this case, four sequences are carried in the first field, for example, a sequence 1={$Ga_{128}^1$, $Gb_{128}^1$, $-Ga_{128}^1$, $Gb_{128}^1$, $-Ga_{128}^1$, $Gb_{128}^1$, $Ga_{128}^1$, $Gb_{128}^1$, $Ga_{128}^1$, $Gb_{128}^1$}, a sequence 2={$Ga_{128}^2$, $Gb_{128}^2$, $-Ga_{128}^2$, $Gb_{128}^2$, $-Ga_{128}^2$, $Gb_{128}^2$, $Ga_{128}^2$, $Gb_{128}^2$, $Ga_{128}^2$, $Gb_{128}^2$}, a sequence 3={$Ga_{128}^3$, $Gb_{128}^3$, $Ga_{128}^3$, $-Gb_{128}^3$, $-Ga_{128}^3$, $Gb_{128}^3$, $-Ga_{128}^3$, $-Gb_{128}^3$, $Ga_{128}^3$, $Gb_{128}^3$}, and a sequence 4={$Ga_{128}^4$, $Gb_{128}^4$, $Ga_{128}^4$, $-Gb_{128}^4$, $-Ga_{128}^4$, $Gb_{128}^4$, $-Ga_{128}^4$, $-Gb_{128}^4$, $Ga_{128}^4$, $Gb_{128}^4$}.

Alternatively, CE3={$-Ga_{128}^3$, $Gb_{128}^3$, $-Ga_{128}^3$, $-Gb_{128}^3$, $Ga_{128}^3$, $Gb_{128}^3$, $Ga_{128}^3$, $-Gb_{128}^3$, $-Ga_{128}^3$, $Gb_{128}^3$}, and CE4={$-Ga_{128}^4$, $Gb_{128}^4$, $-Ga_{128}^4$, $-Gb_{128}^4$, $Ga_{128}^4$, $Gb_{128}^4$, $Ga_{128}^4$, $-Gb_{128}^4$, $-Ga_{128}^4$, $Gb_{128}^4$} (that is, corresponding to No. 28 in Table 1). In this case, four sequences are carried in the first field, for example, a sequence 3={$-Ga_{128}^3$, $Gb_{128}^3$, $-Ga_{128}^3$, $-Gb_{128}^3$, $Ga_{128}^3$, $Gb_{128}^3$, $Ga_{128}^3$, $-Gb_{128}^3$, $-Ga_{128}^3$, $Gb_{128}^3$}, and a sequence 4={$-Ga_{128}^4$, $Gb_{128}^4$, $-Ga_{128}^4$, $-Gb_{128}^4$, $Ga_{128}^4$, $Gb_{128}^4$, $Ga_{128}^4$, $-Gb_{128}^4$, $-Ga_{128}^4$, $Gb_{128}^4$}.

Alternatively, CE3={$Ga_{128}^3$, $-Gb_{128}^3$, $Ga_{128}^3$, $Gb_{128}^3$, $-Ga_{128}^3$, $-Gb_{128}^3$, $-Ga_{128}^3$, $Gb_{128}^3$, $Ga_{128}^3$, $-Gb_{128}^3$}, CE4={$Ga_{128}^4$, $-Gb_{128}^4$, $Ga_{128}^4$, $Gb_{128}^4$, $-Ga_{128}^4$, $-Gb_{128}^4$, $-Ga_{128}^4$, $Gb_{128}^4$, $Ga_{128}^4$, $-Gb_{128}^4$} (that is, corresponding to No. 45 in Table 1). In this case, four sequences are carried in the first field, for example, a sequence 3={$Ga_{128}^3$, $-Gb_{128}^3$, $Ga_{128}^3$, $Gb_{128}^3$, $-Ga_{128}^3$, $-Gb_{128}^3$, $-Ga_{128}^3$, $Gb_{128}^3$, $Ga_{128}^3$, $-Gb_{128}^3$}, and a sequence 4={$Ga_{128}^4$, $-Gb_{128}^4$, $Ga_{128}^4$, $Gb_{128}^4$, $-Ga_{128}^4$, $-Gb_{128}^4$, $-Ga_{128}^4$, $Gb_{128}^4$, $Ga_{128}^4$, $-Gb_{128}^4$}.

Alternatively, CE3={$-Ga_{128}^3$, $-Gb_{128}^3$, $-Ga_{128}^3$, $Gb_{128}^3$, $Ga_{128}^3$, $-Gb_{128}^3$, $Ga_{128}^3$, $Gb_{128}^3$, $-Ga_{128}^3$, $-Gb_{128}^3$}, CE4={$-Ga_{128}^4$, $-Gb_{128}^4$, $-Ga_{128}^4$, $Gb_{128}^4$, $Ga_{128}^4$, $-Gb_{128}^4$, $Ga_{128}^4$, $Gb_{128}^4$, $-Ga_{128}^4$, $-Gb_{128}^4$} (that is, corresponding to No. 57 in Table 1). In this case, four sequences are carried in the first field, for example, a sequence 3={$-Ga_{128}^3$, $-Gb_{128}^3$, $-Ga_{128}^3$, $Gb_{128}^3$, $Ga_{128}^3$, $-Gb_{128}^3$, $Ga_{128}^3$, $Gb_{128}^3$, $-Ga_{128}^3$, $-Gb_{128}^3$}, and a sequence 4={$-Ga_{128}^4$, $-Gb_{128}^4$, $-Ga_{128}^4$, $Gb_{128}^4$, $Ga_{128}^4$, $-Gb_{128}^4$, $Ga_{128}^4$, $Gb_{128}^4$, $-Ga_{128}^4$, $-Gb_{128}^4$}. It may be understood that for specific descriptions of the sequence 1 and the sequence 2, refer to the foregoing descriptions. Details are not described herein again. It may be understood that the sequence 1 or the sequence 2 may be referred to as a first sequence, and $Ga_{128}^1$ and $Gb_{128}^1$ (that is, Ga and Gb shown above) may be referred to as a first Golay complementary sequence, or $Ga_{128}^2$ and $Gb_{128}^2$ may be referred to as a first Golay complementary sequence. In this case, the sequence 3 or the sequence 4 may be referred to as a second sequence, and $Ga_{128}^3$ and $Gb_{128}^3$ (that is, Ga' and Gb' shown above) may be referred to as a second Golay complementary sequence, or $Ga_{128}^4$ and $Gb_{128}^4$ may be referred to as a second Golay complementary sequence.

For another example, the symbol sequences of the CE1 sequence and the CE2 sequence correspond to No. 3 in Table 1, and the symbol sequences of the CE3 sequence and the CE4 sequence may correspond to No. 17, No. 29, No. 44, or No. 56 in Table 1.

For example, CE1={$Ga_{128}^1$, $Gb_{128}^1$, $Ga_{128}^1$, $-Gb_{128}^1$, $Ga_{128}^1$, $-Gb_{128}^1$, $Ga_{128}^1$, $Gb_{128}^1$, $Ga_{128}^1$, $Gb_{128}^1$}, CE2={$Ga_{128}^2$, $Gb_{128}^2$, $Ga_{128}^2$, $-Gb_{128}^2$, $Ga_{128}^2$, $-Gb_{128}^2$, $Ga_{128}^2$, $Gb_{128}^2$, $Ga_{128}^2$, $Gb_{128}^2$}, CE3={$Ga_{128}^3$, $Gb_{128}^3$, $-Ga_{128}^3$, $Gb_{128}^3$, $Ga_{128}^3$, $-Gb_{128}^3$, $-Ga_{128}^3$, $-Gb_{128}^3$, $Ga_{128}^3$, $Gb_{128}^3$}, and CE4={$Ga_{128}^4$, $Gb_{128}^4$, $-Ga_{128}^4$, $Gb_{128}^4$, $Ga_{128}^4$, $-Gb_{128}^4$, $-Ga_{128}^4$, $-Gb_{128}^4$, $Ga_{128}^4$, $Gb_{128}^4$} (that is, corresponding to No. 17 in Table 1). In this case, four sequences are carried in the first field, for example, a sequence 1={$Ga_{128}^1$, $Gb_{128}^1$, $Ga_{128}^1$, $-Gb_{128}^1$, $Ga_{128}^1$, $-Gb_{128}^1$, $Ga_{128}^1$, $Gb_{128}^1$, $Ga_{128}^1$, $Gb_{128}^1$}, a sequence 2={$Ga_{128}^2$, $Gb_{128}^2$, $Ga_{128}^2$, $-Gb_{128}^2$, $Ga_{128}^2$, $-Gb_{128}^2$, $Ga_{128}^2$, $Gb_{128}^2$, $Ga_{128}^2$, $Gb_{128}^2$}, a sequence 3={$Ga_{128}^3$, $Gb_{128}^3$, $-Ga_{128}^3$, $Gb_{128}^3$, $Ga_{128}^3$, $-Gb_{128}^3$, $Ga_{128}^3$, $-Gb_{128}^3$, $Ga_{128}^3$, $Gb_{128}^3$}, and a sequence 4={$Ga_{128}^4$, $Gb_{128}^4$, $-Ga_{128}^4$, $Gb_{128}^4$, $Ga_{128}^4$, $-Gb_{128}^4$, $-Ga_{128}^4$, $-Gb_{128}^4$, $Ga_{128}^4$, $Gb_{128}^4$}.

Alternatively, CE3={$-Ga_{128}^3$, $Gb_{128}^3$, $Ga_{128}^3$, $Gb_{128}^3$, $-Ga_{128}^3$, $-Gb_{128}^3$, $Ga_{128}^3$, $-Gb_{128}^3$, $-Ga_{128}^3$, $Gb_{128}^3$}, and CE4={$-Ga_{128}^4$, $Gb_{128}^4$, $Ga_{128}^4$, $Gb_{128}^4$, $-Ga_{128}^4$, $-Gb_{128}^4$, $Ga_{128}^4$, $-Gb_{128}^4$, $-Ga_{128}^4$, $Gb_{128}^4$} (that is, corresponding to No. 29 in Table 1). In this case, four sequences are carried in the first field, for example, a sequence 3={$-Ga_{128}^3$, $Gb_{128}^3$, $Ga_{128}^3$, $Gb_{128}^3$, $-Ga_{128}^3$, $-Gb_{128}^3$, $Ga_{128}^3$, $-Gb_{128}^3$, $-Ga_{128}^3$, $Gb_{128}^3$}, and a sequence 4={$-Ga_{128}^4$, $Gb_{128}^4$, $Ga_{128}^4$, $Gb_{128}^4$, $-Ga_{128}^4$, $-Gb_{128}^4$, $Ga_{128}^4$, $-Gb_{128}^4$, $-Ga_{128}^4$, $Gb_{128}^4$}.

Alternatively, CE3={$Ga_{128}^3$, $-Gb_{128}^3$, $-Ga_{128}^3$, $-Gb_{128}^3$, $Ga_{128}^3$, $Gb_{128}^3$, $-Ga_{128}^3$, $Gb_{128}^3$, $Ga_{128}^3$, $-Gb_{128}^3$}, and CE4={$Ga_{128}^4$, $-Gb_{128}^4$, $-Ga_{128}^4$, $-Gb_{128}^4$, $Ga_{128}^4$, $Gb_{128}^4$, $-Ga_{128}^4$, $Gb_{128}^4$, $Ga_{128}^4$, $-Gb_{128}^4$} (that is, corresponding to No. 44 in Table 1). In this case, four sequences are carried in the first field, for example, a sequence 3={$Ga_{128}^3$, $-Gb_{128}^3$, $-Ga_{128}^3$, $-Gb_{128}^3$, $Ga_{128}^3$, $Gb_{128}^3$, $-Ga_{128}^3$, $Gb_{128}^3$, $Ga_{128}^3$, $-Gb_{128}^3$}, and a sequence 4={$Ga_{128}^4$, $-Gb_{128}^4$, $-Ga_{128}^4$, $-Gb_{128}^4$, $Ga_{128}^4$, $Gb_{128}^4$, $-Ga_{128}^4$, $Gb_{128}^4$, $Ga_{128}^4$, $-Gb_{128}^4$}.

Alternatively, CE3={$-Ga_{128}^3$, $-Gb_{128}^3$, $Ga_{128}^3$, $-Gb_{128}^3$, $-Ga_{128}^3$, $Gb_{128}^3$, $Ga_{128}^3$, $Gb_{128}^3$, $-Ga_{128}^3$, $-Gb_{128}^3$}, and CE4={$-Ga_{128}^4$, $-Gb_{128}^4$, $Ga_{128}^4$, $-Gb_{128}^4$, $-Ga_{128}^4$, $Gb_{128}^4$, $Ga_{128}^4$, $Gb_{128}^4$, $-Ga_{128}^4$, $-Gb_{128}^4$} (corresponding to No. 56 in Table 1). In this case, four sequences are carried in the first field, for example, a sequence 3={$-Ga_{128}^3$, $-Gb_{128}^3$, $Ga_{128}^3$, $-Gb_{128}^3$, $-Ga_{128}^3$, $Gb_{128}^3$, $Ga_{128}^3$, $Gb_{128}^3$, $-Ga_{128}^3$, $-Gb_{128}^3$}, and a sequence 4={$-Ga_{128}^4$, $-Gb_{128}^4$, $Ga_{128}^4$, $-Gb_{128}^4$, $-Ga_{128}^4$, $Gb_{128}^4$, $Ga_{128}^4$, $Gb_{128}^4$, $-Ga_{128}^4$, $-Gb_{128}^4$}. It may be understood that for descriptions of the sequence 1 and the sequence 2, refer to the foregoing descriptions. Details are not described herein again.

For another example, if the symbol sequences of the CE1 sequence and the CE2 sequence correspond to No. 6 in Table 1, the symbol sequences of the CE3 sequence and the CE4 sequence may correspond to No. 13 or No. 32 in Table 1. For another example, if the symbol sequences of the CE1 sequence and the CE2 sequence correspond to No. 8 in Table 1, the symbol sequences of the CE3 sequence and the CE4 sequence may correspond to No. 14 or No. 36 in Table 1. It may be understood that, for the symbol sequences of the CE1 sequence to the CE4 sequence, refer to the foregoing Table 1 and Table 2. This is not listed one by one herein. It may be understood that FIG. 8a merely provides an example of symbol sequences of the CE1 sequence and the CE2 sequence, and symbol sequences of the CE3 sequence and the CE4 sequence. For specific descriptions of FIG. 8a, refer to the foregoing description. Details are not described herein again. For specific descriptions of the sequence 1 to the sequence 4, refer to descriptions of CE1 to CE4. Details are not described herein again.

It may be understood that, only four CE sequences and four sequences when M=4 are provided herein as an example, and specific descriptions of three CE sequences and three sequences when M=3 are provided herein. Details are not described herein again.

It can be learned from the foregoing description of cross-correlation of the CE sequences that, the CE1 sequence to the CE4 sequence may have a feature that cross-correlation energy between any two of the CE1 sequence to the CE4 sequence within the length range of the Golay complementary sequence is zero. For example, a peak value of cross-correlation (that is, maximum energy) between the four CE sequences within the length range of the Golay complementary sequence, for example, −128 to +128, is shown in Table 4.

TABLE 4

|  | CE1 | CE2 | CE3 | CE4 |
| --- | --- | --- | --- | --- |
| CE1 | 1024 | 0 | 0 | 0 |
| CE2 | 0 | 1024 | 0 | 0 |
| CE3 | 0 | 0 | 1024 | 0 |
| CE4 | 0 | 0 | 0 | 1024 |

In a possible implementation, when MIMO channel estimation is performed in a case of three streams or four streams, a P-matrix may be represented by the following formula (18):

$$P = \begin{bmatrix} +1 \\ +1 \\ +1 \\ +1 \end{bmatrix} \quad (18)$$

Figure 8C:
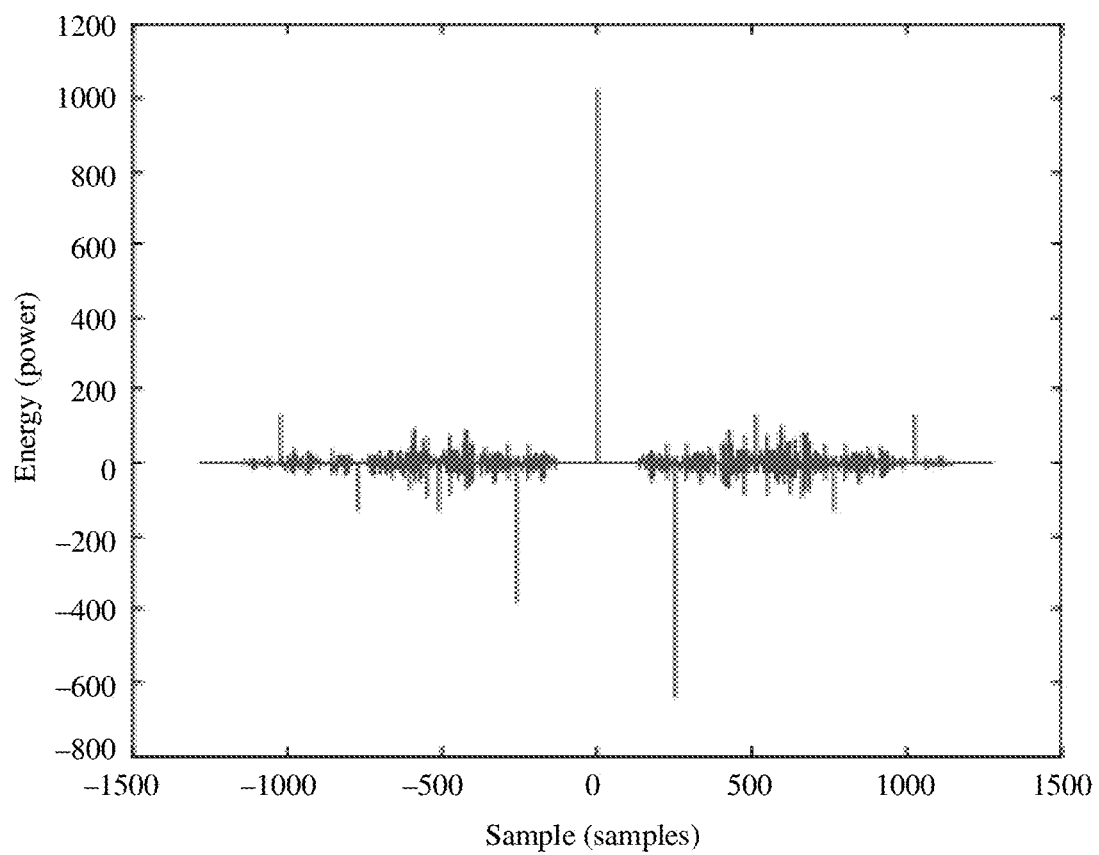
Figure 8D:
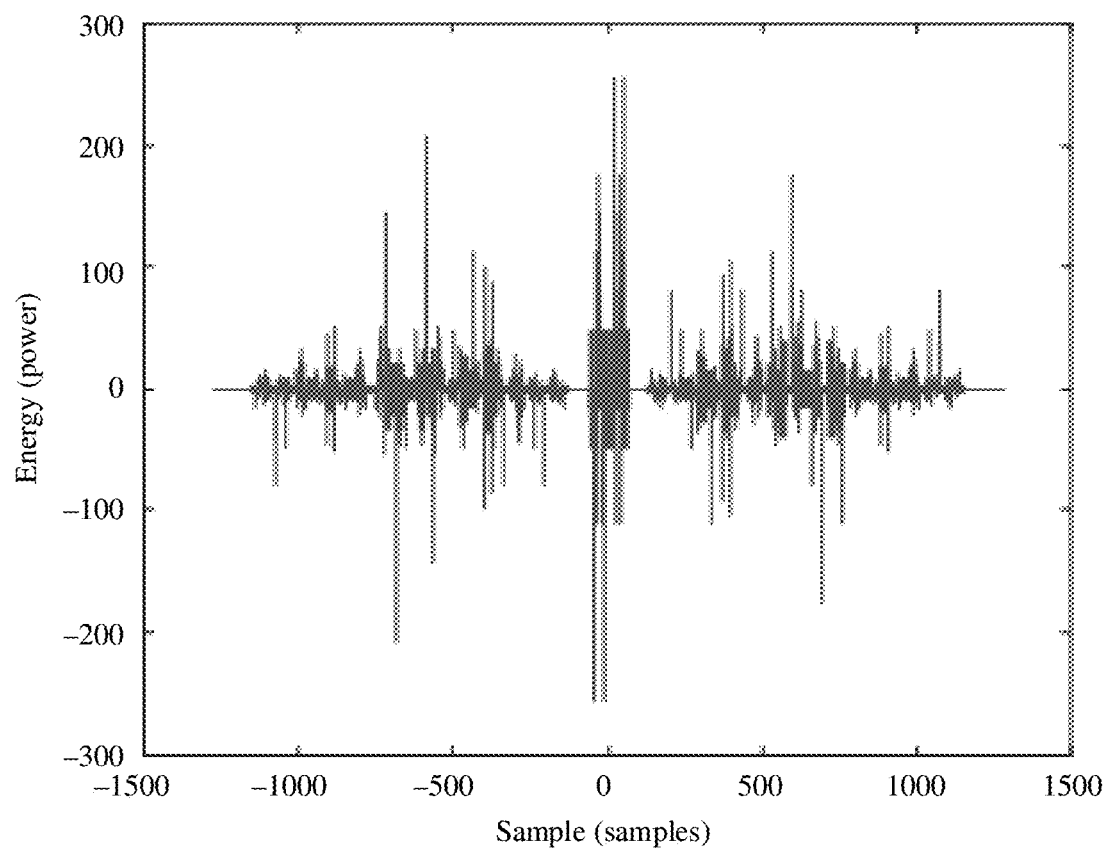
FIG. 8d and FIG. 8e each are a schematic diagram of a result of CE sequence cross-correlation according to an embodiment of this application.
Figure 8E:
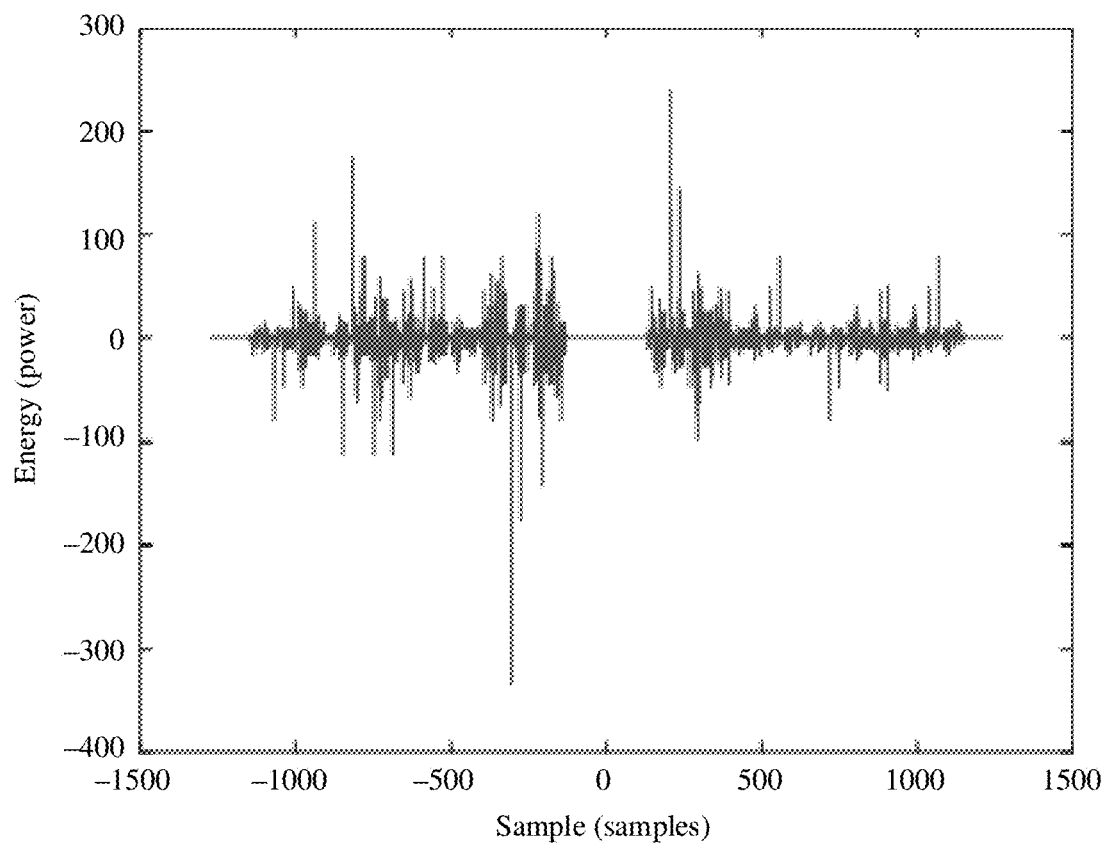

That is, the transmit device may send three streams or four streams within one period, and the receive device may further complete channel estimation, target sensing, or the like within one period. As shown in FIG. 8b to FIG. 8e, FIG. 8b is a schematic diagram of a result of CE1 sequence autocorrelation, FIG. 8c is a schematic diagram of a result of CE3 sequence autocorrelation, FIG. 8d is a schematic diagram of a result of cross-correlation between a CE1 sequence and a CE3 sequence that do not have a local ZCC feature, and FIG. 8e is a schematic diagram of a result of cross-correlation between a CE1 sequence and a CE3 sequence that have a local ZCC feature according to this application. It can be learned from FIG. 8b to FIG. 8e that, the CE1 sequence of a single stream and the CE3 sequence of a single stream constructed in this application both have a feature of zero autocorrelation side lobe energy within a length range of a Golay complementary sequence. For a cross-correlation feature, compared with that the CE1 sequence and the CE3 sequence shown in 802.11ad have a non-zero cross-correlation energy within the length range of the Golay complementary sequence, that is, the CE1 sequence and the CE3 sequence do not have a ZCC feature in a local region, the CE1 sequence and the CE3 sequence constructed in this application have a feature of zero cross-correlation energy within the length range of the Golay complementary sequence. That is, the CE1 sequence and the CE3 sequence constructed in this application have a ZCC feature within the length range of the Golay complementary sequence.

It may be understood that, for descriptions of the CE1 sequence to the CE4 sequence, refer to the foregoing descriptions of Table 3, and the like. Details are not described herein again.

Figure 9:
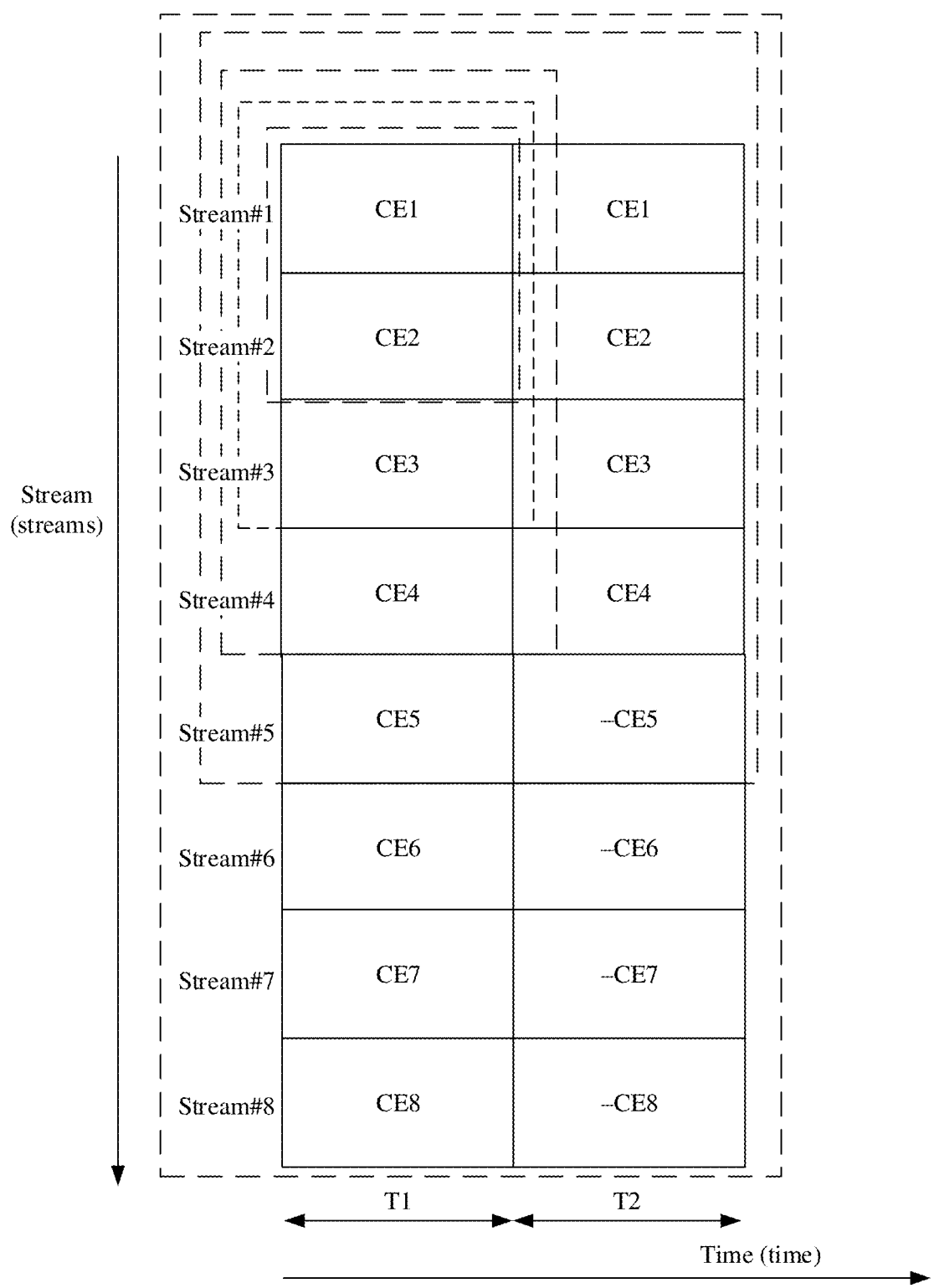
FIG. 9 is a schematic diagram of sending a multi-stream sequence according to an embodiment of this application.

According to the method provided in this embodiment of this application, when the transmit device sends the three streams or the four streams, the transmit device may simultaneously send the three streams or the four streams within only one period, as shown in FIG. 9. In this way, channel estimation time (which may also be referred to as channel estimation duration) can be effectively shortened, and channel estimation efficiency is also improved. In addition, if the method is applied to target sensing, the method provided in this embodiment of this application can further shorten target sensing time, and improve target sensing efficiency. Further, due to a relationship between a period and a frequency, the method provided in this embodiment of this application further effectively improves a PRF of sensing, and improves a maximum detectable Doppler and/or a speed in sensing.

3. Five Streams/Six Streams

In this embodiment of this application, the transmit device generates and sends a physical layer protocol data unit PPDU, where the PPDU includes a first field, the first field is used for carrying M sequences, the M sequences correspond to M space-time streams, one sequence corresponds to one space-time stream, and M is a positive integer; and the receive device receives the PPDU and performs signal processing based on the M sequences, for example, M=5 or 6.

In this embodiment of this application, the transmit device may send five CE sequences, for example, a CE1 sequence to a CE5 sequence, or may send six CE sequences, for example, a CE1 sequence to a CE6 sequence.

Figures 1, 2, 10A:
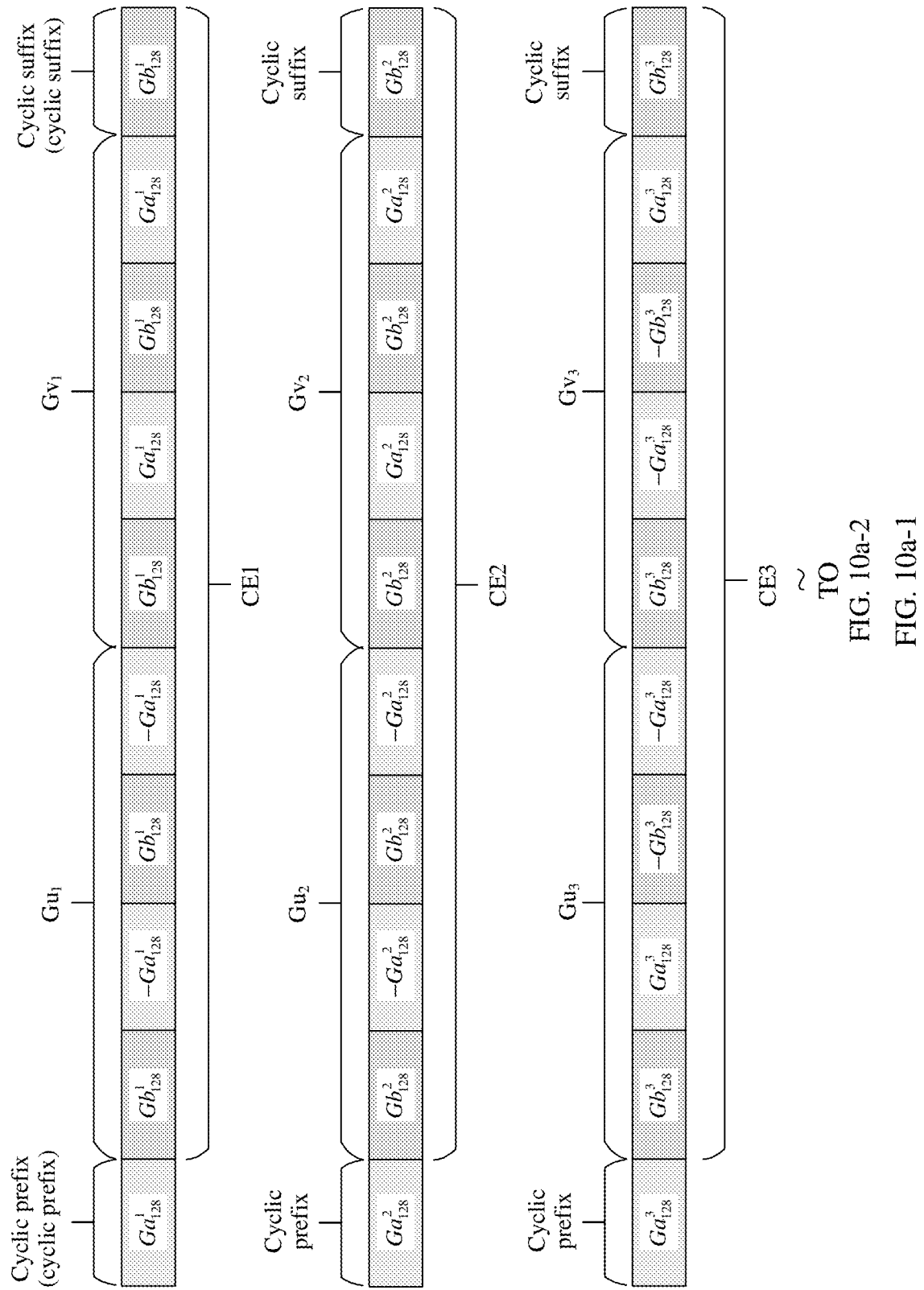
Figure 10B:
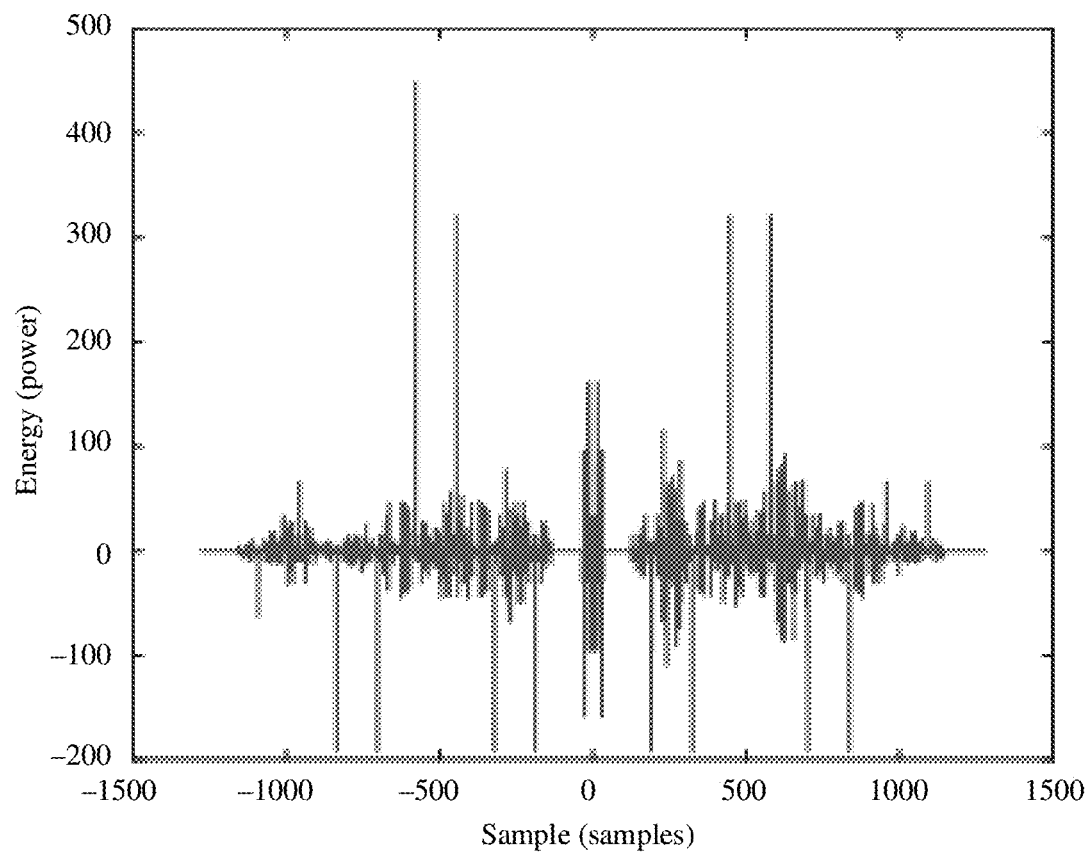
FIG. 10b to FIG. 10e each are a schematic diagram of a result of CE sequence cross-correlation according to an embodiment of this application.

For example, the CE1 sequence and the CE2 sequence are constructed in a same manner, and the CE3 sequence, the CE4 sequence, the CE5 sequence, and the CE6 sequence are constructed in a same manner. That is, symbol sequences corresponding to the CE1 sequence and the CE2 sequence are the same, and symbol sequences corresponding to the CE3 sequence to the CE6 sequence are the same. Specific values of the two symbol sequences may be shown in Table 1 and Table 2. FIG. 10a-1 and FIG. 10a-2 show an example of a CE1 sequence to a CE6 sequence. For example, a peak value of cross-correlation between the six CE sequences within the length range of the Golay complementary sequence from −128 to +128 is shown in Table 5.

TABLE 5

|  | CE1 | CE2 | CE3 | CE4 | CE5 | CE6 |
|---|---|---|---|---|---|---|
| CE1 | 1024 | 0 | 0 | 0 | 0 | 0 |
| CE2 | 0 | 1024 | 0 | 0 | 0 | 0 |
| CE3 | 0 | 0 | 1024 | 0 | 160 | 288 |
| CE4 | 0 | 0 | 0 | 1024 | 288 | 160 |
| CE5 | 0 | 0 | 160 | 288 | 1024 | 0 |
| CE6 | 0 | 0 | 288 | 160 | 0 | 1024 |

Figure 10C:
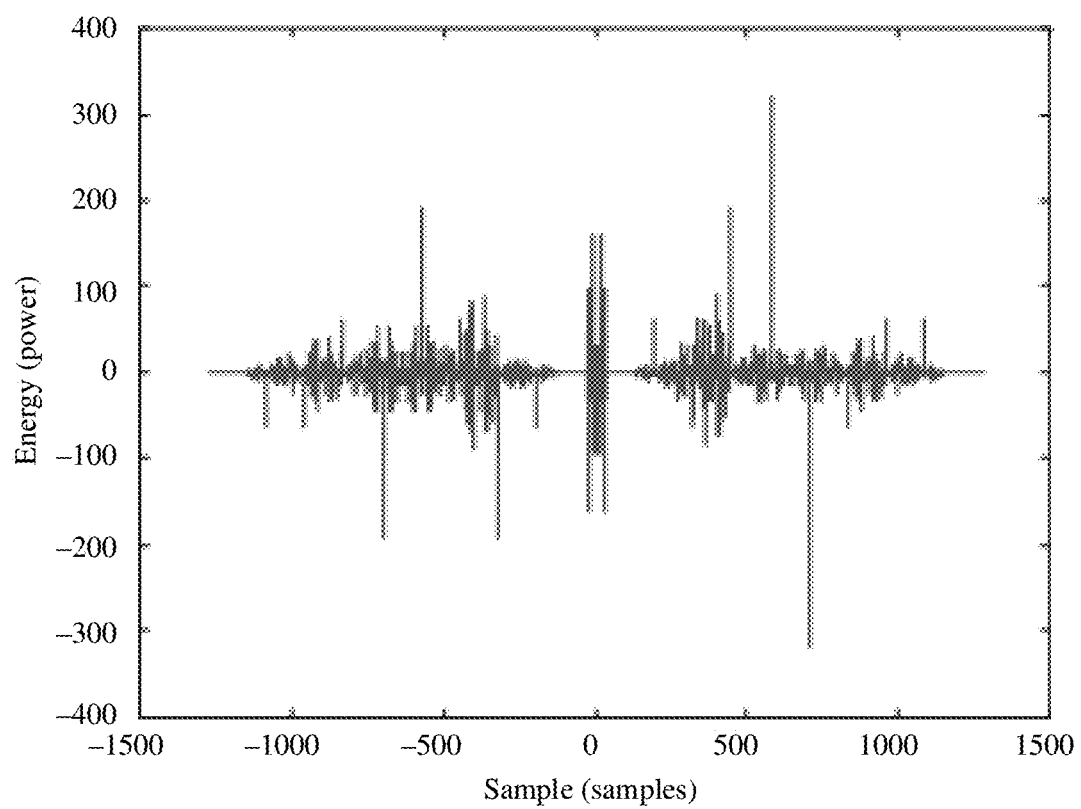
Figure 10D:
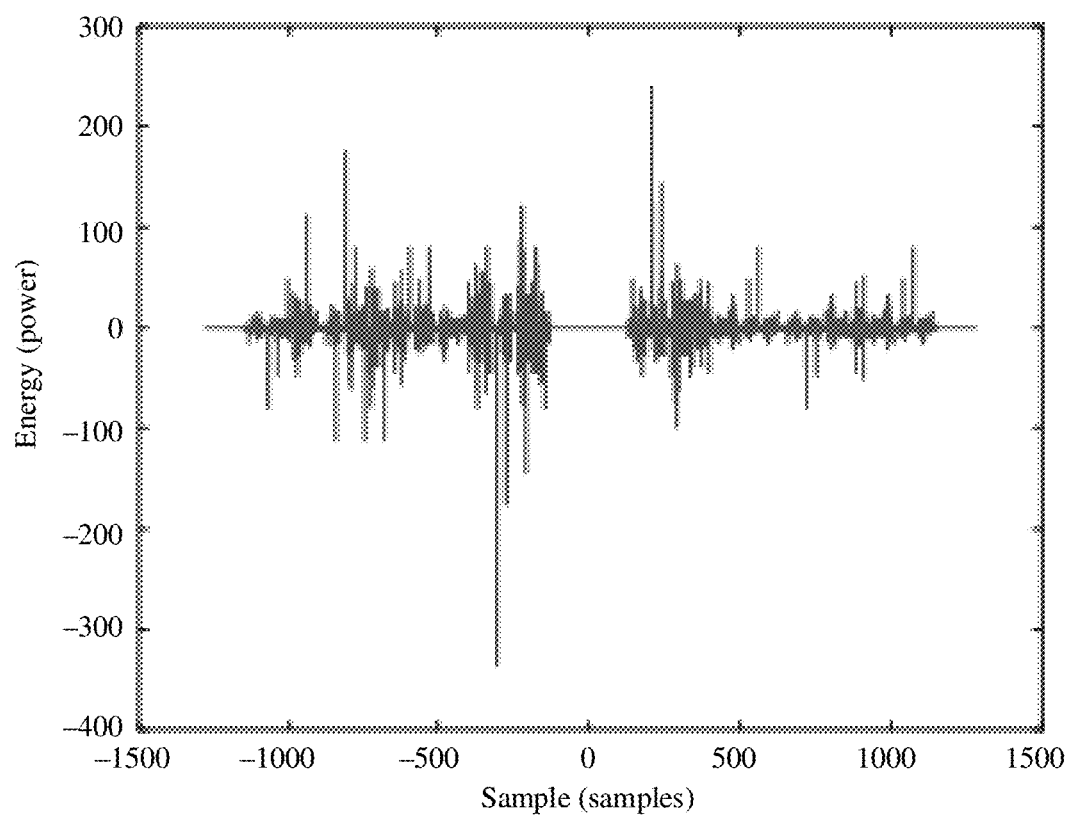
Figure 10E:
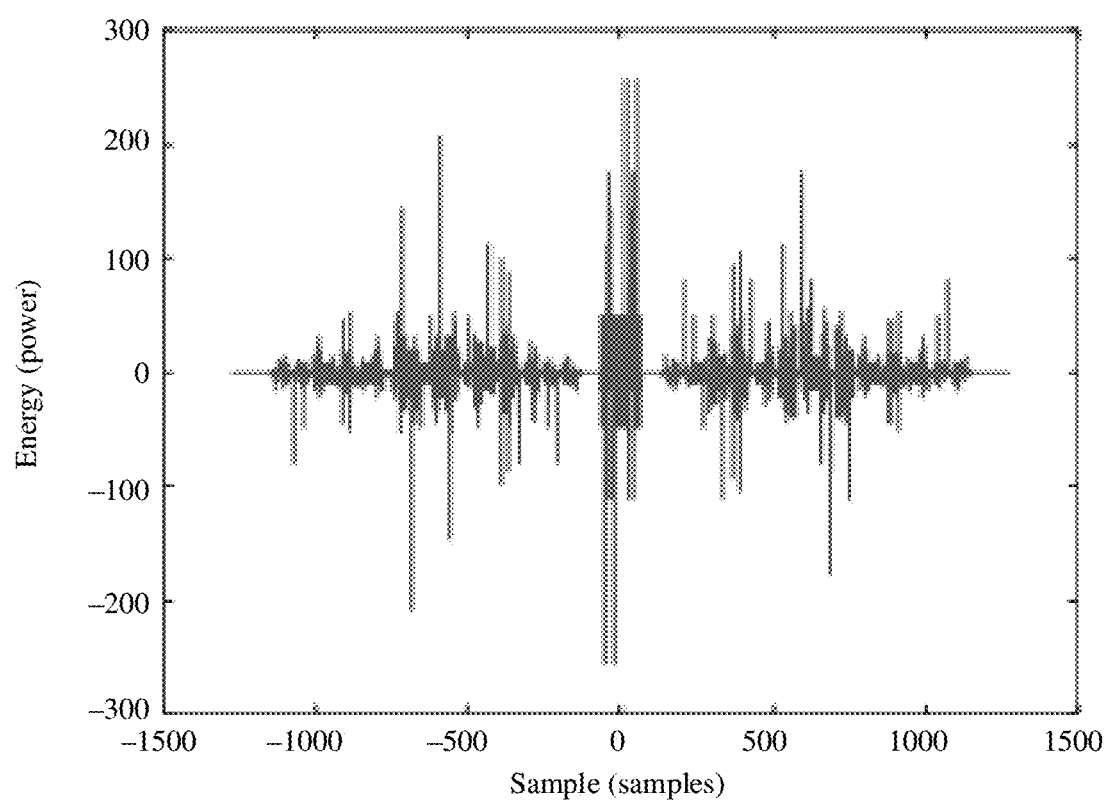

With reference to FIG. 10b to FIG. 10e, FIG. 10b is a schematic diagram of a result of cross-correlation between a CE3 sequence and a CE5 sequence according to this application, FIG. 10c is a schematic diagram of a result of cross-correlation between a CE3 sequence and a CE5 sequence shown in 802.11ad, FIG. 10d is a schematic diagram of a result of cross-correlation between a CE1 sequence and a CE3 sequence according to this application, and FIG. 10e is a schematic diagram of a result of cross-correlation between a CE1 sequence and a CE3 sequence shown in 802.11ad. It can be learned from the figure that the CE1 sequence and the CE3 sequence shown in this application have a local ZCC feature.

In a possible implementation, because the CE3 sequence and CE5 sequence do not have a local ZCC feature, the transmit device may determine the CE sequence in combination with a P-matrix. As shown in FIG. 9, the transmit device may send the CE sequence in combination with the P-matrix. The P-matrix may be a formula (19) shown below:

$$P = \begin{bmatrix} +1 & +1 \\ +1 & +1 \\ +1 & +1 \\ +1 & +1 \\ +1 & -1 \\ +1 & -1 \end{bmatrix} \quad (19)$$

For example, CE1 and CE2 are constructed in a same manner, and CE3 to CE6 are constructed in a same manner. For example, symbol sequences of CE1 and CE2 correspond to No. 1 in Table 1, and symbol sequences of CE3 to CE6 correspond to No. 16, No. 28, No. 45, or No. 57 in Table 1.

It can be understood that in this embodiment of this application, for descriptions of the CE1 to the CE4 and the sequence 1 to the sequence 4, refer to the foregoing descriptions of the three streams/four streams. Details are not described herein again. The following focuses on the CE5 and the CE6, and the sequence 6 and the sequence 7.

For example, CE5={$Ga_{128}^5$, $Gb_{128}^5$, $Ga_{128}^5$, $-Gb_{128}^5$, $-Ga_{128}^5$, $Gb_{128}^5$, $-Ga_{128}^5$, $-Gb_{128}^5$, $Ga_{128}^5$, $Gb_{128}^5$} (that is, corresponding to No. 16 in Table 1), and CE6={$Ga_{128}^6$, $Gb_{128}^6$, $Ga_{128}^6$, $-Gb_{128}^6$, $-Ga_{128}^6$, $Gb_{128}^6$, $-Ga_{128}^6$, $-Gb_{128}^6$, $Ga_{128}^6$, $Gb_{128}^6$}. In this case, the sequence 5={$-Ga_{128}^5$, $-Gb_{128}^5$, $-Ga_{128}^5$, $Gb_{128}^5$, $Ga_{128}^5$, $-Gb_{128}^5$, $Ga_{128}^5$, $Gb_{128}^5$, $-Ga_{128}^5$, $-Gb_{128}^5$}, and the sequence 6={$-Ga_{128}^6$, $-Gb_{128}^6$, $-Ga_{128}^6$, $Gb_{128}^6$, $Ga_{128}^6$, $-Gb_{128}^6$, $Ga_{128}^6$, $Gb_{128}^6$, $-Ga_{128}^6$, $-Gb_{128}^6$}.

Alternatively, CE5={$-Ga_{128}^5$, $Gb_{128}^5$, $-Ga_{128}^5$, $-Gb_{128}^5$, $Ga_{128}^5$, $Gb_{128}^5$, $Ga_{128}^5$, $-Gb_{128}^5$, $-Ga_{128}^5$, $Gb_{128}^5$}, and CE6={$-Ga_{128}^6$, $Gb_{128}^6$, $-Ga_{128}^6$, $-Gb_{128}^6$, $Ga_{128}^6$, $Gb_{128}^6$, $Ga_{128}^6$, $-Gb_{128}^6$, $-Ga_{128}^6$, $Gb_{128}^6$} (that is, corresponding to No. 28 in Table 1). In this case, the sequence 5={$Ga_{128}^5$, $-Gb_{128}^5$, $Ga_{128}^5$, $Gb_{128}^5$, $-Ga_{128}^5$, $-Gb_{128}^5$, $-Ga_{128}^5$, $Gb_{128}^5$, $Ga_{128}^5$, $-Gb_{128}^5$}, and the sequence 6={$Ga_{128}^6$, $-Gb_{128}^6$, $Ga_{128}^6$, $Gb_{128}^6$, $-Ga_{128}^6$, $-Gb_{128}^6$, $-Ga_{128}^6$, $Gb_{128}^6$, $Ga_{128}^6$, $-Gb_{128}^6$}.

Alternatively, CE5={$Ga_{128}^5$, $-Gb_{128}^5$, $Ga_{128}^5$, $Gb_{128}^5$, $-Ga_{128}^5$, $-Gb_{128}^5$, $-Ga_{128}^5$, $Gb_{128}^5$, $Ga_{128}^5$, $-Gb_{128}^5$} CE6={$Ga_{128}^6$, $Gb_{128}^6$, $Ga_{128}^6$, $Gb_{128}^6$, $Ga_{128}^6$, $Gb_{128}^6$, $Ga_{128}^6$, $Gb_{128}^6$, $Ga_{128}^6$, $-Gb_{128}^6$} (that is, corresponding to No. 45 in Table 1). In this case, the sequence 5={$-Ga_{128}^5$, $Gb_{128}^5$, $-Ga_{128}^5$, $-Gb_{128}^5$, $Ga_{128}^5$, $Gb_{128}^5$, $Ga_{128}^5$, $-Gb_{128}^5$, $-Ga_{128}^5$, $Gb_{128}^5$}, and the sequence 6={$-Ga_{128}^6$, $Gb_{128}^6$, $-Ga_{128}^6$, $-Gb_{128}^6$, $Ga_{128}^6$, $Gb_{128}^6$, $Ga_{128}^6$, $-Gb_{128}^6$, $-Ga_{128}^6$, $Gb_{128}^6$}.

Alternatively, CE5={$-Ga_{128}^5$, $-Gb_{128}^5$, $-Ga_{128}^5$, $Gb_{128}^5$, $Ga_{128}^5$, $-Gb_{128}^5$, $Ga_{128}^5$, $Gb_{128}^5$, $-Ga_{128}^5$, $-Gb_{128}^5$}, CE6={$-Ga_{128}^6$, $-Gb_{128}^6$, $-Ga_{128}^6$, $Gb_{128}^6$, $Ga_{128}^6$, $-Gb_{128}^6$, $Ga_{128}^6$, $Gb_{128}^6$, $-Ga_{128}^6$, $-Gb_{128}^6$} (that is, corresponding to No. 57 in Table 1). In this case, the sequence 5={$Ga_{128}^5$, $Gb_{128}^5$, $Ga_{128}^5$, $-Gb_{128}^5$, $-Ga_{128}^5$, $Gb_{128}^5$, $-Ga_{128}^5$, $-Gb_{128}^5$, $Ga_{128}^5$, $Gb_{128}^5$}, and the sequence 6={$Ga_{128}^6$, $Gb_{128}^6$, $Ga_{128}^6$, $-Gb_{128}^6$, $-Ga_{128}^6$, $Gb_{128}^6$, $-Ga_{128}^6$, $-Gb_{128}^6$, $Ga_{128}^6$, $Gb_{128}^6$}.

It may be understood that the foregoing is merely an example. For specific descriptions of CE1 to CE6 and the sequence 1 to the sequence 6, refer to other embodiments shown in this application. Details are not described herein again.

In a possible implementation, the CE1 sequence, the CE2 sequence, the CE5 sequence, and the CE6 sequence are constructed in a same manner, and the CE3 sequence and the CE4 sequence are constructed in a same manner.

The transmit device may alternatively send the CE sequence in combination with the P-matrix, and the P-matrix may be shown in the foregoing formula (19).

In a possible implementation, the CE1 sequence, the CE2 sequence, the CE3 sequence, and the CE4 sequence are constructed in a same manner, and the CE5 sequence and the CE6 sequence are constructed in a same manner.

The transmit device may alternatively send the CE sequence in combination with the P-matrix. The P-matrix may be shown in a formula (20) or a formula (21):

$$P = \begin{bmatrix} +1 & +1 \\ +1 & +1 \\ +1 & -1 \\ +1 & -1 \\ +1 & +1 \\ +1 & +1 \end{bmatrix} \quad (20)$$

$$P = \begin{bmatrix} +1 & +1 \\ +1 & +1 \\ +1 & -1 \\ +1 & -1 \\ +1 & -1 \\ +1 & -1 \end{bmatrix} \quad (21)$$

It may be understood that for specific descriptions of the CE1 to the CE6 and the sequence 1 to the sequence 6, refer to the foregoing description of the formula (19). Details are not described herein again.

In this embodiment of this application, the receive device may perform channel estimation or target sensing within two periods in combination with the P-matrix. This shortens time for sending a CE sequence by the transmit device, and also shortens time for channel estimation by the receive device or time for sensing by the receive device.

4. Seven Streams/Eight Streams

In this embodiment of this application, the transmit device generates and sends a physical layer protocol data unit PPDU, where the PPDU includes a first field, the first field is used for carrying M sequences, the M sequences correspond to M space-time streams, one sequence corresponds to one space-time stream, and M is a positive integer; and the receive device receives the PPDU and performs signal processing based on the M sequences, for example, M=7 or 8.

In this embodiment of this application, the transmit device may send seven CE sequences, for example, a CE1 sequence to a CE7 sequence, or may send eight CE sequences, for example, a CE1 sequence to a CE8 sequence.

Figure 11A:
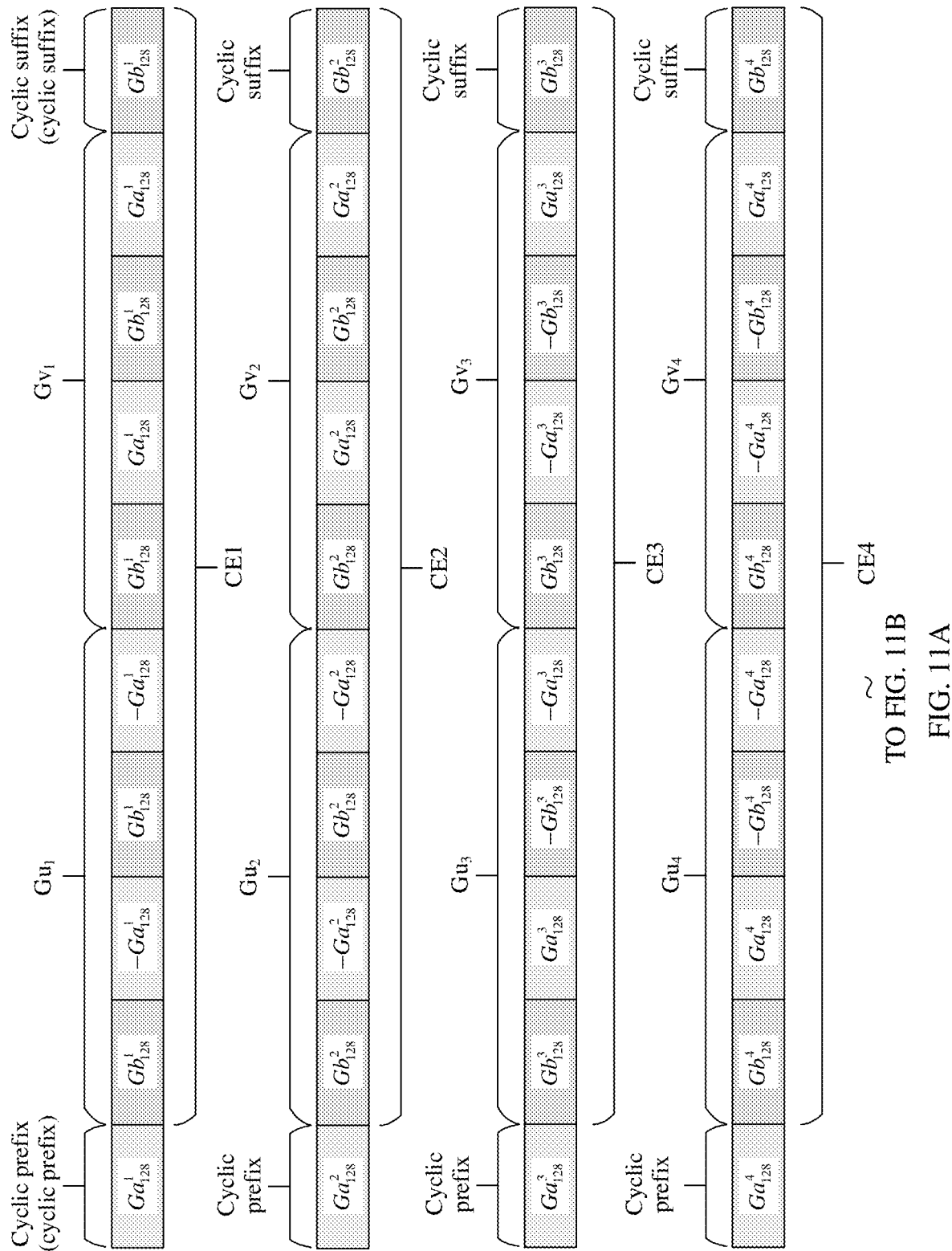

For example, the CE sequence, the CE2 sequence, the CE7 sequence, and the CE8 sequence are constructed in a same manner, and the CE3 sequence, the CE4 sequence, the CE5 sequence, and the CE6 sequence are constructed in a same manner. That is, symbol sequences corresponding to the CE1 sequence, the CE2 sequence, the CE7 sequence, and the CE8 sequence are the same, and symbol sequences corresponding to the CE3 sequence, the CE4 sequence, the CE5 sequence, and the CE6 sequence are the same. Specific values of the two symbol sequences may be shown in Table 1 and Table 2. For example, FIG. 11A and FIG. 11B show an example of a CE1 sequence to a CE8 sequence.

For example, a peak value of cross-correlation between the eight CE sequences provided in this application within a length range of a Golay complementary sequence, for example, −128 to +128, is shown in Table 6.

TABLE 6

|     | CE1  | CE2  | CE3  | CE4  | CE5  | CE6  | CE7  | CE8  |
|-----|------|------|------|------|------|------|------|------|
| CE1 | 1024 | 0    | 0    | 0    | 0    | 0    | 512  | 128  |
| CE2 | 0    | 1024 | 0    | 0    | 0    | 0    | 128  | 512  |
| CE3 | 0    | 0    | 1024 | 0    | 160  | 288  | 0    | 0    |
| CE4 | 0    | 0    | 0    | 1024 | 288  | 160  | 0    | 0    |
| CE5 | 0    | 0    | 160  | 288  | 1024 | 0    | 0    | 0    |
| CE6 | 0    | 0    | 288  | 160  | 0    | 1024 | 0    | 0    |
| CE7 | 512  | 128  | 0    | 0    | 0    | 0    | 1024 | 0    |
| CE8 | 128  | 512  | 0    | 0    | 0    | 0    | 0    | 1024 |

For example, the peak value of the cross-correlation between the CE1 sequence and the CE8 sequence shown in 802.11ad may be shown in Table 7.

TABLE 7

|     | CE1  | CE2  | CE3  | CE4  | CE5  | CE6  | CE7  | CE8  |
|-----|------|------|------|------|------|------|------|------|
| CE1 | 1024 | 0    | 256  | 160  | 256  | 160  | 512  | 128  |
| CE2 | 0    | 1024 | 160  | 256  | 160  | 256  | 128  | 512  |
| CE3 | 256  | 160  | 1024 | 0    | 160  | 288  | 512  | 144  |
| CE4 | 160  | 256  | 0    | 1024 | 288  | 160  | 144  | 512  |
| CE5 | 256  | 160  | 160  | 288  | 1024 | 0    | 512  | 144  |
| CE6 | 160  | 256  | 288  | 160  | 0    | 1024 | 144  | 512  |
| CE7 | 512  | 128  | 512  | 144  | 512  | 144  | 1024 | 0    |
| CE8 | 128  | 512  | 144  | 512  | 144  | 512  | 0    | 1024 |

Compared with Table 7, the CE sequence provided in this application is significantly improved. It may be learned from Table 6 that, a result of cross-correlation between the CE1 sequence and the CE7 sequence is not 0, and in addition, a result of cross-correlation between the CE1 sequence and the CE8 sequence is not 0 either, and the like. Therefore, the transmit device may send the CE sequence in combination with the P-matrix shown in formula (22). In this case, the receive device may complete channel estimation or WLAN sensing within two periods in combination with the P-matrix. This shortens time for sending the CE sequence by the transmit device, and also shortens time for channel estimation by the receive device, or time for sensing by the receive device.

For example, the P-matrix may be shown in the following formula (22):

$$P = \begin{bmatrix} +1 & +1 \\ +1 & +1 \\ +1 & +1 \\ +1 & +1 \\ +1 & -1 \\ +1 & -1 \\ +1 & -1 \\ +1 & -1 \end{bmatrix} \quad (22)$$

It can be understood that the P-matrix applicable to the five streams or six streams may alternatively be the foregoing formula (22), and the formula (19) shown in the foregoing five streams/six streams may alternatively be replaced with the formula (22).

For example, the CE1 sequence, the CE2 sequence, the CE7 sequence, and the CE8 sequence are constructed in a same manner, and the CE3 sequence, the CE4 sequence, the CE5 sequence, and the CE6 sequence are constructed in a same manner. For example, symbols of CE1, CE2, CE7, and CE8 correspond to No. 1 in Table 1, and CE3 to CE6 correspond to No. 16, No. 28, No. 45, or No. 57 in Table 1. It may be understood that, in the foregoing example, the CE3 to the CE6 are constructed in a same manner, and CE1 and CE2 are constructed in a same manner. Therefore, for descriptions of CE1 to CE6 and the sequence 1 to the sequence 6 in this embodiment of this application, refer to the foregoing descriptions of the five streams/six streams. Details are not described herein again. The following focuses on the CE7 and the CE8, and the sequence 7 and the sequence 8.

For example, CE7=$\{Ga_{128}^7, Gb_{128}^7, -Ga_{128}^7, Gb_{128}^7, -Ga_{128}^7, Gb_{128}^7, Ga_{128}^7, Gb_{128}^7, Ga_{128}^7, Gb_{128}^7\}$, and CE8=$\{Ga_{128}^8, Gb_{128}^8, -Ga_{128}^8, Gb_{128}^8, -Ga_{128}^8, Gb_{128}^8, Ga_{128}^8, Gb_{128}^8, Ga_{128}^8, Gb_{128}^8\}$ (that is, corresponding to No. 1 in Table 7). In this case, the sequence 7=$\{-Ga_{128}^7, -Gb_{128}^7, Ga_{128}^7, -Gb_{128}^7, Ga_{128}^7, -Gb_{128}^7, -Ga_{128}^7, -Gb_{128}^7, -Ga_{128}^7, -Gb_{128}^7\}$, and the sequence 8=$\{-Ga_{128}^8, -Gb_{128}^8, Ga_{128}^8, -Gb_{128}^8, Ga_{128}^8, -Gb_{128}^8, -Ga_{128}^8, -Gb_{128}^8, -Ga_{128}^8, -Gb_{128}^8\}$.

It may be understood that for specific descriptions of the CE1 to the CE8 and the sequence 1 to the sequence 8, refer to descriptions in other parts of this application. Details are not described herein again.

For example, the CE1 sequence to the CE4 sequence are constructed in a same manner, and the CE5 sequence to the CE8 sequence are constructed in a same manner. In this case, the transmit device may alternatively perform channel estimation or target sensing in combination with the P-matrix. The P-matrix may be shown in the following formula (23) or formula (24):

$$P = \begin{bmatrix} +1 & +1 \\ +1 & +1 \\ +1 & -1 \\ +1 & -1 \\ +1 & -1 \\ +1 & -1 \\ +1 & +1 \\ +1 & +1 \end{bmatrix} \quad (23)$$

$$P = \begin{bmatrix} +1 & +1 \\ +1 & +1 \\ +1 & -1 \\ +1 & -1 \\ -1 & +1 \\ -1 & +1 \\ +1 & +1 \\ +1 & +1 \end{bmatrix} \quad (24)$$

It can be understood that the P-matrix applicable to the five streams or six streams may alternatively be the foregoing formula (23), and the formula (21) shown in the foregoing five streams/six streams may alternatively be replaced with the formula (23).

For example, symbol sequences of CE1 to CE4 correspond to a No. 1 in Table 7, and symbol sequences of CE5 to CE8 correspond to No. 16 in Table 7. In this case, CE1=$\{Ga_{128}^1, Gb_{128}^1, -Ga_{128}^1, Gb_{128}^1, -Ga_{128}^1, Gb_{128}^1, Ga_{128}^1, Gb_{128}^1, Ga_{128}^1, Gb_{128}^1\}$, CE2=$\{Ga_{128}^2, Gb_{128}^2, -Ga_{128}^2, Gb_{128}^2, -Ga_{128}^2, Gb_{128}^2, Ga_{128}^2, Gb_{128}^2, Ga_{128}^2, Gb_{128}^2\}$, CE3=$\{Ga_{128}^3, Gb_{128}^3, -Ga_{128}^3, Gb_{128}^3, -Ga_{128}^3, Gb_{128}^3, Ga_{128}^3, Gb_{128}^3, Ga_{128}^3, Gb_{128}^3\}$, and CE4=$\{Ga_{128}^4, Gb_{128}^4, -Ga_{128}^4, Gb_{128}^4, -Ga_{128}^4, Gb_{128}^4, Ga_{128}^4, Gb_{128}^4, Ga_{128}^4, Gb_{128}^4\}$, that is, corresponding to a No. 1 in Table 7. CE5=$\{Ga_{128}^5, Gb_{128}^5, Ga_{128}^5, -Gb_{128}^5, -Ga_{128}^5, Gb_{128}^5, -Ga_{128}^5, -Gb_{128}^5, Ga_{128}^5, Gb_{128}^5\}$, CE6=$\{Ga_{128}^6, Gb_{128}^6, Ga_{128}^6, -Gb_{128}^6, -Ga_{128}^6, Gb_{128}^6, -Ga_{128}^6, -Gb_{128}^6, Ga_{128}^6, Gb_{128}^6\}$, CE7=$\{Ga_{128}^7, Gb_{128}^7, Ga_{128}^7, -Gb_{128}^7, -Ga_{128}^7, Gb_{128}^7, -Ga_{128}^7, -Gb_{128}^7, Ga_{128}^7, Gb_{128}^7\}$, and CE8=$\{Ga_{128}^8, Gb_{128}^8, Ga_{128}^8, -Gb_{128}^8, -Ga_{128}^8, Gb_{128}^8, -Ga_{128}^8, -Gb_{128}^8, Ga_{128}^8, Gb_{128}^8\}$, that is, corresponding to No. 16 in Table 1.

For the P-matrix shown in formula (23), eight sequences are carried in the first field, for example, a sequence 1=$\{Ga_{128}^1, Gb_{128}^1, -Ga_{128}^1, Gb_{128}^1, -Ga_{128}^1, Gb_{128}^1, Ga_{128}^1, Gb_{128}^1, Ga_{128}^1, Gb_{128}^1\}$, a sequence 2=$\{Ga_{128}^2, Gb_{128}^2, -Ga_{128}^2, Gb_{128}^2, -Ga_{128}^2, Gb_{128}^2, Ga_{128}^2, Gb_{128}^2, Ga_{128}^2, Gb_{128}^2\}$, a sequence 3=$\{-Ga_{128}^3, -Gb_{128}^3, Ga_{128}^3, -Gb_{128}^3, Ga_{128}^3, -Gb_{128}^3, -Ga_{128}^3, -Gb_{128}^3, -Ga_{128}^3, -Gb_{128}^3\}$, and a sequence 4=$\{-Ga_{128}^4, -Gb_{128}^4, Ga_{128}^4, -Gb_{128}^4, Ga_{128}^4, -Gb_{128}^4, -Ga_{128}^4, -Gb_{128}^4, -Ga_{128}^4, -Gb_{128}^4\}$. The sequence 5=$\{-Ga_{128}^5, -Gb_{128}^5, -Ga_{128}^5, Gb_{128}^5, Ga_{128}^5, -Gb_{128}^5, Ga_{128}^5, Gb_{128}^5, -Ga_{128}^5, -Gb_{128}^5\}$, the sequence 6=$\{-Ga_{128}^6, -Gb_{128}^6, -Ga_{128}^6, Gb_{128}^6, Ga_{128}^6, -Gb_{128}^6, Ga_{128}^6, Gb_{128}^6, -Ga_{128}^6, -Gb_{128}^6\}$, the sequence 7=$\{Ga_{128}^7, Gb_{128}^7, Ga_{128}^7, -Gb_{128}^7, -Ga_{128}^7, Gb_{128}^7, -Ga_{128}^7, -Gb_{128}^7, Ga_{128}^7, Gb_{128}^7\}$, and the sequence 8=$\{Ga_{128}^8, Gb_{128}^8, Ga_{128}^8, -Gb_{128}^8, -Ga_{128}^8, Gb_{128}^8, -Ga_{128}^8, -Gb_{128}^8, Ga_{128}^8, Gb_{128}^8\}$.

For example, the CE1 sequence, the CE2 sequence, the CE5 sequence, and the CE6 sequence are constructed in a same manner, and the CE3 sequence, the CE4 sequence, the CE7 sequence, and the CE8 sequence are constructed in a same manner. Details are not described herein again. In this case, the transmit device may alternatively perform channel estimation or target sensing in combination with the P-matrix. The P-matrix may be shown in the foregoing formula (23) or formula (24). It may be understood that for specific descriptions of CE1 to CE8 and the sequence 1 to the sequence 8, refer to the foregoing description. Details are not described herein again.

In this embodiment of this application, the receive device may complete channel estimation or WLAN sensing within two periods in combination with the P-matrix. This shortens time for sending the CE sequence by the transmit device, and also shortens time for channel estimation by the receive device, or time for sensing by the receive device.

It should be noted that the PPDUs shown in FIG. 3a and FIG. 3b in this application are merely examples, but all PPDUs having functions similar to those of the PPDUs shown in embodiments of this application fall within the protection scope of this application. The PPDU shown in FIG. 3a and/or FIG. 3b is merely an example. With evolution of a standard, a form of the PPDU may also change. However, provided that a field or some fields in the PPDU meet a feature of the first field shown in this application, the PPDU falls within the protection scope of this application.

It should be noted that, the foregoing merely provides an example of one type of Golay complementary sequence, that is, $(Ga_N^i, Gb_N^i)$. The foregoing description of the Golay complementary sequence is also applicable to another type of Golay complementary sequence, that is, $(Gc_N^i, Gd_N^i)$. Certainly, with evolution of the standard, another type of Golay complementary type whose function is similar to that of the foregoing Golay complementary sequence may emerge. This is not limited in this embodiment of this application.

According to the foregoing description, a length N of the Golay complementary sequence in this application is equal to 128, or N is equal to 256, or N is equal to 512, or the like. A value of N is not limited in this application. Alternatively, N may be equal to 32, 64, or the like.

For example, when N=128, it may be learned from the result of the CE sequence autocorrelation shown in FIG. 4b that, because 0 indicates complete overlap, the length range of the Golay complementary sequence shown above may alternatively be −127 to +127. Therefore, when N=128, a range of zero autocorrelation side lobe energy of a CE sequence may be −127 to +127 (including −127 and/or +127, and not including 0). A range of zero cross-correlation energy between different CE sequences is −127 to +127 (including −127 and/or +127, and including 0).

Similarly, when N=64, a length range of the Golay complementary sequence may be −63 to +63 (which may include −63 and/or +63). When N=64, a range of zero autocorrelation side lobe energy of a CE sequence may be −63 to +63 (including −63 and/or +63, and not including 0). A range of zero cross-correlation energy between different CE sequences may be −63 to +63 (including −63 and/or +63, and including 0).

Similarly, when N=256, a length range of the Golay complementary sequence may be −255 to +255 (which may include −255 and/or +255). When N=256, a range of zero autocorrelation side lobe energy of a CE sequence may be −255 to +255 (including −255 and/or +255, and not including 0). A range of zero cross-correlation energy between different CE sequences may be −255 to +255 (including −255 and/or +255, and including 0).

Similarly, when N=512, a length range of the Golay complementary sequence may be −511 to +511 (which may include −511 and/or +511). That is, when N=512, a range of zero autocorrelation side lobe energy of a CE sequence may be −511 to +511 (including −511 and/or +517, and not including 0), and a range of zero cross-correlation energy between different CE sequences may be −511 to +511 (including −511 and/or +511, and including 0).

It may be understood that a relationship between a value of N and a length range of the Golay complementary sequence is not listed one by one herein. For descriptions of other values of N, refer to the foregoing description. The descriptions of the length range of the CE-Golay complementary sequences are also applicable to the M sequences shown above. Details are not described herein again.

In this application, an English name of a cyclic prefix is a cyclic prefix, and an English name of a cyclic suffix is a cyclic suffix.

In addition to being represented as a sample, an element, or a delay index, a horizontal coordinate shown in FIG. 4b, FIG. 8b to FIG. 8e, and FIG. 10b to FIG. 10e in this application may further represent an element or a bit. A vertical coordinate shown in FIG. 4b, FIG. 8b to FIG. 8e, and FIG. 10b to FIG. 10e may further represent a correlation value (correlation).

It may be understood that, in this application, cross-correlation energy between two CE sequences shown above within a length range of a Golay complementary sequence being zero may also be referred to as: Cross-correlation between the two CE sequences within the length range of the Golay complementary sequence is zero. Autocorrelation side lobe energy of a CE sequence within a length range of a Golay complementary sequence being zero may also be referred to as: Autocorrelation side lobe of the CE sequence within the length range of the Golay complementary sequence is zero. Similarly, in this application, cross-correlation energy between the first sequence shown above and at least two of the M sequences within a length range of a Golay complementary sequence being zero may also be referred to as: Cross-correlation between the first sequence and the at least two of the M sequences within the length range of the Golay complementary sequence is zero. Autocorrelation side lobe energy of the first sequence within the length range of the Golay complementary sequence being zero may also be referred to as: Autocorrelation side lobe of the first sequence within the length range of the Golay complementary sequence is zero. That is, the autocorrelation side lobe energy shown above in this application being zero may also be referred to as: Autocorrelation side lobe is zero. The cross-correlation energy being zero may also be referred to as: Cross-correlation is zero.

The following describes communication apparatuses provided in embodiments of this application.

In this application, the communication apparatus is divided into functional modules based on the foregoing method examples. For example, functional modules corresponding to functions may be obtained through division, or two or more functions may be integrated into one processing module. The integrated module may be implemented in a form of hardware, or may be implemented in a form of a software functional module. It should be noted that, in this application, module division is an example, and is merely a logical function division. In actual implementation, another division manner may be used. The following describes in detail a communication apparatus in an embodiment of this application with reference to FIG. 12 to FIG. 14.

Figure 12:
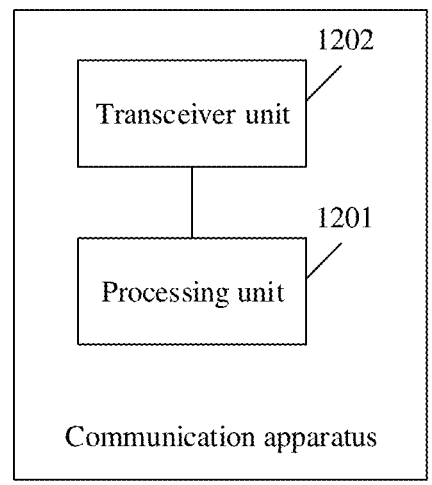
FIG. 12 to FIG. 14 each are a schematic diagram of a structure of a communication apparatus according to an embodiment of this application.

FIG. 12 is a schematic diagram of a structure of a communication apparatus according to an embodiment of this application. As shown in FIG. 12, the communication apparatus includes a processing unit 1201 and a transceiver unit 1202.

In some embodiments of this application, the communication apparatus may be the transmit device, a chip in the transmit device, or the like shown above. That is, the communication apparatus may be configured to perform a step or a function performed by the transmit device in the method embodiments.

The processing unit 1201 is configured to generate a PPDU. The transceiver unit 1202 is configured to output the PPDU.

It may be understood that specific descriptions of the transceiver unit and the processing unit described in this embodiment of this application are merely examples. For specific functions, steps, or the like of the transceiver unit and the processing unit, refer to the foregoing method embodiments. Details are not described herein again. For example, the processing unit 1201 may be configured to perform step 701 shown in FIG. 7. The transceiver unit 1202 may be configured to perform the sending step in step 702 shown in FIG. 7.

FIG. 12 is reused. In some other embodiments of this application, the communication apparatus may be the receive device, a chip in the receive device, or the like shown above. That is, the communication apparatus may be configured to perform a step or a function performed by the receive device in the method embodiments.

For example, the transceiver unit 1202 is configured to input a PPDU; and the processing unit 1201 is configured to process M sequences carried in the PPDU.

For example, the processing unit 1201 may perform channel estimation based on the M sequences, or perform target sensing based on the M sequences. For specific functions of the M sequences, refer to the foregoing description. Details are not described herein again.

It may be understood that specific descriptions of the transceiver unit and the processing unit described in this embodiment of this application are merely examples. For specific functions, steps, or the like of the transceiver unit and the processing unit, refer to the foregoing method embodiments. Details are not described herein again. For example, the transceiver unit 1202 may be further configured to perform the receiving step in step 702 shown in FIG. 7. The processing unit 1201 may be further configured to perform step 703 shown in FIG. 7.

In the foregoing embodiments, for descriptions of the PPDU, the M sequences, the first sequence, the Golay complementary sequence (for example, including $Ga_{128}^1$ and $Gb_{128}^1$, $Ga_{128}^2$ and $Gb_{128}^2$, $Ga_{128}^3$ and $Gb_{128}^3$, $Ga_{128}^4$ and $Gb_{128}^4$, $Ga_{128}^5$ and $Gb_{128}^5$, $Ga_{128}^6$ and $Gb_{128}^6$, $Ga_{128}^7$ and $Gb_{128}^7$, and $Ga_{128}^8$ and $Gb_{128}^8$), and the CE sequence (for example, including the CE1 sequence to the CE8 sequence), refer to the descriptions in the foregoing method embodiments. Details are not described herein again.

The transmit device and the receive device in this embodiment of this application are described above. The following describes possible product forms of the transmit device and the receive device. It should be understood that, a product in any form that has the functions of the transmit device in FIG. 12 or a product in any form that has the functions of the receive device in FIG. 12 falls within the protection scope of embodiments of this application. It should further be understood that the following descriptions are merely examples, and do not limit product forms of the transmit device and the receive device in this embodiment of this application.

In a possible implementation, in the communication apparatus shown in FIG. 12, the processing unit 1201 may be one or more processors, and the transceiver unit 1202 may be a transceiver, or the transceiver unit 1202 may be a sending unit and a receiving unit. The sending unit may be a transmitter. The receiving unit may be a receiver. The sending unit and the receiving unit are integrated into one component, for example, a transceiver. In this embodiment of this application, the processor and the transceiver may be coupled, or the like. A connection manner between the processor and the transceiver is not limited in this embodiment of this application.

Figure 13:
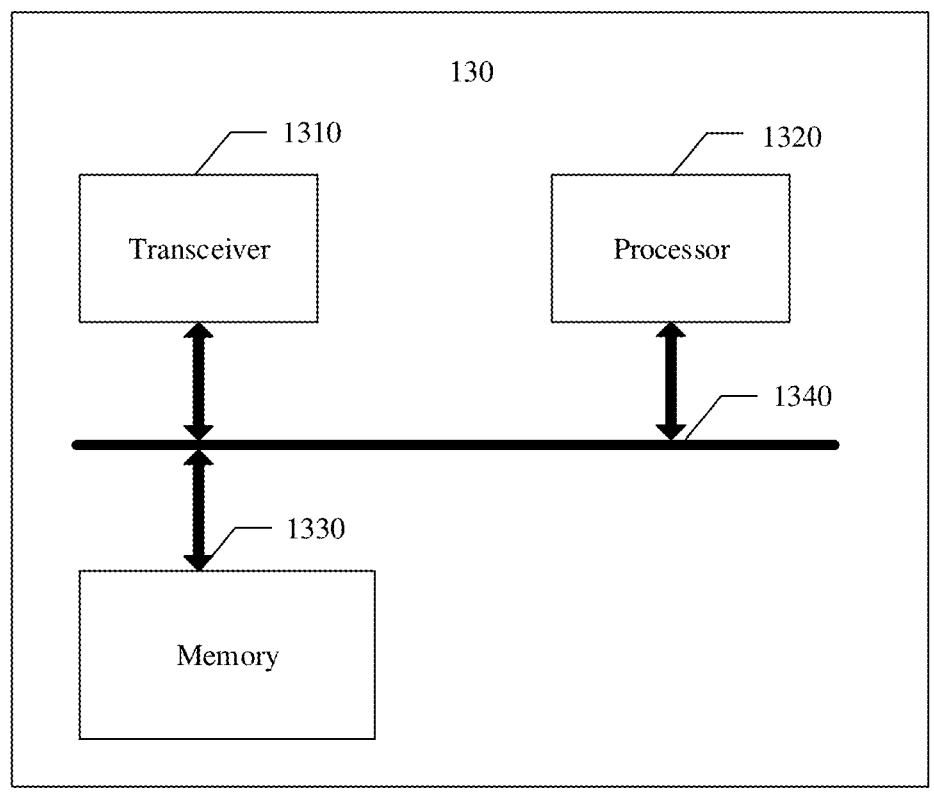

As shown in FIG. 13, the communication apparatus 130 includes one or more processors 1320 and a transceiver 1310.

For example, when the communication apparatus is configured to perform the steps, the methods, or the functions performed by the transmit device, the processor 1320 is configured to generate a PPDU; and the transceiver 1310 is configured to send the PPDU to the receive device.

For example, when the communication apparatus is configured to perform the steps, the methods, or the functions performed by the receive device, the transceiver 1310 is configured to receive a PPDU from the transmit device; and the processor 1320 is configured to process the M sequences carried in the PPDU.

In this embodiment of this application, for descriptions of the PPDU, the M sequences, the first sequence, the Golay complementary sequences (for example, including $Ga_{128}^1$ and $Gb_{128}^1$, $Ga_{128}^2$ and $Gb_{128}^2$, $Ga_{128}^3$ and $Gb_{128}^3$, $Ga_{128}^4$ and $Gb_{128}^4$, $Ga_{128}^5$ and $Gb_{128}^5$, $Ga_{128}^6$ and $Gb_{128}^6$, $Ga_{128}^7$ and $Gb_{128}^7$, and $Ga_{128}^8$ and $Gb_{128}^8$), and the CE sequences (for example, including the CE1 sequence to the CE8 sequence), refer to the descriptions in the foregoing method embodiments. Details are not described herein again.

It may be understood that for specific descriptions of the processor and the transceiver, refer to the descriptions of the processing unit and the transceiver unit shown in FIG. 12. Details are not described herein again.

In the implementations of the communication apparatus shown in FIG. 13, the transceiver may include a receiver device and a transmitter device. The receiver device is configured to perform a receiving function (or operation), and the transmitter device is configured to perform a transmitting function (or operation). The transceiver is configured to communicate with another device/apparatus through a transmission medium.

Optionally, the communication apparatus 130 may further include one or more memories 1330, configured to store program instructions and/or data, and the like. The memory 1330 is coupled to the processor 1320. The coupling in this embodiment of this application may be an indirect coupling or a communication connection between apparatuses, units, or modules in an electrical form, a mechanical form, or another form, and is used for information exchange between the apparatuses, the units, or the modules. The processor 1320 may operate in collaboration with the memory 1330. The processor 1320 may execute the program instructions stored in the memory 1330. Optionally, at least one of the one or more memories may be included in the processor.

A specific connection medium between the transceiver 1310, the processor 1320, and the memory 1330 is not limited in this embodiment of this application. In this embodiment of this application, in FIG. 13, the memory 1330, the processor 1320, and the transceiver 1310 are connected through a bus 13120, and the bus is represented by a bold line in FIG. 13. A connection manner between other parts is merely an example for description, and does not impose a limitation. The bus may be classified into an address bus, a data bus, a control bus, and the like. For ease of representation, only one bold line is used to represent the bus in FIG. 13, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the methods disclosed with reference to embodiments of this application may be directly executed and accomplished by a hardware processor, or may be executed and accomplished by using a combination of hardware and software modules in the processor.

In this embodiment of this application, the memory may include but is not limited to a nonvolatile memory, for example, a hard disk drive (hard disk drive, HDD) or a solid-state drive (solid-state drive, SSD), a random access memory (Random Access Memory, RAM), an erasable programmable read-only memory (Erasable Programmable ROM, EPROM), a read-only memory (Read-Only Memory, ROM), or a compact disc read-only memory (Compact Disc Read-Only Memory, CD-ROM). The memory is any storage medium that can be used to carry or store program code in a form of an instruction or a data structure and that can be read and/or written by a computer (for example, the communication apparatus shown in this application). However, this is not limited thereto. The memory in embodiments of this application may alternatively be a circuit or any other apparatus that can implement a storage function, and is configured to store the program instructions and/or the data.

For example, the processor 1320 is mainly configured to: process a communication protocol and communication data, control the entire communication apparatus, execute a software program, and process data of the software program. The memory 1330 is mainly configured to store a software program and data. The transceiver 1310 may include a control circuit and an antenna. The control circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display screen, or a keyboard, is mainly configured to: receive data input by a user and output data to the user.

After the communication apparatus is powered on, the processor 1320 may read the software program in the memory 1330, interpret and execute instructions of the software program, and process data of the software program. When data is sent wirelessly, the processor 1320 performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the communication apparatus, the radio frequency circuit receives a radio frequency signal through the antenna, converts the radio frequency signal into a baseband signal, and outputs the baseband signal to the processor 1320. The processor 1320 converts the baseband signal into data and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

It may be understood that the communication apparatus shown in this embodiment of this application may further have more components than those in FIG. 13, and the like. This is not limited in this embodiment of this application. The methods performed by the processor and the transceiver are merely examples. For specific steps performed by the processor and the transceiver, refer to the methods described above.

Figure 14:
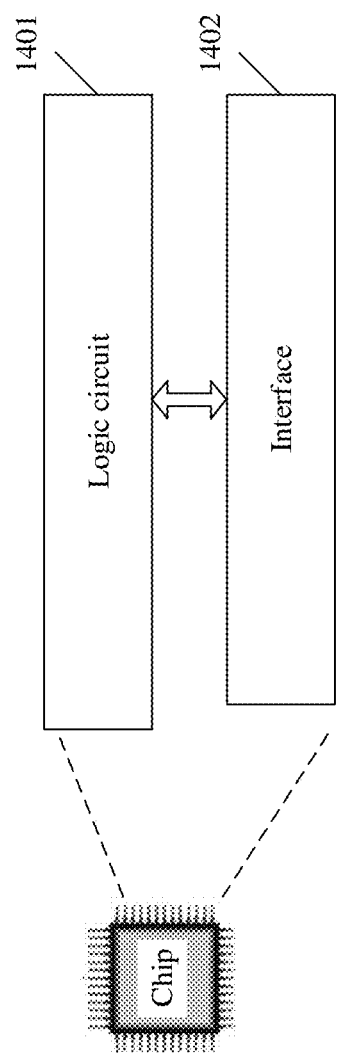

In another possible implementation, in the communication apparatus shown in FIG. 12, the processing unit 1201 may be one or more logic circuits, and the transceiver unit 1202 may be an input/output interface, or referred to as a communication interface, an interface circuit, an interface, or the like. Alternatively, the transceiver unit 1202 may be a sending unit and a receiving unit. The sending unit may be an output interface, and the receiving unit may be an input interface. The sending unit and the receiving unit are integrated into one unit, for example, an input/output interface. As shown in FIG. 14, the communication apparatus shown in FIG. 14 includes a logic circuit 1401 and an interface 1402. That is, the processing unit 1201 may be implemented by using the logic circuit 1401, and the transceiver unit 1202 may be implemented by using the interface 1402. The logic circuit 1401 may be a chip, a processing circuit, an integrated circuit, a system on chip (system on chip, SoC) chip, or the like. The interface 1402 may be a communication interface, an input/output interface, a pin, or the like. For example, in FIG. 14, the foregoing communication apparatus is a chip, and the chip includes a logic circuit 1401 and an interface 1402.

In this embodiment of this application, the logic circuit may further be coupled to the interface. A specific connection manner of the logical circuit and the interface is not limited in this embodiment of this application.

For example, when the communication apparatus is configured to perform the methods, the functions, or the steps performed by the transmit device, the logic circuit 1401 is configured to generate a PPDU; and the interface 1402 is configured to output the PPDU.

For example, when the communication apparatus is configured to perform the methods, the functions, or the steps performed by the receive device, the interface 1402 is configured to input a PPDU; and the logic circuit 1401 is configured to process the M sequences carried in the PPDU.

It may be understood that the communication apparatus shown in this embodiment of this application may implement the method provided in embodiments of this application in a form of hardware or in a form of software. This is not limited in embodiments of this application.

In this embodiment of this application, for descriptions of the PPDU, the M sequences, the first sequence, the Golay complementary sequences (for example, including $Ga_{128}^1$ and $Gb_{128}^1$, $Ga_{128}^2$ and $Gb_{128}^2$, $Ga_{128}^3$ and $Gb_{128}^3$, $Ga_{128}^4$ and $Gb_{128}^4$, $Ga_{128}^5$ and $Gb_{128}^5$, $Ga_{128}^6$ and $Gb_{128}^6$, $Ga_{128}^7$ and $Gb_{128}^7$, and $Ga_{128}^8$ and $Gb_{128}^8$), and the CE sequences (for example, including the CE1 sequence to the CE8 sequence), refer to the descriptions in the foregoing method embodiments. Details are not described herein again.

For a specific implementation of each embodiment shown in FIG. 14, refer to the foregoing embodiments. Details are not described herein again.

An embodiment of this application further provides a wireless communication system. The wireless communication system includes a transmit device and a receive device. The transmit device and the receive device may be configured to perform the method in any one of the foregoing embodiments (as shown in FIG. 7).

In addition, this application further provides a computer program. The computer program is used to implement operations and/or processing performed by the transmit device in the method provided in this application.

This application further provides a computer program. The computer program is used to implement operations and/or processing performed by the receive device in the method provided in this application.

This application further provides a computer-readable storage medium. The computer-readable storage medium stores computer code When the computer code is run on a computer, the computer is enabled to perform operations and/or processing performed by the transmit device in the method provided in this application.

This application further provides a computer-readable storage medium. The computer-readable storage medium stores computer code When the computer code is run on a computer, the computer is enabled to perform operations and/or processing performed by the receive device in the method provided in this application.

This application further provides a computer program product. The computer program product includes computer code or a computer program. When the computer code or the computer program is run on a computer, operations and/or processing performed by the transmit device in the method provided in this application are/is performed.

This application further provides a computer program product. The computer program product includes computer code or a computer program. When the computer code or the computer program is run on a computer, operations and/or processing performed by the receive device in the method provided in this application are/is performed.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual specifications to achieve the technical effect of the solutions provided in embodiments in this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application contributing to the conventional technology, or all or some of the technical solutions may be implemented in a form of a software product. The computer software product is stored in a readable-storage medium, and includes several instructions for instructing a computer device (which may be a personal computer, a server, a network device, or the like) to perform all or some of the steps of the methods described in embodiments of this application. The readable-storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal processing method, wherein the method comprises:
generating a physical layer protocol data unit (PPDU), wherein the PPDU comprises:
a first field, the first field is usable for carrying M sequences, the M sequences correspond to M space-time streams, one sequence corresponds to one space-time stream, M is a positive integer greater than 4, the M sequences comprise a first sequence, wherein cross-correlation energy between the first sequence and at least three of the M sequences within a length range of the Golay complementary sequence is zero, and an autocorrelation side lobe energy of the first sequence within the length range of the Golay complementary sequence is zero, the first sequence is based on a channel estimation (CE) sequence, and the Golay complementary sequence is usable for constructing the CE sequence; and
sending the PPDU.

2. The method according to claim 1, wherein the M sequences are usable for channel estimation, or the M sequences are used for target sensing.

3. The method according to claim 1, wherein the M sequences are usable for target sensing or channel estimation.

4. The method according to claim 1, wherein the first sequence is obtained based on a P-matrix and the CE sequence, and the P-matrix is:

$$P = \begin{bmatrix} +1 & +1 \\ +1 & +1 \\ +1 & +1 \\ +1 & +1 \\ +1 & -1 \\ +1 & -1 \\ +1 & -1 \\ +1 & -1 \end{bmatrix}.$$

5. The method according to claim 1, wherein the Golay complementary sequence comprises first Golay complementary sequences Ga and Gb, the first sequence is obtained based on Ga, Gb, and a first symbol sequence, and the first symbol sequence is usable for representing positive or negative symbols of Ga and Gb.

6. The method according to claim 5, wherein the first symbol sequence $a(n) = \{a_1, a_2, a_3, a_4, a_5, a_6, a_7, a_8, a_9, a_{10}\}$, $a_1$ is equal to $a_9$, $a_2$ is equal to $a_{10}$, and a value of each element in $a(n)$ is 1 or $-1$.

7. The method according to claim 6, wherein $a(n)$ meets at least one of the following:

$$a_1 \cdot a_2 + a_3 \cdot a_4 + a_5 \cdot a_6 + a_7 \cdot a_8 = 0$$

$$a_2 \cdot a_3 + a_4 \cdot a_5 + a_6 \cdot a_7 + a_8 \cdot a_9 = 0$$

$$a_3 \cdot a_4 + a_5 \cdot a_6 + a_7 \cdot a_8 + a_9 \cdot a_{10} = 0.$$

8. The method according to claim 7, wherein values of $a_1$ to $a_{10}$ are any one of the following, and a horizontal order sequentially corresponds to $a_1$ to $a_{10}$:
1 1 −1 1 −1 1 1 1 1 1;
1 1 −1 1 1 −1 1 1 1 1;
1 1 −1 1 1 1 −1 1 1 1;
1 1 1 −1 1 1 −1 1 1 1;
1 1 1 1 −1 1 −1 1 1 1;
1 1 −1 −1 −1 1 −1 1 1 1;
1 1 −1 −1 1 −1 −1 1 1 1;
1 1 −1 1 −1 −1 −1 1 1 1;
1 1 −1 1 1 1 1 −1 1 1;
1 1 1 −1 1 1 1 −1 1 1;
1 1 1 1 −1 1 1 −1 1 1;
1 1 −1 −1 −1 1 1 −1 1 1;
1 1 1 1 1 −1 1 −1 1 1;

1 1 1 −1 −1 −1 1 −1 1 1;
1 1 1 −1 −1 1 1 −1 −1 1 1;
1 1 −1 1 1 −1 −1 −1 1 1;
1 1 1 −1 1 −1 −1 −1 1 1;
−1 1 −1 1 1 1 1 1 −1 1;
−1 1 1 −1 1 1 1 1 −1 1;
−1 1 1 1 −1 1 1 1 −1 1;
−1 1 −1−1 −1 1 1 1 −1 1;
−1 1 1 1 1 −1 1 1 −1 1;
−1 1 1 −1 −1 −1 1 1 −1 1;
−1 1 1 1 1 1 −1 1 −1 1;
−1 1 1 1 −1 −1 −1 1 −1 1;
−1 1 −1 −1 −1 −1 −1 1 −1 1;
−1 1 −1 1 1 1 −1 −1 1;
−1 1 1 1 −1 −1 1 −1 −1 1;
−1 1 −1 −1 −1 −1 1 −1 −1 1;
−1 1 −1 1 1 1 −1 −1 −1 1;
−1 1 1 −1 1 1 −1 −1 −1 1;
−1 1 1 1 −1 1 −1 −1 −1 1;
−1 1 −1 −1 −1 1 −1 −1 −1 1;
−1 1 −1 −1 1 −1 −1 −1 −1 1; or
−1 1 −1 1 −1 −1 −1 −1 −1 1.

9. The method according to claim 1, wherein the first field is a training field unit in the PPDU;
the first field is an enhanced directional multi-gigabit channel estimation field in the PPDU; or
the first field is a long training field in the PPDU.

10. A communication apparatus, wherein the communication apparatus comprises:
a processing unit, configured to generate a physical layer protocol data unit (PPDU), wherein the PPDU comprises a first field, the first field is usable for carrying M sequences, the M sequences correspond to M space-time streams, one sequence corresponds to one space-time stream, M is a positive integer greater than 4, the M sequences comprise a first sequence, wherein cross-correlation energy between the first sequence and at least three of the M sequences within a length range of the Golay complementary sequence is zero, and an autocorrelation side lobe energy of the first sequence within the length range of the Golay complementary sequence is zero, the first sequence is based on a channel estimation (CE) sequence, and the Golay complementary sequence is usable for constructing the CE sequence; and
a transceiver unit, configured to send the PPDU.

11. The communication apparatus according to claim 10, wherein the M sequences are usable for channel estimation.

12. The communication apparatus according to claim 10, wherein the M sequences are used for target sensing.

13. The communication apparatus according to claim 10, wherein the first sequence is obtained based on a P-matrix and the CE sequence, and the P-matrix is:

$$P = \begin{bmatrix} +1 & +1 \\ +1 & +1 \\ +1 & +1 \\ +1 & +1 \\ +1 & -1 \\ +1 & -1 \\ +1 & -1 \\ +1 & -1 \end{bmatrix}.$$

14. The communication apparatus according to claim 10, wherein the Golay complementary sequence comprises first Golay complementary sequences Ga and Gb, the first sequence is obtained based on Ga, Gb, and a first symbol sequence, and the first symbol sequence is used for representing positive or negative symbols of Ga and Gb.

15. The communication apparatus according to claim 14, wherein the first symbol sequence a(n)={$a_1, a_2, a_3, a_4, a_5, a_6, a_7, a_8, a_9, a_{10}$}, $a_1$ is equal to $a_9$, $a_2$ is equal to $a_{10}$, and a value of each element in a(n) is 1 or −1.

16. The communication apparatus according to claim 15, wherein a(n) meets at least one of the following:

$$a_1 \cdot a_2 + a_3 \cdot a_4 + a_5 \cdot a_6 + a_7 \cdot a_8 = 0$$

$$a_2 \cdot a_3 + a_4 \cdot a_5 + a_6 \cdot a_7 + a_8 \cdot a_9 = 0$$

$$a_3 \cdot a_4 + a_5 \cdot a_6 + a_7 \cdot a_8 + a_9 \cdot a_{10} = 0.$$

17. The communication apparatus according to claim 15, wherein values of $a_1$ to $a_{10}$ any one of the following, and a horizontal order sequentially corresponds to $a_1$ to $a_{10}$:

1 1 −1 1 −1 1 1 1 1 1;
1 1 −1 1 1 −1 1 1 1 1;
1 1 −1 1 1 1 −1 1 1 1;
1 1 1 −1 1 1 −1 1 1 1;
1 1 1 1 −1 1 −1 1 1 1;
1 1 −1 −1 −1 1 −1 1 1 1;
1 1 −1 −1 1 1 −1 −1 1 1 1;
1 1 −1 1 −1 −1 −1 1 1 1;
1 1 −1 1 1 1 1 −1 1 1 1;
1 1 1 −1 1 1 1 −1 1 1 1;
1 1 1 1 −1 1 1 −1 1 1 1;
1 1 −1 −1 −1 1 1 −1 1 1 1;
1 1 1 1 1 −1 1 1 −1 1 1 1;
1 1 1 −1 −1 −1 1 −1 1 1 1;
1 1 1 −1 −1 1 −1 1 1 1;
1 1 −1 1 1 −1 −1 1 1 1;
1 1 1 −1 1 −1 −1 1 1 1;
−1 1 −1 1 1 1 1 1 −1 1;
−1 1 1 −1 1 1 1 1 −1 1;
−1 1 1 1 −1 1 1 1 −1 1;
−1 1 −1−1 −1 1 1 1 −1 1;
−1 1 1 1 1 −1 1 1 −1 1;
−1 1 1 −1−1 −1 1 1 −1 1;
−1 1 1 1 1 1 −1 1 −1 1;
−1 1 1 1 −1−1 −1 1 −1 1;
−1 1 −1−1 −1−1 −1 1 −1 1;
−1 1 −1−1 1 1 1 −1−1 1;
−1 1 1 1 −1−1 1 −1−1 1;
−1 1 −1−1 −1−1 1 −1−1 1;
−1 1 −1 1 1 1 −1−1−1 1;
−1 1 1 −1 1 1 −1−1−1 1;
−1 1 1 1 −1 1 −1−1−1 1;
−1 1 −1−1 −1 1 −1−1−1 1;
−1 1 −1−1 1 −1−1−1−1 1; or
−1 1 −1 1 −1−1 −1−1 −.

* * * * *